(12) United States Patent
Yahata et al.

(10) Patent No.: US 8,068,722 B2
(45) Date of Patent: Nov. 29, 2011

(54) INFORMATION STORAGE MEDIUM, TS PACKET JUDGEMENT APPARATUS, AND DATA REPRODUCTION APPARATUS

(75) Inventors: Hiroshi Yahata, Osaka (JP); Tomoyuki Okada, Nara (JP); Sam Liu, Mountain View, CA (US); Gabe B. Beged-Dov, Corvallis, OR (US)

(73) Assignees: Panasonic Corporation, Osaka (JP); Hewlett-Packard Development Company L.P., Houston, TX (US)

( * ) Notice: Subject to any disclaimer, the term of this patent is extended or adjusted under 35 U.S.C. 154(b) by 1233 days.

(21) Appl. No.: 11/575,194

(22) PCT Filed: Oct. 5, 2005

(86) PCT No.: PCT/JP2005/018734
§ 371 (c)(1),
(2), (4) Date: Mar. 13, 2007

(87) PCT Pub. No.: WO2006/038715
PCT Pub. Date: Apr. 13, 2006

(65) Prior Publication Data
US 2009/0010614 A1    Jan. 8, 2009

Related U.S. Application Data

(60) Provisional application No. 60/616,214, filed on Oct. 7, 2004.

(51) Int. Cl.
*H04N 5/84* (2006.01)
(52) U.S. Cl. ......... 386/334; 386/248; 386/338; 386/356
(58) Field of Classification Search .................. 386/239, 386/248, 326, 332, 334, 338–340, 353, 356
See application file for complete search history.

(56) References Cited

U.S. PATENT DOCUMENTS
5,648,948 A    7/1997   Itoh et al.
(Continued)

FOREIGN PATENT DOCUMENTS
CN           1204112         1/1999
(Continued)

OTHER PUBLICATIONS

Patent Abstracts of Japan vol. 2003, No. 12, Dec. 5, 2003 (for JP 2003-272283).*

(Continued)

*Primary Examiner* — Thai Tran
*Assistant Examiner* — Mishawn Dunn
(74) *Attorney, Agent, or Firm* — Greenblum & Bernstein, P.L.C.

(57) ABSTRACT

The present invention provides an information storage medium in which a stream including basic data and extension data for next generation is stored, so as to allow a decoder capable of decoding only basic data to process such a stream including basic data and extension data.

Such information storage medium is an information storage medium on which an audio stream including a plurality of TS packets is stored, wherein each of the TS packets includes one of (a) a first packet including basic data, and (b) a second packet including extension data related to the basic data, the basic data is data capable of being decoded into complete sound without requiring the extension data, and the extension data is data intended for improving the quality of audio generated from the basic data, and a header of each of the TS packets includes an identifier indicating whether the TS packet includes the first packet or the second packet.

6 Claims, 41 Drawing Sheets

U.S. PATENT DOCUMENTS

| | | | |
|---|---|---|---|
| 5,987,417 A * | 11/1999 | Heo et al. | |
| 6,038,369 A * | 3/2000 | Imai | |
| 6,088,506 A * | 7/2000 | Yoshio et al. | |
| 6,226,616 B1 * | 5/2001 | You et al. | |
| 6,473,561 B1 * | 10/2002 | Heo | 386/243 |
| 7,023,992 B1 * | 4/2006 | Kubota et al. | 380/210 |
| 7,602,819 B2 | 10/2009 | Leyendecker | |
| 2003/0031211 A1 | 2/2003 | Leyendecker | |
| 2003/0123349 A1 * | 7/2003 | Otomo et al. | |
| 2004/0114909 A1 * | 6/2004 | Seo et al. | 386/95 |

FOREIGN PATENT DOCUMENTS

| | | |
|---|---|---|
| CN | 1411656 | 4/2003 |
| EP | 0800174 * | 10/1997 |
| EP | 0855715 * | 7/1998 |
| EP | 0883125 * | 12/1998 |
| JP | 5-250811 | 9/1993 |
| JP | 9-282848 * | 10/1997 |
| JP | 11-031362 | 2/1999 |
| JP | 2003-502704 | 1/2003 |
| JP | 2003-272283 * | 9/2003 |
| WO | 01/65831 | 9/2001 |

OTHER PUBLICATIONS

English Language Abstract of JP 9-282848.*

Schroder et al., "Der MPEG-2-Standard: Generische Codierung Fur Bewegtbilder Und Zugehoerige Audio-Information. Audio-Codierung (Teil 4)," FKT Fernseh Und Kinotechnik, Fachverlag Schiele & Schon GMBH., Berlin, DE, vol. 48, No. 7/8, Aug. 30, 1994, pp. 364-373, XP000460964, along with an English language translation thereof.*

Japan Office action in Japanese Patent Application No. 2007-510408, mail date is Feb. 22, 2011.

* cited by examiner

FIG. 24

Player variable (System parameter)

| | | | | | | |
|---|---|---|---|---|---|---|
| 0 | Language Code | 11 | Player audio mixing mode for Karaoke | 22 | reserved |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

…

INFORMATION STORAGE MEDIUM, TS PACKET JUDGEMENT APPARATUS, AND DATA REPRODUCTION APPARATUS

CROSS-REFERENCE TO RELATED APPLICATIONS

This application is a 371 National Stage Application of PCT/JP2005018734, filed Oct. 5, 2005, which claims the benefit of U.S. Provisional Application No. 60/616,214, filed Oct. 7, 2004, the entire contents of which are incorporated herein in their entireties.

TECHNICAL FIELD

The present invention relates to an information storage medium in which video data and audio data are stored, a TS packet judgment apparatus for sorting data, and a data reproduction apparatus that reproduces data, and the like.

BACKGROUND ART

The following describes a conventional DVD-Video disc (hereinafter referred to as a "DVD").

FIG. 1 is a diagram showing the structure of a DVD. As is shown in the bottom of FIG. 1, the DVD includes a logical address space in between the read-in area and the read-out area. In the logical address space, volume information of the file system is stored at the top, and application data such as video and audio is stored in the subsequent areas.

The file system of a DVD is a file system compliant with ISO9660 and the Universal Disc Format (UDF). File system is a mechanism for representing data on a disc by units called directories and files. In a personal computer (PC), a file system called FAT or NTFS is used. Such a file system allows a computer to process data stored in the hard disk in the form of directories and files. As a result, usability is enhanced.

Both UDF and ISO9660 are used in DVDs as their file systems. UDF and ISO9660 are sometimes referred to collectively as "UDF Bridge". Data stored on a DVD can be read out by the file system driver of either UDF or ISO9660. In the case of DVD-RAM/R/RW, which are rewritable DVDs, data reading, writing, and deletion are physically possible.

Data stored on a DVD exists as directories or files as shown in the upper left of FIG. 1 via the file system. Immediately below the root directory ("ROOT" in FIG. 1), a directory called "VIDEO_TS" is placed, where application data of the DVD is stored. The application data is divided and stored as plural files. The following are some of the major files:

| | |
|---|---|
| VIDEO_TS. IFO | disc reproduction control information file |
| VTS_01_0. IFO | video title set#1 reproduction control information file |
| VTS_01_0. VOB | video title set#1 stream file |
| … | |

There are two extensions specified. "IFO" is an extension indicating that a file with this extension stores reproduction control information. "VOB" is an extension indicating that a file with this extension stores an MPEG stream being AV data. The reproduction control information is information that includes information for realizing interactivity (technique for dynamically changing the state of reproduction according to a user operation) employed for the DVD as well as information, such as meta data, which is attached to a title or an AV stream. The reproduction control information of the DVD is called navigation information in general.

The reproduction control information files include "VIDEO_TS. IFO" intended for the management of the entire disc, and "VTS_01_0. IFO" being the reproduction control information of an individual video title set. "01" in the body of the filename indicates the number of the video title set. In the case where the number of a video title set is #2, for example, the filename of such video title set is "VTS_02_0. IFO". Note that a single DVD can store plural titles, that is, plural movies with different stories and plural movies with the same story but with different versions.

The upper right of FIG. 1 shows a DVD navigation space in the application layer of the DVD, i.e., a logical structure space where details of the above-described reproduction control information are shown. Details of information in "VIDEO_TS. IFO" are shown in the DVD navigation space as Video Manager Information (VMGI). Details of the reproduction control information which exists for each video title set such as "VTS_01_0. IFO", are shown in the DVD navigation space as Video Title Set Information (VTSI).

VTSI describes Program Chain Information (PGCI) which is information about a reproduction sequence called a Program Chain (PGC). The PGCI is made up of a group of cells and a kind of programming information called a command. Each cell represents a part or the whole segments in a Video Object (VOB; MPEG stream). The reproduction of a cell means to reproduce segments in a VOB that are specified by such cell.

A command, which is processed by a DVD-capable virtual machine, is similar to Java (registered trademark) Script executed on a browser. Java (registered trademark) Script performs window and browser controls (e.g., opens a new browser window), in addition to logical operations. Meanwhile, a DVD command performs only the reproduction control of AV titles (e.g., the specification of a chapter to be reproduced), in addition to logical operations. This is a difference between a DVD command and Java (registered trademark) Script.

Each cell includes information about the start address and end address (logical storage address on the disc) of a VOB stored on the disc. A player reads out data using such information described in the cell about the start address and end address of the VOB, and reproduces the read data.

FIG. 2 is a diagram for describing the navigation information in the AV stream. Interactivity, which is characteristics to a DVD, is not realized only by the navigation information stored in the above-described "VIDEO_TS. IFO" and "VTS_01_0. IFO". Several pieces of important information for realizing interactivity are multiplexed in the VOB with video data and audio data, using dedicated carriers called navigation packs (hereinafter referred to as "navi pack(s)" or "NV_PCK").

Here, a description is given of menu as a simple example of interactivity. Several buttons appear on the menu screen. For each of such buttons, the details of a process to be performed when such button is pressed, are defined. One button is selected on the menu. Highlight, which is a semitransparent image to be overlaid on the selected button, indicates that the button on which it is overlaid is selected. The user can shift to any of the buttons located above, below, right or left of the currently selected button, using the Up/Down/Right/Left key on the remote control. Using the Up/Down/Right/Left key on the remote control, the user moves the highlight to a button corresponding to the process such user wishes to execute, and then presses the Determination key. Accordingly, a program of a command corresponding to such selected button is executed. For example, the reproduction of a title or a chapter is executed by the command (for example, refer to Japanese Laid-Open Patent application No. 09-282848).

The upper left of FIG. 2 shows an overview of the control information stored in NV_PCK.

NV_PCK includes highlight color information and button information of each button. The highlight color information describes color palette information. The color palette information specifies a semitransparent color of a highlight to be overlaid. Each button information describes: rectangular area information that is information about the position of each button; move information indicating a move from one button to another button (specification of a destination button corresponding to a user selection of the Up/Down/Right/Left key on the remote control); and button command information (a command to be executed when such button is selected).

As shown in the upper right center of FIG. 2, a highlight on the menu is generated as an overlay image. The overlay image is an image generated by giving a color specified by the color palette information to a button specified by the rectangular area information in the button information. Such overlay image is displayed on the screen, superimposed on the background image shown in the right of FIG. 2.

The menu display of the DVD is performed in the above-described manner. The reason that a part of the navigation data is in the stream using NV_PCK is to allow the menu information to be dynamically updated in synchronization with the stream. For example, a first reason is to allow the menu to be displayed only for five to ten minutes in the middle of movie reproduction. A second reason is to allow the stream and the menu information to be displayed in synchronization with each other even for application data for which synchronous display of the stream and menu information is difficult. Another major reason is to improve user operability. For example, by storing, in NV_PCK, information for supporting special reproduction, it becomes possible to smoothly decode and reproduce AV data stored on a DVD even when such AV data is reproduced in a special manner such as forward reproduction and rewind reproduction.

FIG. 3 is a conceptual diagram showing a VOB being a DVD stream. Data such as video data, audio data, and subtitle data shown in FIG. 3(A) are each packetized and packed, as shown in FIG. 3(B), based on the MPEG system standard (ISO/IEC13818-1), and multiplexed as shown in FIG. 3(C), to be generated as a single MPEG program stream. NV_PCK including a button command for realizing interactivity is multiplexed together with the packets and packs.

Data multiplexing in the MPEG system is characterized in that, while each data to be multiplexed forms a bit string based on the decoding order, data to be multiplexed, i.e., video data, audio data, and subtitle data are not necessarily arranged in order of reproduction, i.e., decoding order. This is attributable to the fact that a decoder model for MPEG system streams (generally referred to as a "System Target Decoder" or an "STD" (refer to FIG. 3(D))) has decoder buffers corresponding to the respective elementary streams obtained by demultiplexing the multiplexed data, and such demultiplexed data are temporarily stored in the respective decoder buffers until the time of decoding. The size of decoder buffers specified by the DVD-Video standard differs on an elementary stream basis. The size of the buffer for video data is 232 KB, the size of the buffer for audio data is 4 KB, and the size of the buffer for subtitle data is 52 KB.

In other words, the subtitle data that is multiplexed together with the video data is not necessarily decoded or reproduced at the same timing as that at which the video data is decoded and reproduced.

DISCLOSURE OF INVENTION

Conventionally, there are four audio codec standards employed for DVDs: "Dolby Digital (AC-3)", "MPEG Audio", "LPCM", and "DTS". "DTS" is a player option function, and therefore some of the DVD players are equipped with a DTS decoder, while the others are not. Furthermore, some of the DVD players have a function of supporting DTS as a function of outputting digital data to an AV amplifier, while the others do not.

A DVD player having the DTS digital data output function outputs data compliant with a digital I/F standard called Sony/Philips Digital Interconnect Format (SPDIF; its consumer version is defined by IEC60958-3), to an AV amplifier compliant with the same standard.

However, SPDIF supports only a bandwidth of up to 1.5 Mbps, and thus does not support "DTS++ (lossless compression)", which is an extension codec standard of "DTS", requiring a bandwidth of approximately up to 20 Mbps. Therefore, even if a next generation HD DVD format (BD format) supports "DTS++", it is not possible to output a DTS++ stream to an AV amplifier compliant with the SPDIF standard.

The present invention has been conceived in view of the above problem, and it is an object of the present invention to provide an information storage medium in which a stream including basic data and extension data for next generation is stored, so as to allow a decoder capable of decoding only basic data to process such a stream including basic data and extension data. Another object of the present invention is to provide a TS packet judgment apparatus and a data reproduction apparatus that process such a stream stored on the information storage medium of the present invention.

In order to achieve the above objects, the information storage medium of the present invention is a medium on which an audio stream including a plurality of TS packets is stored, wherein each of the TS packets includes one of (a) a first packet including basic data, and (b) a second packet including extension data related to the basic data, the basic data is data capable of being decoded into complete sound without requiring the extension data, and the extension data is data intended for improving the quality of audio generated from the basic data, and a header of each of the TS packets includes an identifier indicating whether the TS packet includes the first packet or the second packet.

The identifier may be included in a transport_priority field located at a specified position in the header.

The extension data is, for example, data which is not included in the basic data and whose sampling rate is higher than a sampling rate of the basic data.

The TS packet judgment apparatus of the present invention includes: an obtainment unit that obtains the identifier of each of the TS packets stored on the information storage medium of the present invention; and a judgment unit that judges, using the identifier, whether the TS packet includes the first packet or the second packet.

The data reproduction apparatus of the present invention includes: the TS packet judgment apparatus of the present invention; a discarding unit that discards a TS packet, included in the audio stream, which includes the second packet; and a decoding unit that decodes only the first packet.

The present invention can be embodied as a method that includes, as its steps, the characteristic constituent elements included in the TS packet judgment apparatus of the present invention, and as a program that causes a computer to execute such steps. The present invention can also be embodied as a data reproduction method that includes, as its step, the characteristic constituent elements included in the data reproduction apparatus of the present invention, and as a program that causes a computer to execute such steps. Each of the above programs can be distributed on a storage medium such as a CD-ROM, and over a transmission medium such as a communication network.

As is obvious from the above, the present invention provides an information storage medium in which a stream including basic data and extension data for next generation is stored, so as to allow a decoder capable of decoding only basic data to process such a stream including basic data and extension data. The present invention further provides a TS packet judgment apparatus and a data reproduction apparatus that process such a stream stored on the information storage medium of the present invention.

In other words, the present invention produces the effect of making it possible for a legacy digital I/F to output audio data from a storage medium in a conventional manner, even in the case where such audio data is stored according to a new audio codec which is beyond the bandwidth such legacy digital I/F can support.

This application claims the benefit of U.S. Provisional Application No. 60/616,214, filed Oct. 7, 2004, the contents of which are herein incorporated by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 3(A) shows data such as video data, audio data, and subtitle data, FIG. 3(B) shows packetization and packing of each of such data, FIG. 3(C) shows each of packetized and packed data, and FIG. 3(D) shows a decoder model for an MPEG system stream;

FIG. 24 is a diagram showing a list of system parameters;

BEST MODE FOR CARRYING OUT THE INVENTION

The following describes the best modes of the present invention with reference to the drawings.

Related Embodiment

<Logical Data Structure on Disc>

Figure 1:
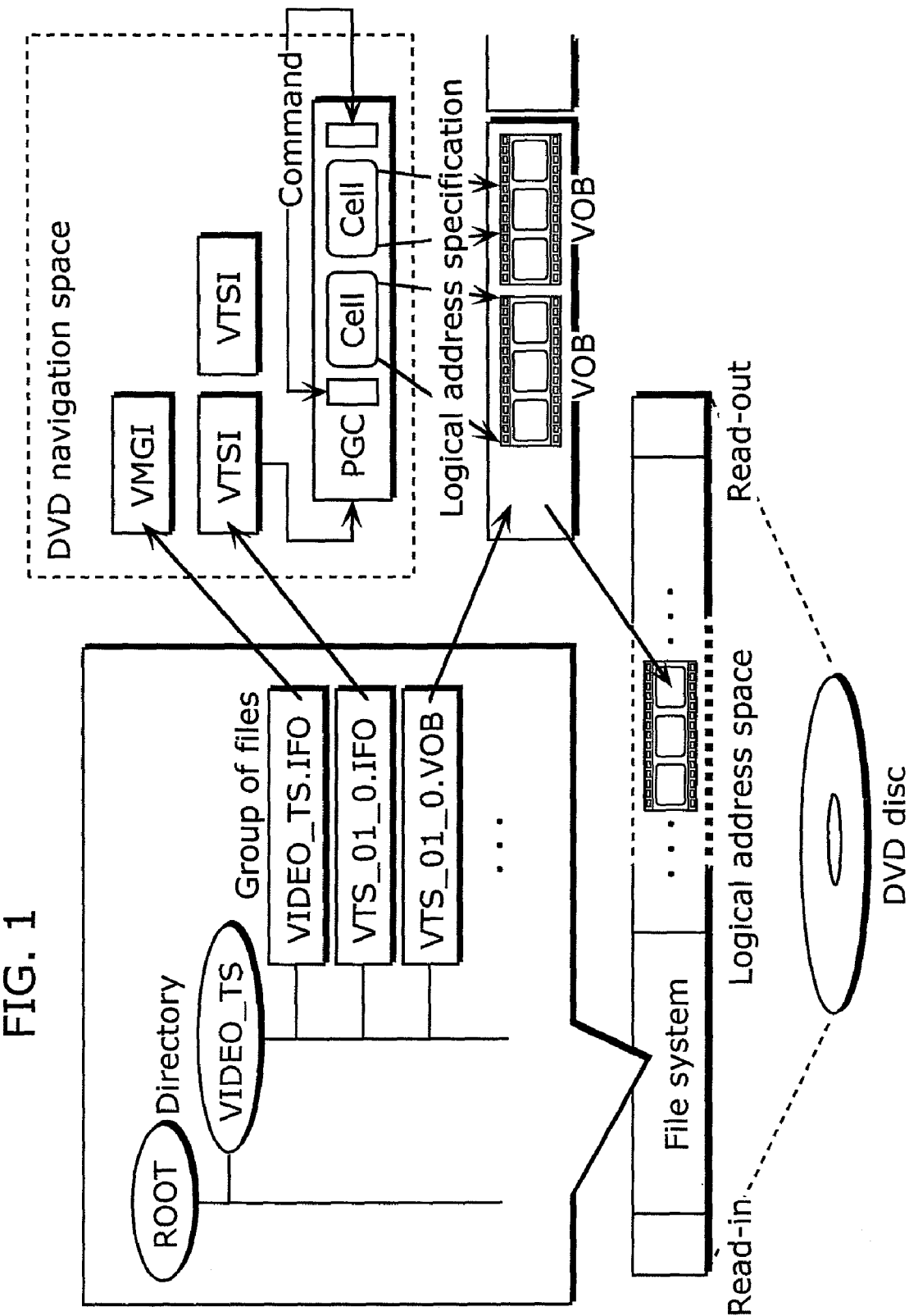
FIG. 1 is a diagram showing the structure of a DVD.
Figure 2:
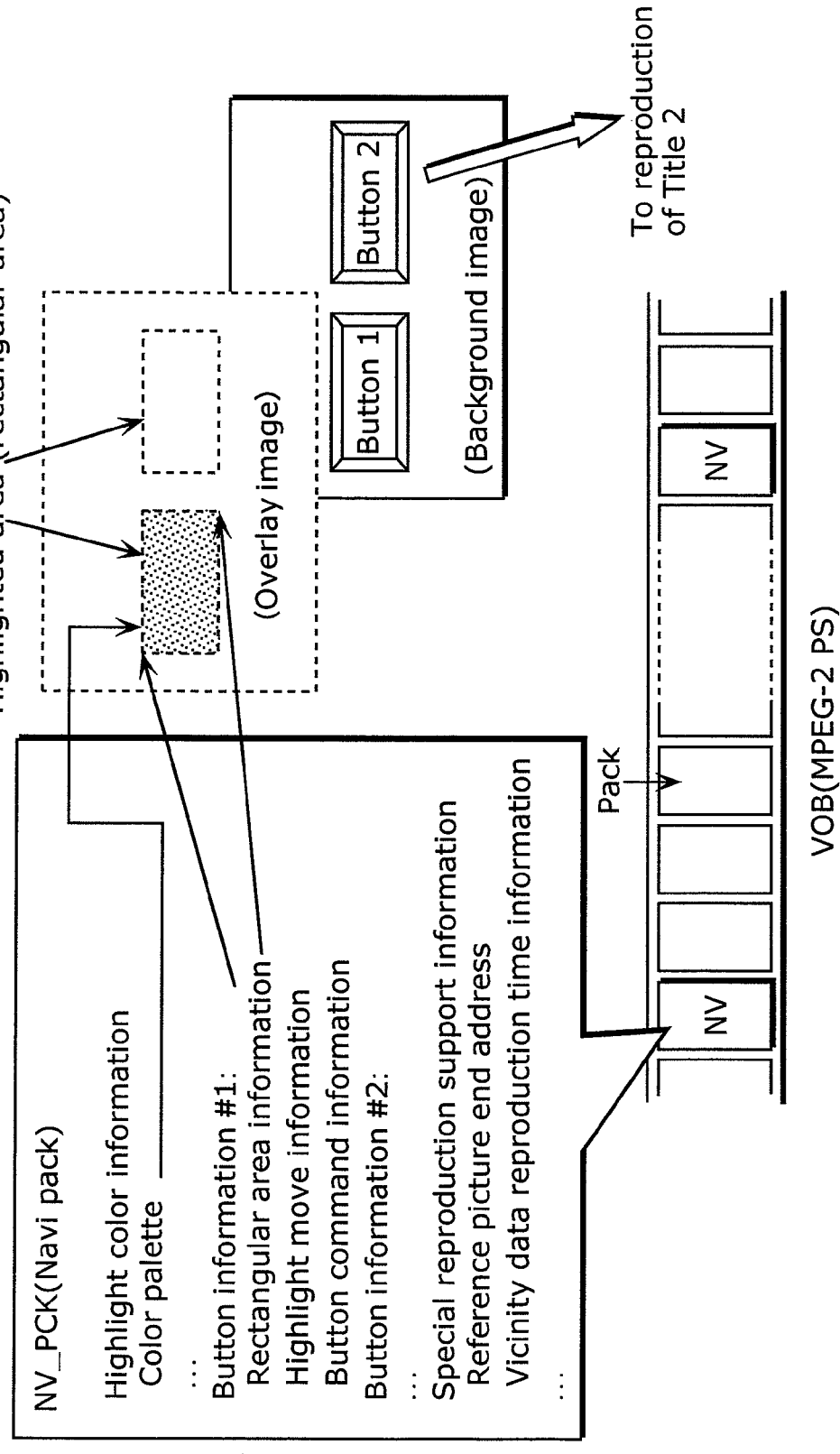
FIG. 2 is a diagram for describing navigation information.
Figure 3:
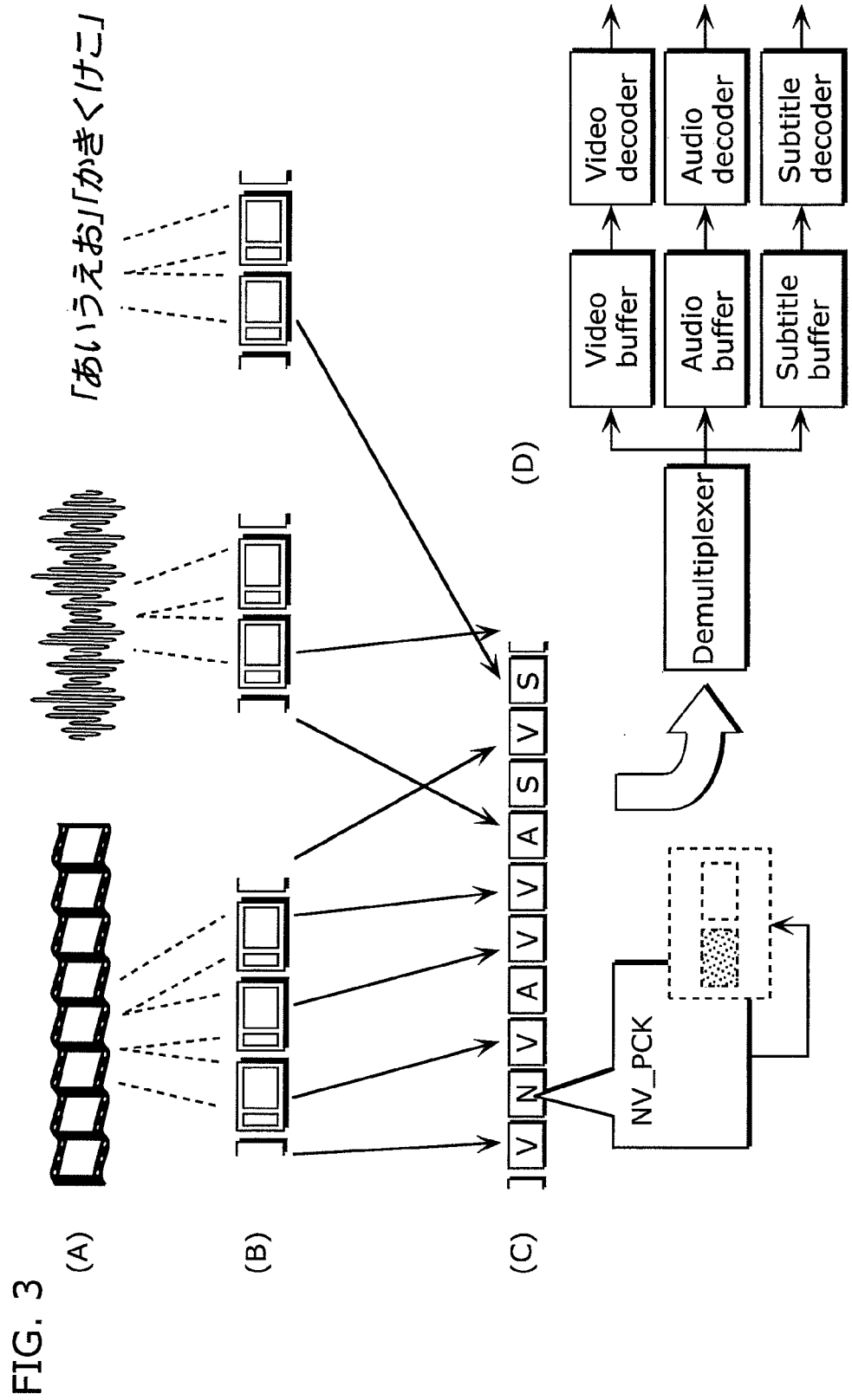
FIG. 3 is a conceptual diagram showing a VOB being a DVD stream, where
Figure 4:
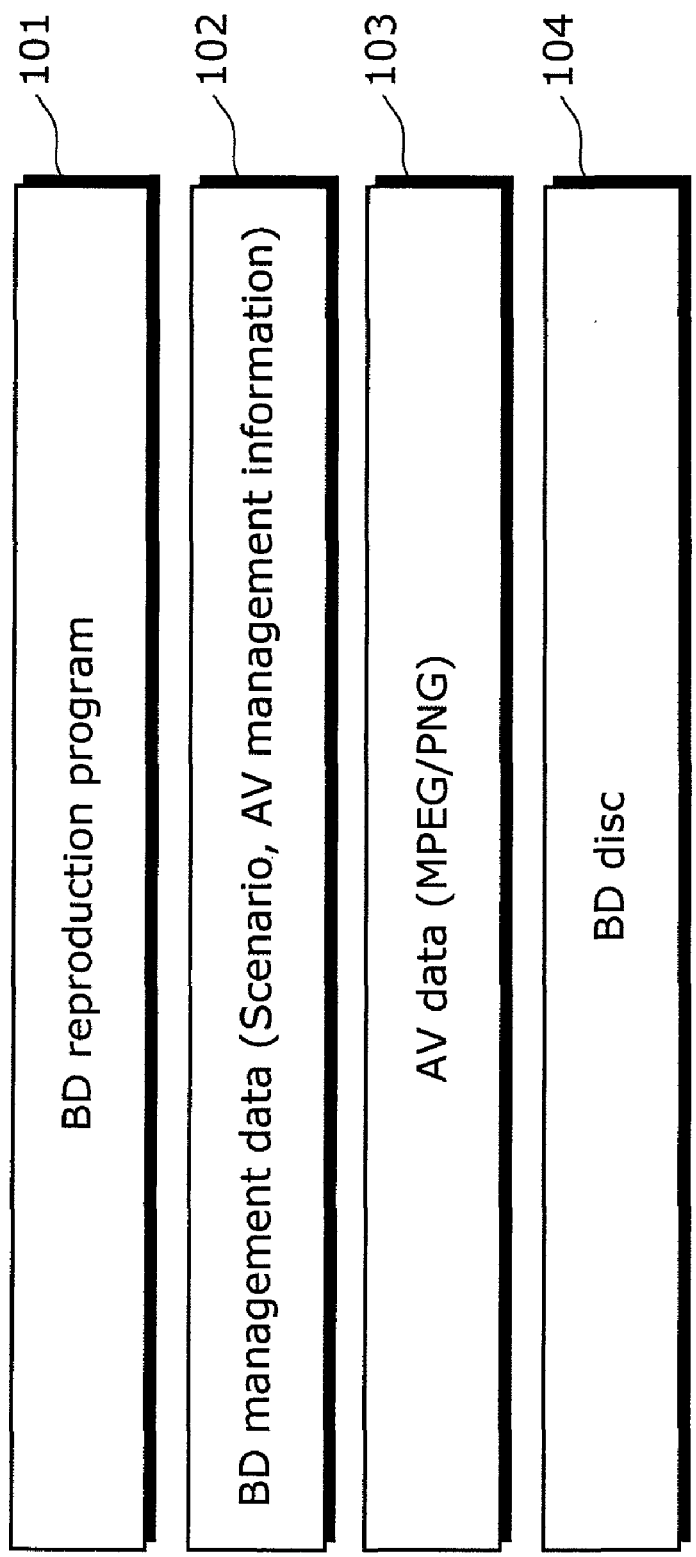
FIG. 4 is a diagram showing the structure of a next generation DVD.

FIG. 4 is a diagram showing the structure of a next generation DVD (hereinafter referred to as a "BD"), and more particularly showing a BD disc 104 being a disc medium, as well as the structure of data 101, 102, and 103 stored on the disc 104. Stored on the BD disc 104 are: AV data 103; BD management information 102 including AV data management information, an AV reproduction sequence, and the like; and a BD reproduction program 101 for realizing interactivity. For the sake of illustrations, the present embodiment assumes that AV application data for reproducing the AV contents of a movie is stored on the BD disc 104. Note, however, that the BD disc 104 may be used for other purposes.

Figure 5:
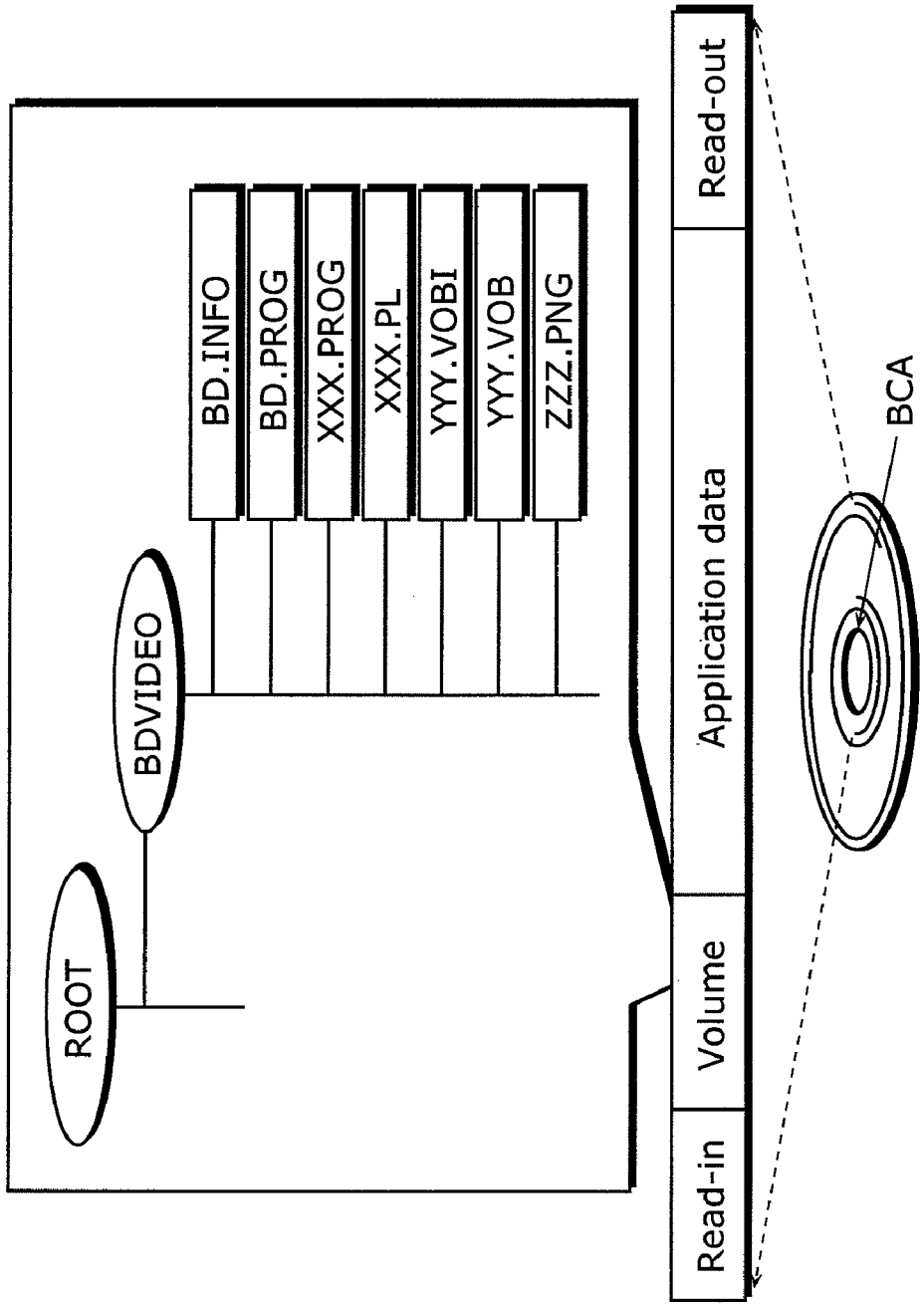
FIG. 5 is a diagram showing the structures of directories and files of logical data stored on a BD disc.

FIG. 5 is a diagram showing the structures of directories and files of the logical data stored on the BD disc. As in the case of other optical discs such as DVDs and CDs, the BD disc has storage areas that are spirally formed in a direction from the inner radius toward the outer radius, as well as a logical address space for storing logical data in between the read-in area at the inner radius and the read-out area at the outer radius. The BD disc includes, at the innermost area of the disc, a special area called a Burst Cutting Area (BCA), from which data can be read out only by a drive. Data stored in this area cannot be read out even by use of the application data. Therefore, this area is sometimes used, for example, for copyright protection technology or the like.

In the logical address space, file system information (volume) is stored at the top of the space, and application data such as video data is stored in the subsequent areas. The file system, which is a file system compliant with UDF and ISO9660 as described in "Background Art", is a system for reading the stored logical data using directory and file structures, as is done in ordinary PCs.

According to the structures of the directories and files on the BD disc of the present embodiment, a BDVIDEO directory is located immediately below the root directory (ROOT). The BDVIDEO directory is a directory storing data such as AV contents and management information (the data 101, 102, and 103 shown in FIG. 4) stored on the BD.

Seven types of files described below are stored under the BDVIDEO directory.

BD. INFO file (this filename is fixed)

The "BD. INFO" file, which forms a part of the "BD management information", is a file storing information related to the entire BD disc. This is the first file to be read out by a BD player.

BD. PROG file (this filename is fixed)

The "BD. PROG" file, which forms a part of the "BD reproduction program", is a file storing reproduction control information related to the entire BD disc.

XXX. PL file (where "XXX" is variable, and the extension "PL" is fixed)

The "XXX. PL" file, which forms a part of the "BD management information", is a file storing playlist information being a scenario (reproduction sequence). There exists one file for each playlist.

XXX. PROG file (where "XXX" is variable, and the extension "PL" is fixed)

The "XXX. PROG" file, which forms a part of the "BD reproduction program", is a file storing reproduction control information for each playlist as described above. The playlist corresponding to the "XXX. PROG" file is a playlist with the matching file body name ("XXX").

YYY. VOB file (where "YYY" is variable, and the extension "VOB" is fixed)

The "YYY. VOB" file, which forms a part of the "AV data", is a file storing a VOB (such a VOB as described in "BACKGROUND OF THE INVENTION"). There exists one file for each VOB.

YYY. VOBI file (where "YYY" is variable, and the extension "VOBI" is fixed)

The "YYY. VOBI" file, which forms a part of the "BD management information", is a file storing stream management information related to a VOB being AV data. The VOB corresponding to the "YYY. VOBI" file is a VOB with the matching file body name ("YYY").

ZZZ. PNG file (where "ZZZ" is variable, and the extension "PNG" is fixed)

The "ZZZ. PNG" file, which forms a part of the "AV data", is a file storing image data PNG (which is an image format standardized by the W3C, and is pronounced "ping") for constructing subtitles and a menu. There exists one file for each PNG image.

<Structure of Player>

Figure 6:
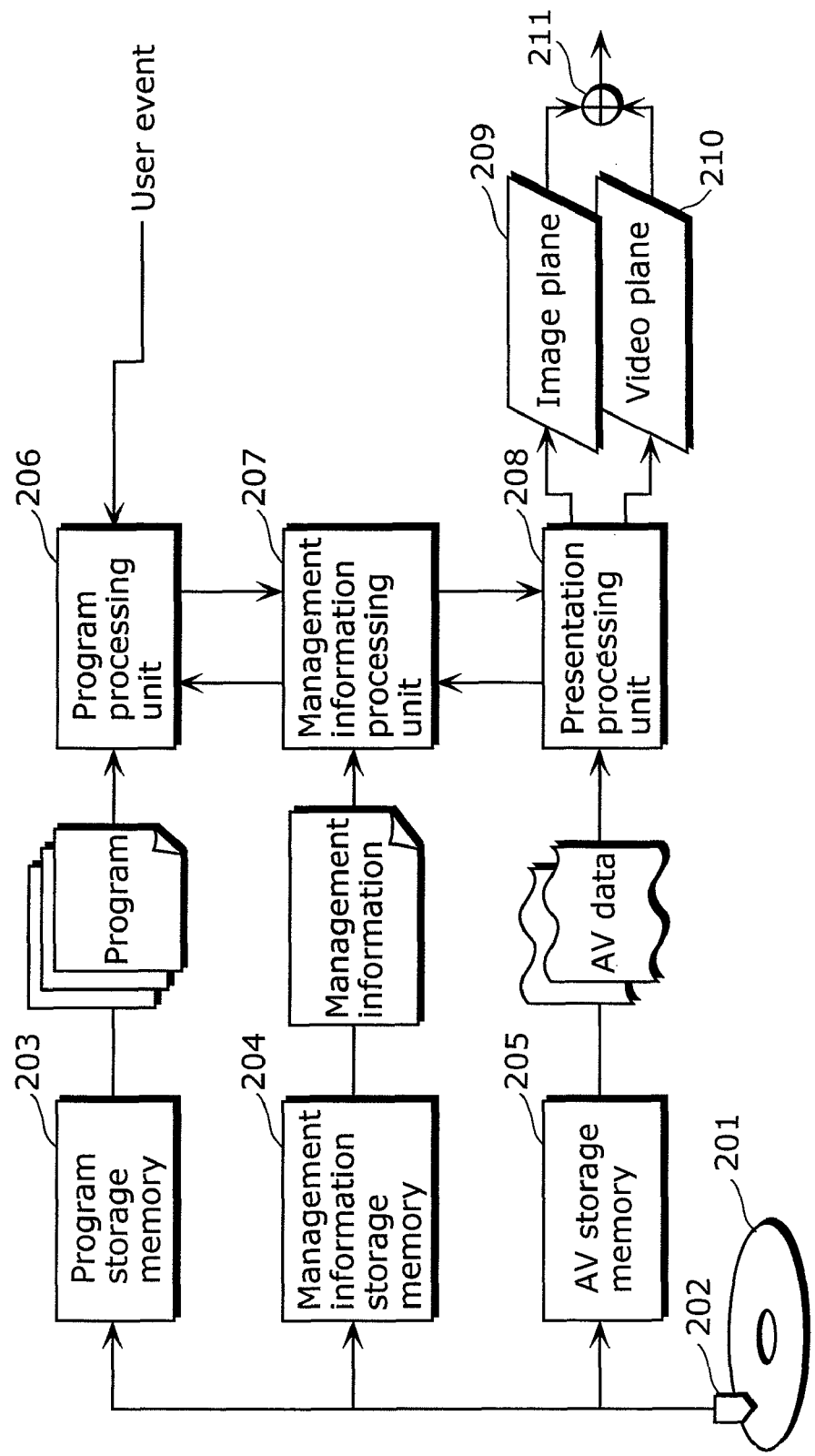
FIG. 6 is a block diagram showing an overall function of a player.
Figure 7:
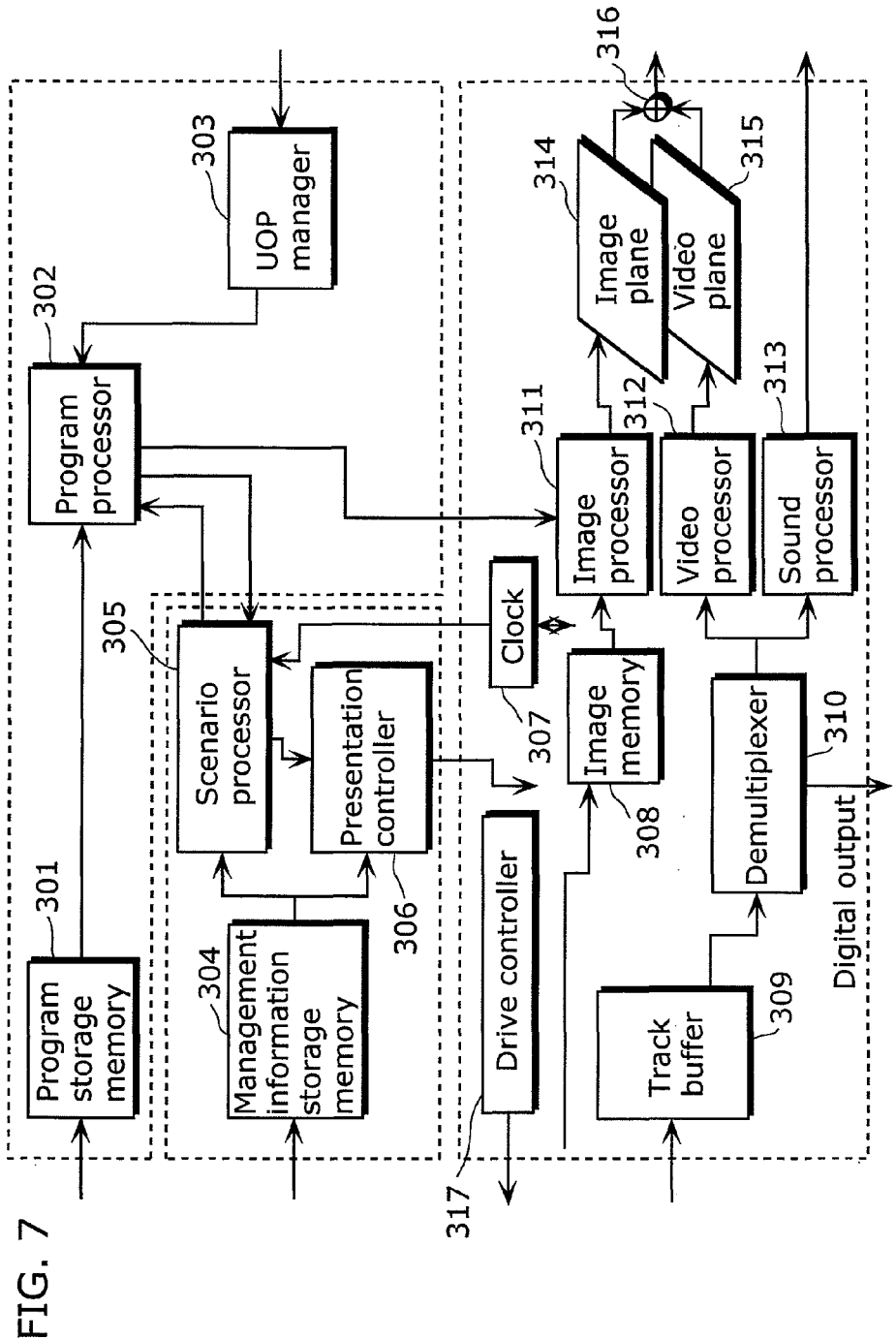
FIG. 7 is a block diagram showing a detailed structure of the player.

Next, referring to FIG. 6 and FIG. 7, a description is given of a player that reproduces the above-descried BD disc.

FIG. 6 is a block diagram showing an overall function of the player.

Data stored on a BD disc 201 is read out via an optical pick-up 202. Each data read out is transferred to a dedicated memory depending on the type of such data. More specifically, the BD reproduction program ("BD. PROG" file or "XXX. PROG" file) is transferred to a program storage memory 203. The BD management information ("BD. INFO" file, "XXX. PL" file, or "YYY. VOBI" file) is transferred to a management information storage memory 204. The AV data ("YYY. VOB" file or "ZZZ. PNG" file) is transferred to an AV storage memory 205.

The BD reproduction program stored in the program storage memory 203 is processed by a program processing unit 206. The BD management information stored in the management information storage memory 204 is processed by a management information processing unit 207. The AV data stored in the AV storage memory 205 is processed by a presentation processing unit 208.

The program processing unit 206 receives, from the management information processing unit 207, information about a playlist to be reproduced and event information such as timing for executing a program, and then executes the program. The program can dynamically change the playlist. By the program processing unit 206 sending, to the management information processing unit 207, an instruction to reproduce a playlist, the playlist is changed dynamically. The program processing unit 206 receives an event from the user, i.e., a request from a remote control key, and executes a program corresponding to such event (request), if there is any.

The management information processing unit 207, in response to an instruction from the program processing unit 206, analyzes the corresponding playlist and management information of a VOB corresponding to the playlist, and instructs the presentation processing unit 208 to reproduce the target AV data. Furthermore, the management information processing unit 207 receives reference time information from the presentation processing unit 208, and instructs the presentation processing unit 208 to end the reproduction of the AV data based on such reference time information, as well as generating an event, used to give an instruction to the program processing unit 206, indicating the timing for executing the program.

The presentation processing unit 208, which has decoders corresponding respectively to video, audio, and subtitles/images (still images), decodes and outputs the AV data according to an instruction from the management information processing unit 207. The decoded video data and subtitles/images are rendered onto their respective dedicated planes, i.e., a video plane 210 and an image plane 209. The respective images rendered onto the video plane 210 and image plane 209 are composed by a composition processing unit 211, and the composed images are outputted to a display device such as a television.

The BD player, as has been described with reference to FIG. 6, is comprised of the constituent elements corresponding to the respective structures of the data stored on the BD disc.

FIG. 7 is a block diagram showing a detailed structure of the above-described player. In FIG. 7, the AV storage memory 205 is illustrated as an image memory 308 and a track buffer 309. The program processing unit 206 is illustrated as a program processor 302 and an UOP manager 303. The management information processing unit 207 is illustrated as a scenario processor 305 and a presentation controller 306. The presentation processing unit 208 is illustrated as a clock 307, a demultiplexer 310, an image processor 311, a video processor 312, and a sound processor 313.

The VOB data (MPEG stream) and image data (PNG) read from the BD disc 201 are stored respectively into the track buffer 309 and the image memory 308. The demultiplexer 310 demultiplexes the VOB data stored in the track buffer 309 into video data and audio data based on the time indicated by the clock 307, and sends the video data to the video processor 312 and the audio data to the sound processor 313. The video processor 312 and the sound processor 313 are each made up of a decoder buffer and a decoder, as specified by the M PEG system standard. In other words, the video data and audio data inputted from the demultiplexer 310 are temporarily stored in the respective decoder buffers and decoded by the respective corresponding decoders according to the time indicated by the clock 307.

The PNG stored in the image memory 308 is processed using two methods described below.

First, in the case where the image data is subtitle data, the presentation controller 306 gives an instruction about decoding timing. Upon receipt of time information from the clock 307, the scenario processor 305 instructs, when it is the time to start the display of the subtitles, the presentation controller 306 to display the subtitles so that the subtitles are displayed in an appropriate manner. Similarly, the scenario processor 305 instructs, when it is the time to end the display of the subtitles, the presentation controller 306 to stop displaying the subtitles, based on time information from the clock 307. The image processor 311, upon receipt of an instruction from the presentation controller 306 to decode/display the image data, reads out the corresponding PNG data from the image memory 308, decodes it, and renders the decoded data onto the image plane 314.

Second, in the case where the image data is menu data, the program processor 302 gives an instruction about decoding timing. Timing at which the program processor 302 gives an instruction to decode the image data all depends on BD program processed by the program processor 302, and therefore it is not simply determined.

As has been described with reference to FIG. 6, the image data and video data are rendered respectively onto the image plane 314 and the video plane 315 after being decoded, and are outputted after being composed by the composition processing unit 316.

The management information (scenario information and AV management information) read from the BD disc 201 is stored into the management information storage memory 304. After this, the scenario information ("BD. INFO" file and "XXX. PL" file) is read out by the scenario processor 305, and the AV management information ("YYY. VOBI" file) is read out by the presentation controller 306.

The scenario processor 305 analyzes the information in the playlist, and notifies the presentation controller 306 of a VOB indicated by the corresponding playlist and the reproduction position of such VOB. The presentation controller 306 analyzes the management information ("YYY. VOBI" file) of such target VOB, and instructs the drive controller 317 to read out the target VOB.

According to the instruction from the presentation controller 306, the drive controller 317 reads out the target AV data by moving the optical pick-up. The AV data read out is stored into the image memory 308 or the track buffer 309, as described above.

The scenario processor 305 monitors the time indicated by the clock 307, and outputs, to the program processor 302, an event at the timing set in the management information.

The BD program ("BD. PROG" file or "XXX. PROG" file) stored on the program storage memory 301 is processed by the program processor 302. The program processor 302 processes the BD program in the case where an event is sent from the scenario processor 305 or where an event is sent from the UOP manager 303. The UOP manager 303 generates an event for the program processor 302 in the case where a request is sent from the user using a remote control key.

<Application Space>

Figure 8:
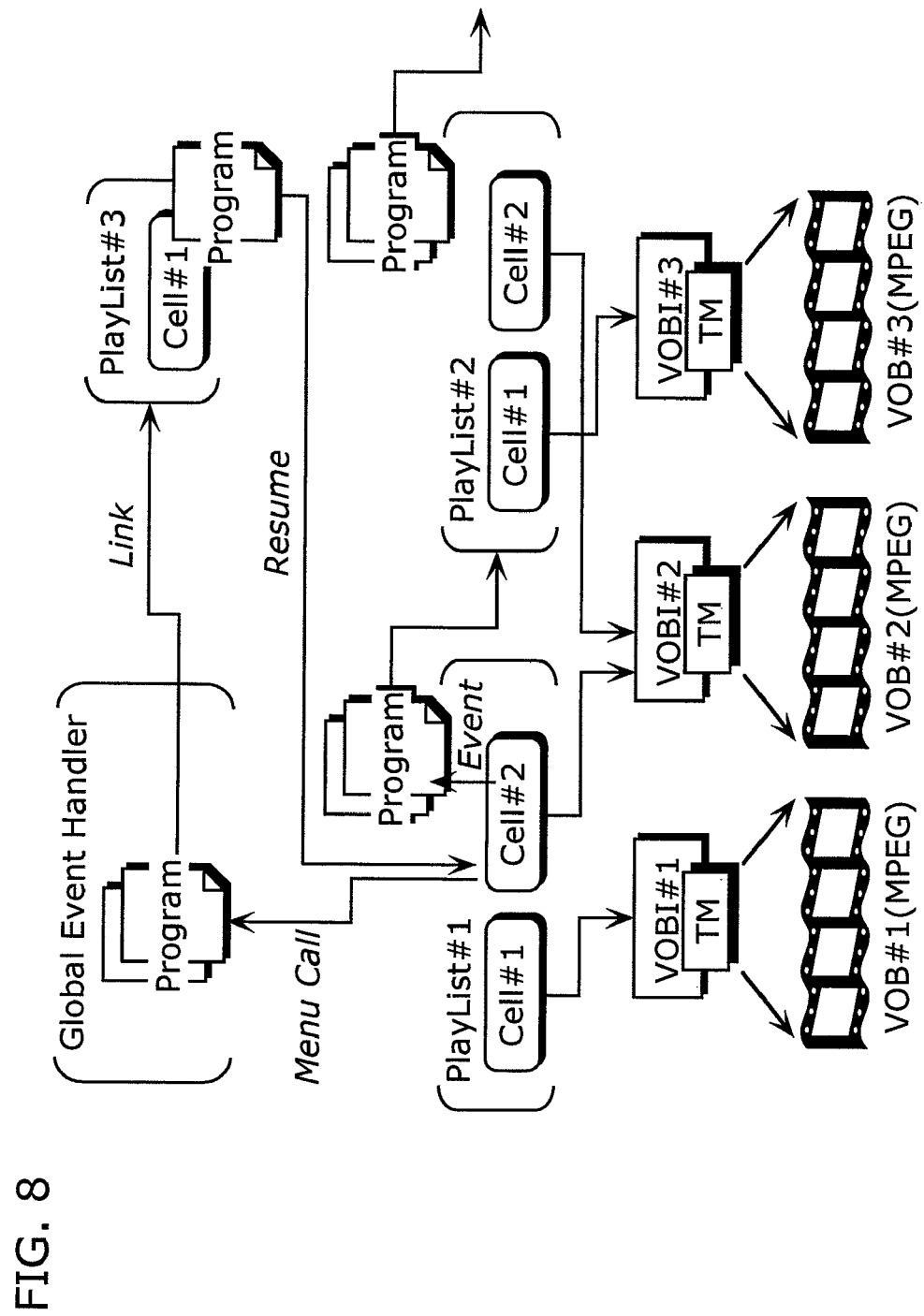
FIG. 8 is a diagram showing an application space on the BD.

FIG. 8 is a diagram showing an application space on the BD.

In the application space on the BD, a playlist (PLayList) serves as a unit of reproduction. Each playlist, which is a concatenation of cells (Cell), includes a static scenario being a reproduction sequence determined by the order of cell concatenation and a dynamic scenario described by the program. Unless the program makes a dynamic change in a scenario, the cells in the playlist are reproduced in order of concatenation. The completion of the reproduction of all the cells marks the completion of the reproduction of such playlist. The program can include a description indicating that the reproduction order of the cells is to be changed. Furthermore, the program can change reproduction targets depending on user selection or player status. A typical example of this is menu. In the BD, a menu can be defined as a scenario to be reproduced according to a user selection, and the playlist can be dynamically changed by the program.

The program here refers to an event handler that is executed by a time event or a user event.

Time events are events that are generated based on time information in a playlist. An example of time events is an event sent from the scenario processor 305 to the program processor 302 that has been described with reference to FIG. 7. When a time event is issued, the program processor 302 executes an event handler associated with the corresponding identifier (ID). As has been described above, a program to be executed gives an instruction to reproduce another cell in the playlist. For example, the program can stop the reproduction of the current cell in the playlist to reproduce another cell in the playlist.

User events are events that are generated by remote key operations by the user, and are categorized roughly into two types.

User events of a first type are menu selection events that are generated by operating cursor keys (the Up/Down/Right/Left key or the "Determination" key). Event handlers corresponding to menu selection events are effective only during a limited period indicated in a playlist (the validity period of each event handler is set as one of the information in the playlist). When the Up/Down/Right/Left key or the "Determination" key on the remote control is pressed, a search is made for an effective event handler. In the case where there is an effective event handler, such event handler is executed, whereas in the case where there is no effective event handler, this menu selection event is ignored.

User events of a second type are menu call events that are generated by operating the "Menu" key. When a menu call event is generated, a global event handler is called. The global event handler is an event handler that is always effective without depending on any playlists. Using this function, it is possible to implement a DVD menu call (e.g., a function of calling audio data or subtitle data during the reproduction of a title, and resuming the reproduction of the title at the point of suspension after a change is made in the audio data or subtitle data).

A cell (Cell), which is a unit constituting a static scenario in a playlist, represents the whole or a part of reproduction segments in a VOB (MPEG stream). Each cell includes the reproduction segments in a VOB as information about reproduction start time and reproduction end time. VOB management information (VOBI), which is paired with an individual VOB, includes a time map (TM) that is table information indicating storage addresses corresponding to data reproduction times. The use of a time map makes it possible to derive the read-start address and the read-end address within a VOB (i.e., the target "YYY. VOB" file) based on the above-described reproduction start time and reproduction end time of the VOB. Time map is described in detail later.

<Details about VOB>

Figure 9:
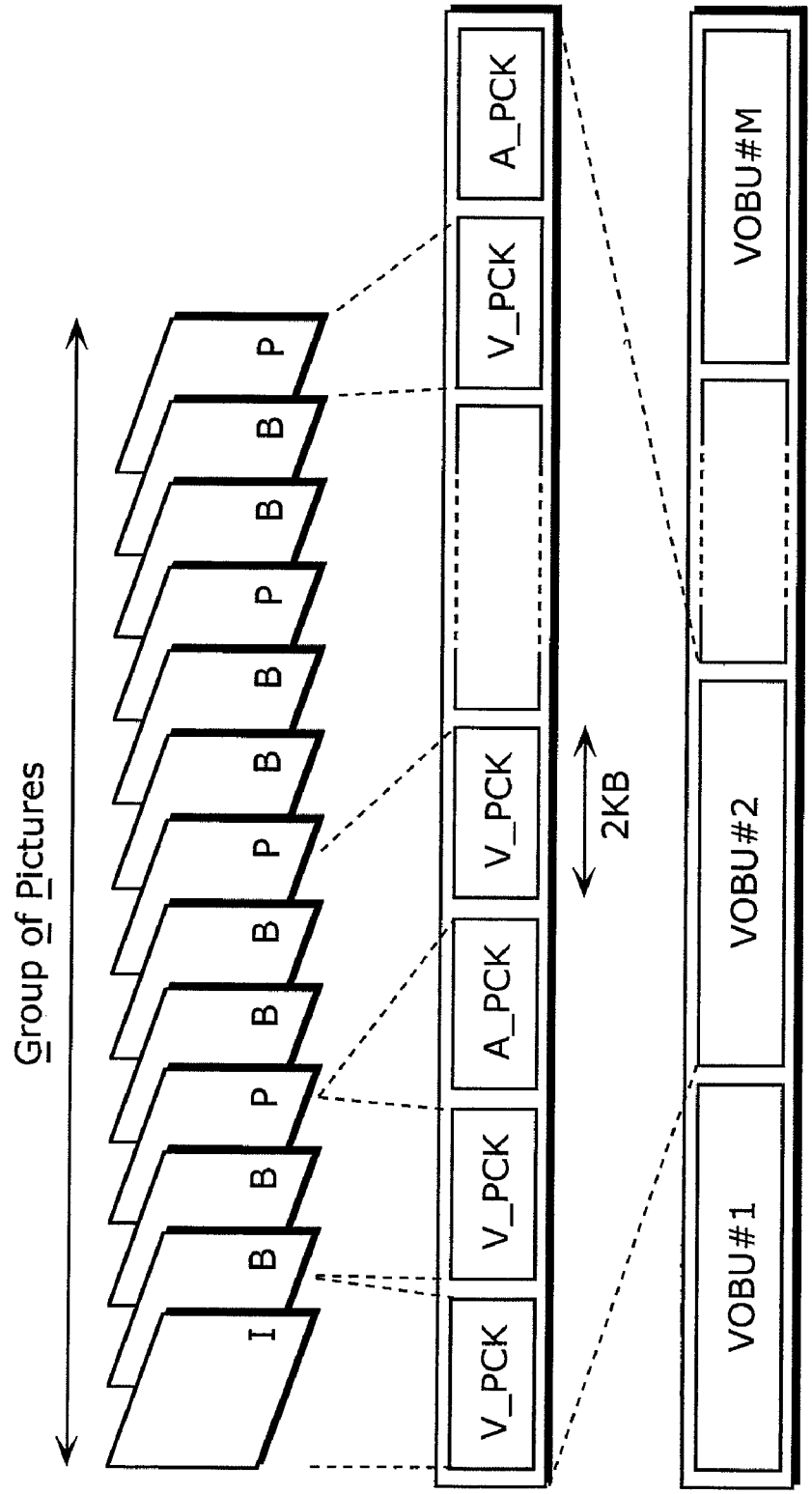
FIG. 9 is a diagram showing the structure of an MPEG stream (VOB)

FIG. 9 is a diagram showing the structure of an MPEG stream (VOB) in the present embodiment.

As shown in FIG. 9, a VOB is made up of plural Video Object Units (VOBUs). A VOBU serves as one unit of reproduction in a multiplexed stream that includes audio data in addition to picture data in a Group of Pictures (GOP) in an MPEG video stream. The reproduction duration of a VOBU is in the range between 0.4 seconds and 1.0 second, and normally about 0.5 seconds. In other words, one GOP includes about 15 frames in many cases (in the case of NTSC).

Each VOBU includes video packs (V_PCK) and audio packs (A_PCK). The size of each pack, which is equivalent to one sector, is 2 KB in the present embodiment.

Figure 10:
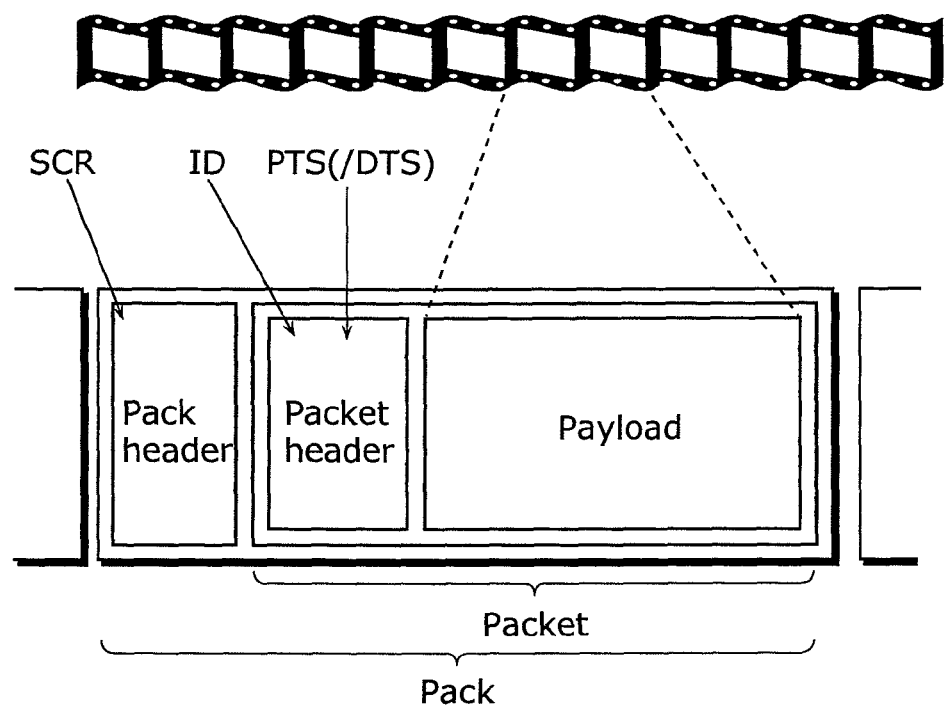
FIG. 10 is a diagram showing the structure of each pack.

FIG. 10 is a diagram showing the structure of each pack.

As shown in FIG. 10, each elementary data, such as video data and audio data, is stored into a data storage area called a PES Packet Payload (payload) in a PES Packet (packet) sequentially from the top. The payload, when added with a PES Packet Header (packet header), makes up one PES Packet (packet). Stored in the packet header are: a stream id (ID) that identifies the stream to which the data stored in the payload corresponds; and a Decoding Time Stamp (DTS) and a Presentation Time Stamp (PTS) which are time stamps respectively indicating information about the time to decode the payload and the time to present the payload. Not all packet headers include a PTS and a DTS, and whether a PTS and a DTS should be stored in a packet header is determined according to a rule of the MPEG standard. Details of such rule are described in the MPEG system (ISO/IEC 13818-1) standard, and therefore no description is given for them.

The packet, when further added with a Pack Header (header), makes up a pack. Stored in such header is a System Clock Reference (SCR) which is a time stamp indicating when such pack passes through the demultiplexer and inputted to a decoder buffer corresponding to an elementary stream.

<Interleaved Storage of VOB>

Figure 11:
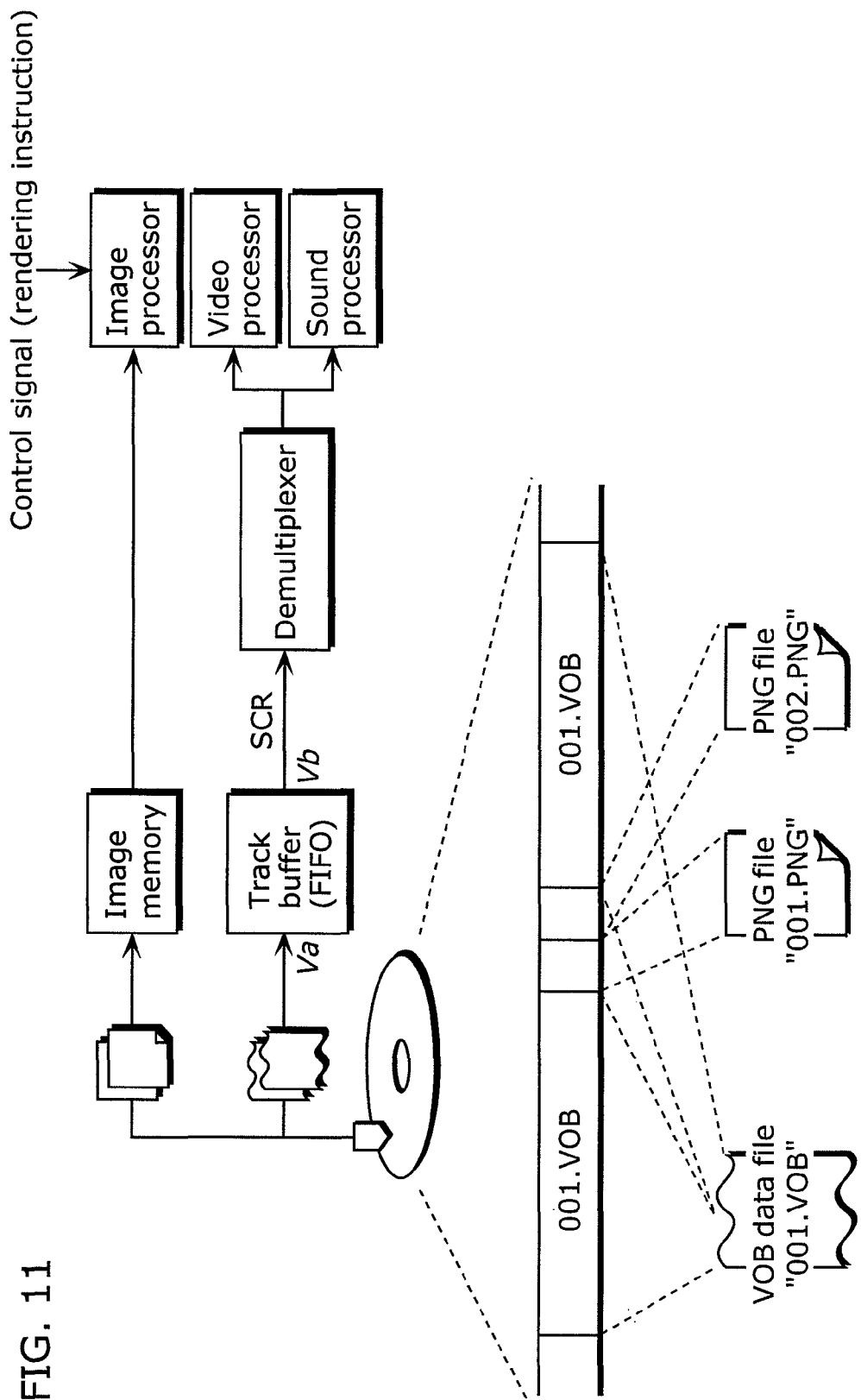
FIG. 11 is a diagram for describing interleaved storage of a VOB file and PNG files on the BD disc.
Figure 12:
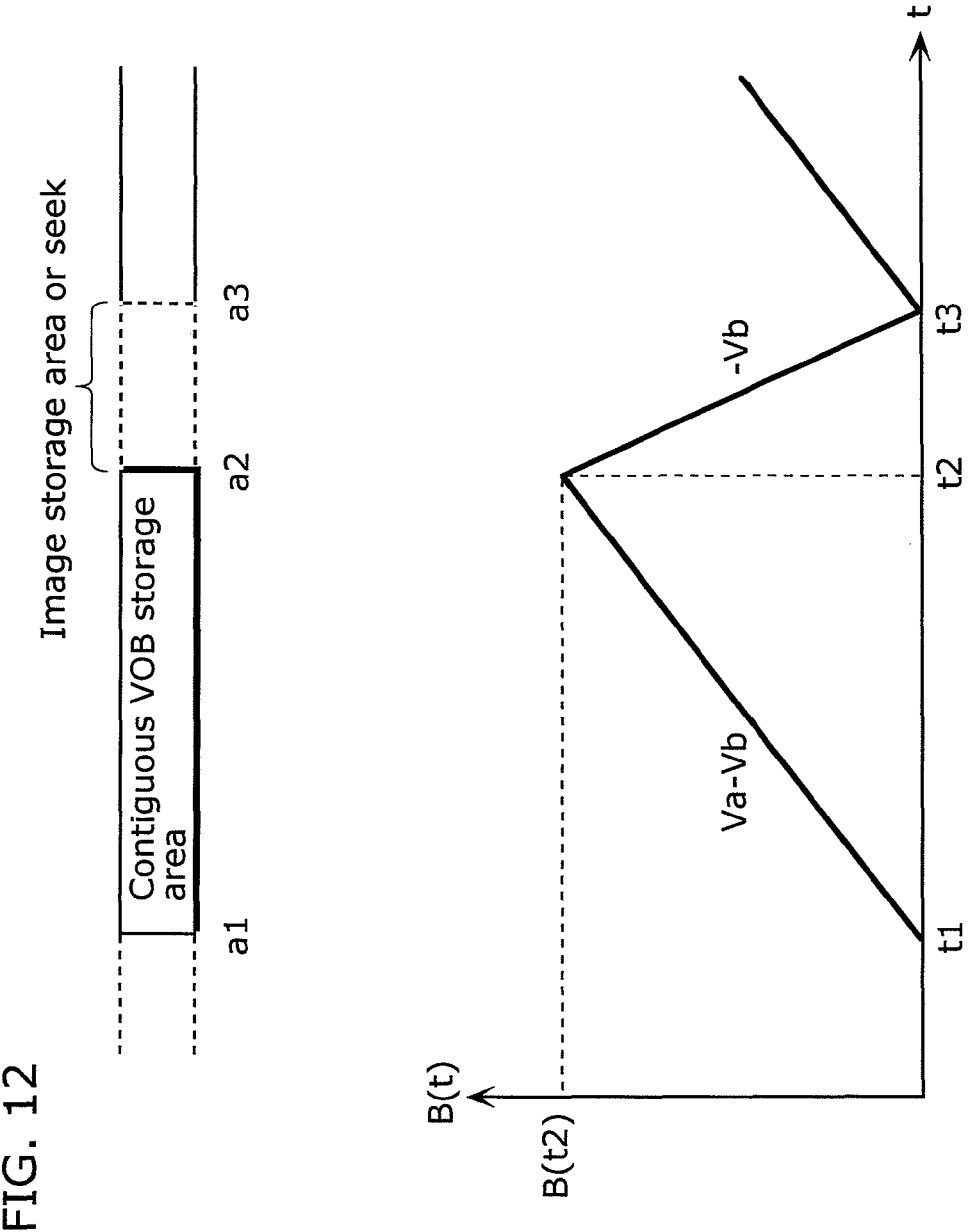
FIG. 12 is a diagram for describing a model for continuous supply of VOB data.

Next, referring to FIG. 11 and FIG. 12, a description is given of interleaved storage of a VOB file.

The upper part of FIG. 11 shows a part of the structure of the above-described player. As shown in FIG. 11, a VOB on the BD disc, i.e., an MPEG stream, is inputted to the track buffer through the optical pick-up. The PNG on the BD disc, i.e., image data, is inputted to the image memory through the optical pick-up.

The track buffer is a FIFO buffer, and each VOB data inputted to the track buffer is sent to the demultiplexer in order of input. At this time, each pack is extracted from the track buffer according to the SCR described above, and then sent to the video processor or the sound processor via the demultiplexer. Meanwhile, regarding the image data inputted to the image memory, which image to be rendered is instructed by the presentation controller. In the case where image data used for rendering is subtitle image data, such image data is deleted from the image memory upon being used. On the other hand, in the case where image data used for rendering is menu image data, such image data remains stored in the image memory while the rendering of the menu is taking place. Menu rendering depends on user operation, and therefore when a part of the menu is displayed again or replaced by another image according to a user operation, the decoding of the image data to be displayed again is facilitated by allowing the menu image data to remain stored in the image memory while the rendering of the menu is taking place.

The bottom part of FIG. 11 shows the interleaved storage of a VOB file and PNG files on the BD disc. In general, on a ROM such as a CD-ROM and a DVD-ROM, AV data made up of a series of reproduction units to be sequentially reproduced, are stored contiguously. As long as the data are stored contiguously, the drive reads out the data sequentially and gives the read data to the respective decoders. However, in the case where such contiguous data are stored on the disc in a discrete manner, the drive needs to seek individual contiguous segments, and thus there is a possibility that data supply stops since data reading stops while the seek is taking place. In order to prevent this, AV data made up of a series of reproduction units to be sequentially reproduced, are contiguously stored on a ROM. It is preferable that data in a VOB file are stored in contiguous areas on the BD. Such data as subtitle data which is reproduced in synchronization with video data stored in a VOB, needs to be read from the BD by some method, as in the case of a VOB file.

The methods of reading out subtitle data include a method of collectively reading out the whole subtitle image data (PNG files) before starting the reproduction of a VOB. However, it is not realistic to use this method, since a large capacity memory is required.

In view of this, the present embodiment employs a method in which a VOB file is divided into several blocks and stored by being interleaved with image data. The bottom part of FIG. 11 illustrates such interleaved storage.

By appropriately placing divided VOB data and image data in an interleaved manner, it becomes possible to store image data into the image memory at the required timing without having to use a large capacity temporary memory as described above. Note that the reading of VOB data is suspended during the reading of image data.

FIG. 12 is a diagram for describing a model for continuous supply of VOB data using the track buffer.

As has been described above, VOB data is accumulated into the track buffer once. Taking that the rate at which data is inputted to the track buffer is Va, and the rate at which data is outputted from the track buffer is Vb, the amount of data accumulated in the track buffer keeps increasing, when the difference between Va and Vb is Va>Vb, as long as data is continuously read from the BD disc.

Suppose, as shown in the upper part of FIG. 12, that a contiguous VOB storage area starts with the logical address "a1" and ends with the logical address "a2". Also suppose that image data is stored in an area between the logical addresses "a2" and "a3", and no VOB data is stored in such area.

The bottom part of FIG. 12 shows changes in the amount of data accumulated in the track buffer. The lateral axis indicates time, and the vertical axis indicates the amount of data accumulated in the track buffer. Time "t1" indicates the time at which the reading of data starts, the data being stored in a location specified by the logical address "a1", which is the start point of the contiguous VOB storage area. At the time "t1" and thereafter, data is to be stored into the track buffer at the rate of (Va−Vb). This rate equals to a difference between the rate at which data is inputted to the track buffer and the rate at which data is outputted from the track buffer. Time "t2" indicates the time at which data is read out, the data being stored in a location specified by the logical address "a2", which is the end point of the contiguous VOB storage area. In other words, during the period from the time "t1" and the time "t2", the amount of data accumulated in the track buffer increases at the rate of (Va−Vb). The amount of accumulated data at the time "t2" (B(t2)) is determined by the following Equation 1:

$$B(t2)=(Va-Vb)\times(t2-t1) \quad \text{(Equation 1)}.$$

After this, since image data is stored in the area specified by the logical addresses "a2" to "a3", there is no input of data into the track buffer, and thus the amount of data accumulated in the track buffer decrease at an output rate of "−Vb". This decrease continues until the logical address "a3" is reached, i.e., the time "t3".

What is important here is that there is a possibility that the reproduction of the VOB stops if the amount of data accumulated in the track buffer becomes 0 before the time "t3", since it means that there is no VOB data to be supplied to the decoders. When there remains data in the track buffer at the time "t3", the reproduction of VOB continues without stopping.

A condition for preventing the amount of data accumulated in the track buffer from becoming 0 before the time "t3" is represented by the following Equation 2:

$$B(t2)\geq Vb\times(t3-t2) \quad \text{(Equation 2)}.$$

In other words, the position of each image data (non-VOB data) should be determined so that Equation 2 is satisfied.

<Structure of Navigation Data>

Referring to FIG. 13 to FIG. 19, a description is given of the structure of the navigation data (BD management information) on the BD.

Figure 13:
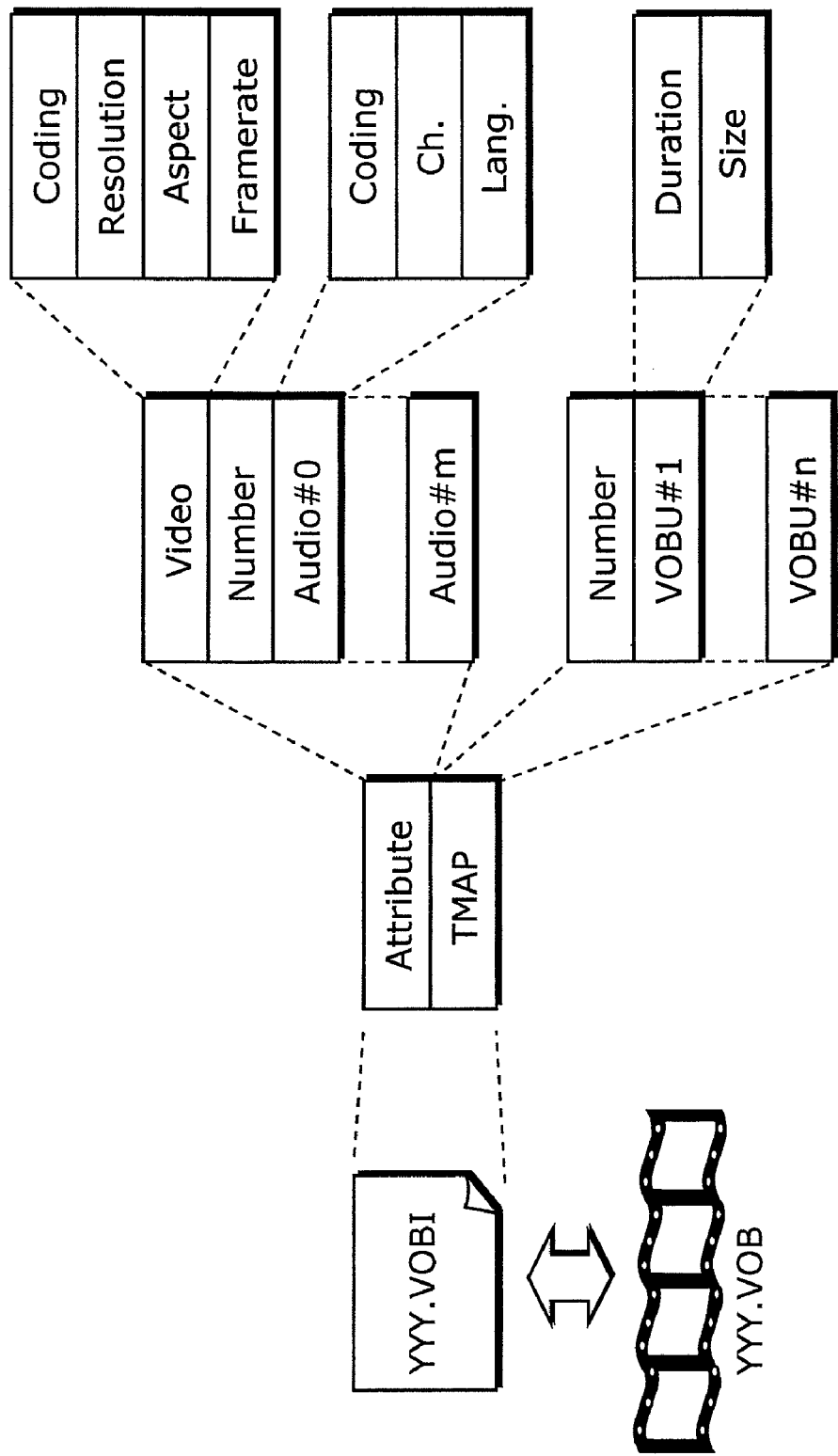
FIG. 13 is a diagram showing an internal structure of a VOB management information file.

FIG. 13 is a diagram showing an internal structure of a VOB management information file ("YYY. VOBI").

The VOB management information includes stream attribute information (Attribute) of the VOB, and a time map (TMAP). The stream attribute includes a video attribute (Video) and audio attributes (Audio#0 to Audio#m). Since a single VOB can include plural audio streams, there is an indication of the number of audio streams (Number).

The following lists plural fields included in the video attribute (Video) and possible values included in the respective fields:

Compression mode (Coding):

MPEG1
MPEG2
MPEG4
MPEG4-AVC (Advanced Video Coding)
Resolution (Resolution):

1920 × 1080
1280 × 720
 720 × 480
 720 × 565
Aspect ratio (Aspect)

4:3
16:9
Frame rate (Framerate)

60
59.94
50
30
29.97
25
24
23.976

The following lists plural fields included in each of the Audio attributes (Audio) and possible values included in the respective fields:

Compression mode (Coding):

AC3
MPEG1
MPEG2
LPCM
DTSHD
Channel number (Ch.):

1 to 8

Linguistic attribute (Language):

The time map (TMAP), which is a table holding information for each VOBU, includes the number of VOBUs (Number) in the VOB, and VOBU information of each of such VOBUs (VOBU#1 to VOBU#n). Each VOBU information includes the reproduction duration of the VOBU (Duration), and the data size of the VOBU (Size).

Figure 14:
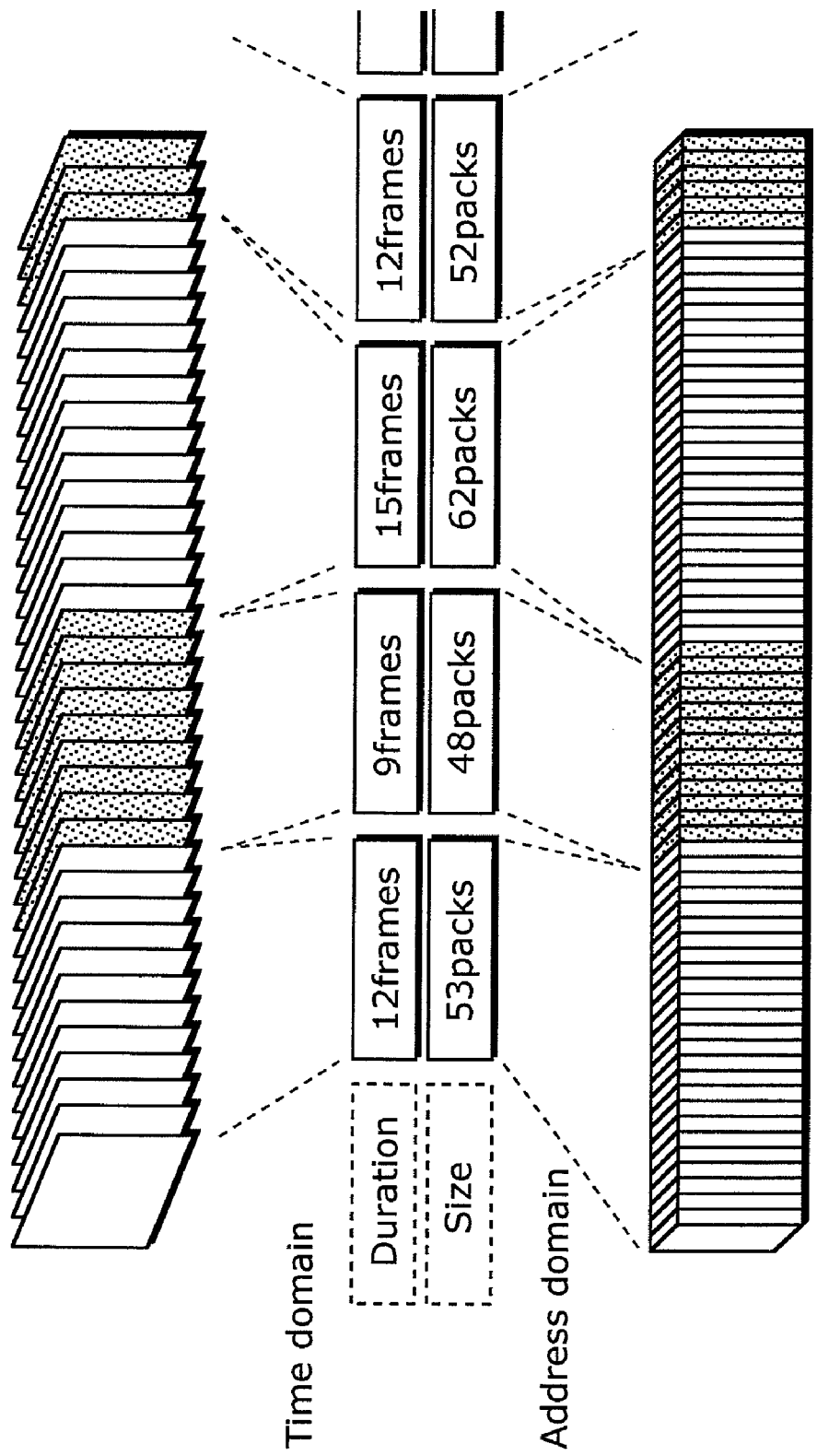
FIG. 14 is a diagram for describing the details of each VOBU information.

FIG. 14 is a diagram for describing the details of each VOBU information.

As is widely known, MPEG streams are sometimes compressed at a variable bit rate, and therefore there is no simple correlation between the reproduction duration of each frame and its data size. In contrast, since AC3, which is a compression standard for audio, defines that audio data should be compressed at a fixed bit rate, a relationship between duration and each address can be represented by a linear expression in the case of audio data. The display duration of each frame in MPEG video data is fixed. For example, the display duration of one frame in MPEG video data for NTSC is 1/29.97 seconds, but the data size of each frame after compression greatly differs from frame to frame depending on the pictorial feature and the picture type, i.e., I/P/B picture, of each frame. Thus, in the case of MPEG video data, it is impossible to represent a relationship between duration and each address by a linear expression.

As a matter of fact, it is impossible to represent a relationship between duration and each data size by a linear expression in the case of an MPEG system stream, i.e., a VOB, in which MPEG video data is multiplexed. In a VOB, duration and each address are associated with each other in a time map (TMAP). As shown in FIG. 14, a time map (TMAP) is a table that holds, as its entry, the number of frames in a VOBU and the number of packs in such VOBU (i.e., data size) on a VOBU basis.

Figure 15:
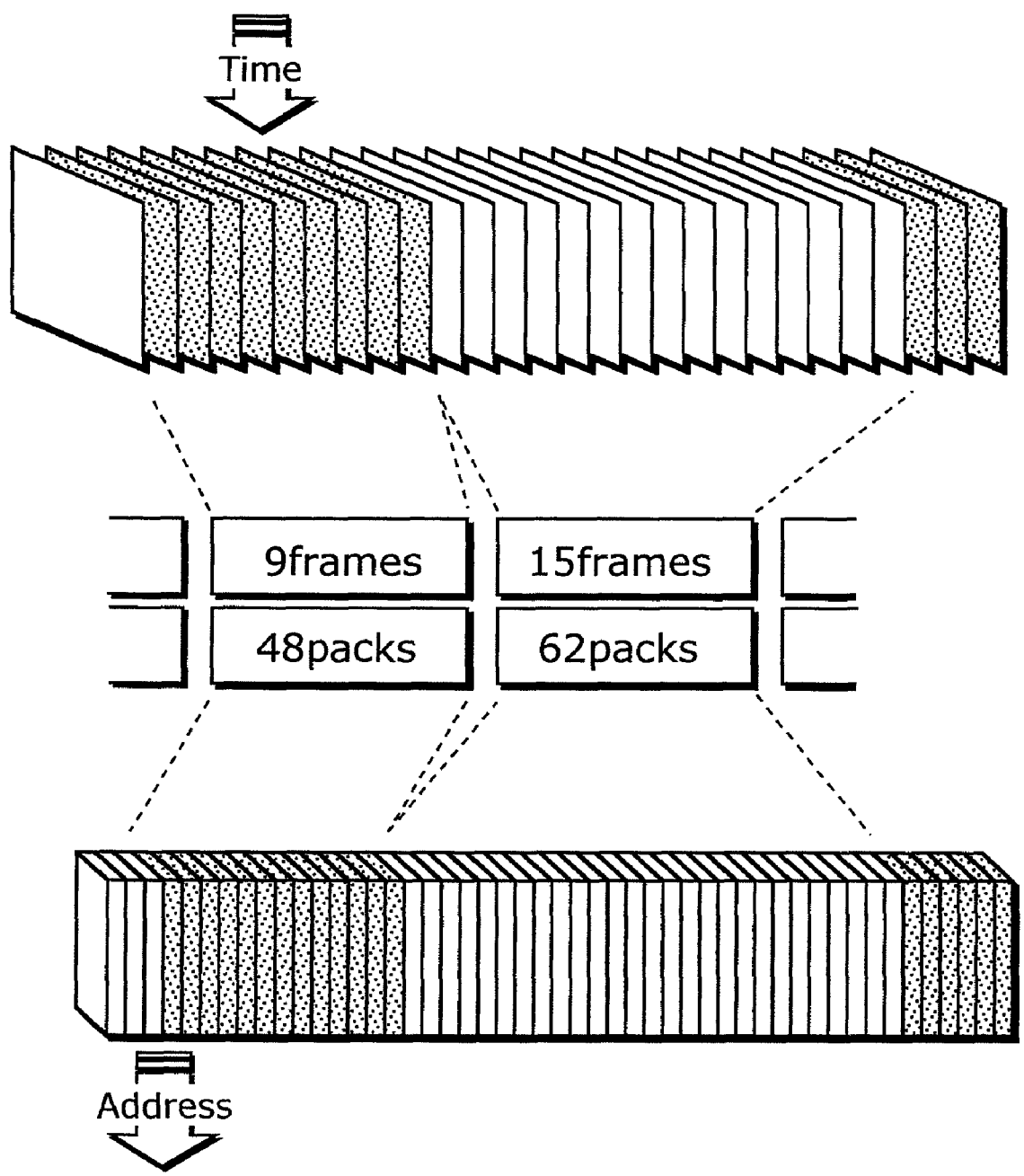
FIG. 15 is a diagram for describing the details of a time map.

Referring to FIG. 15, a detailed description is given of a time map (TMAP).

As shown in FIG. 15, when time information is provided, it is first detected which one of the VOBUs such time information belongs to. More specifically, the number of frames in each VOBU in the time map is added, and a VOBU is detected that includes a frame corresponding to the number of frames equal to or greater than the number of frames that is obtained by converting the above-provided time into the number of frames. Next, the data sizes of the respective VOBUs in the time map up until the previous VOBU of such detected VOBU, are added up. The value obtained by such addition is used to determine the address of a pack that should be read out to reproduce frames corresponding to the above-provided time.

Figure 16:
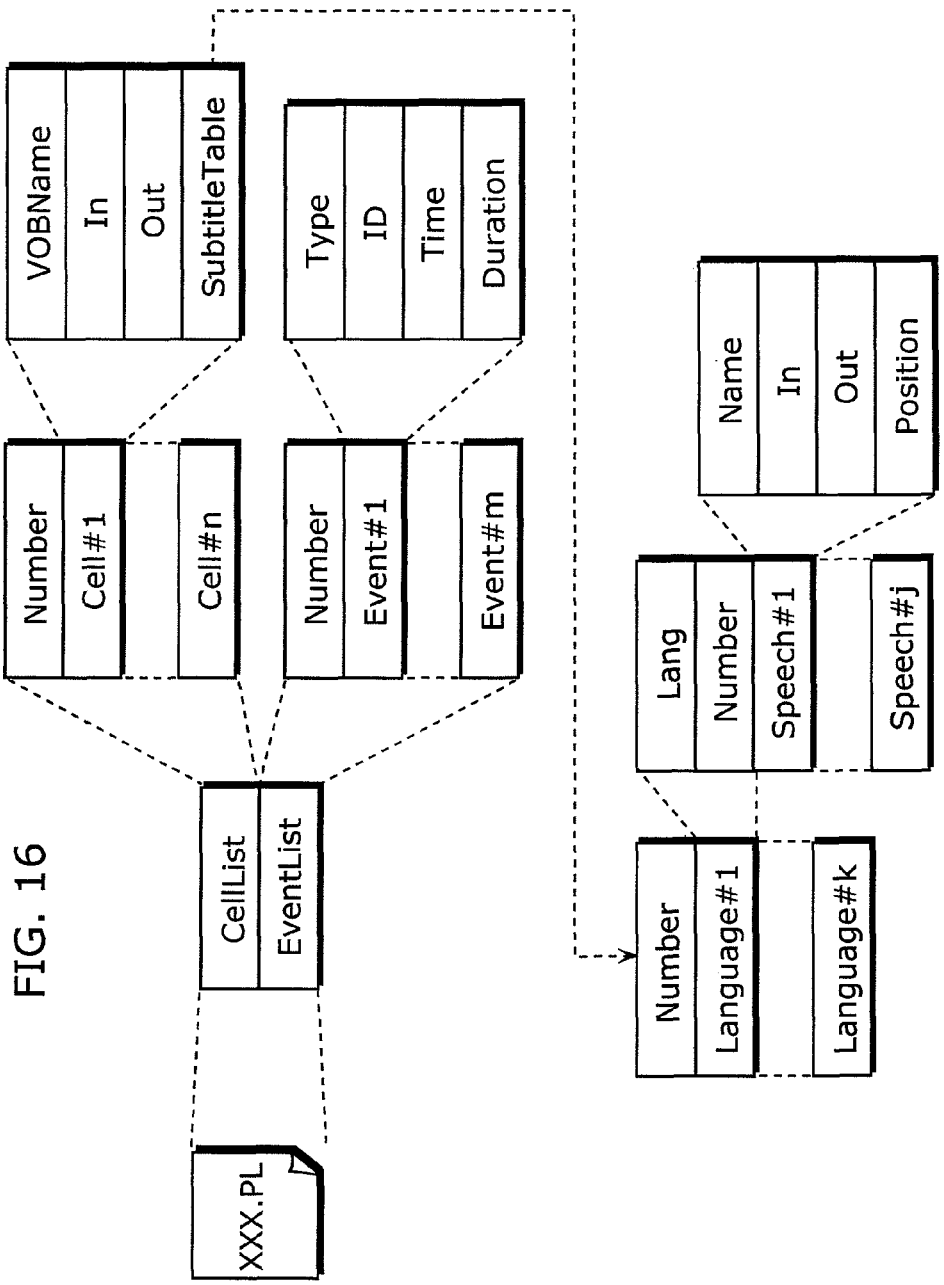
FIG. 16 is a diagram showing an internal structure of playlist information.

Next, referring to FIG. 16, a description is given of an internal structure of playlist information ("XXX. PL").

The playlist information is made up of a cell list (Celllist) and an event list (EventList).

The cell list (Celllist) is a sequence of cells to be reproduced in the playlist, and the cells are reproduced in order of description in the cell list. The cell list (Celllist) is made up of the number of cells (Number) and cell information of each of such cells (Cell#1 to Cell#n).

Cell information (Cell#) includes a VOB filename (VOB-Name), start time (In) and end time (Out) in the VOB, and a subtitle table (SubtitleTable). The start time (In) and the end time (Out) are each represented by a frame number in the VOB, and it is possible to obtain the address of VOB data necessary for reproduction, using the above-described time map (TMAP).

The subtitle table (SubtitleTable) is a table holding information about subtitles to be reproduced in synchronization with the VOB. Since the VOB can have subtitles in plural languages as in the case of audio, the subtitle table (SubtitleTable) includes the number of languages (Number), which is followed by tables for the respective languages (Language#1 to Language#k).

The table for each language (Language#) is made up of language information (Lang), the number of subtitle information to be individually displayed (Number), and subtitle information to be individually displayed (Speech#1 to Speech#j). Each speech information (Speech#) is made up of: the filename of corresponding image data (Name); display start time (In) of the subtitles and display end time (Out) of the subtitles; and a display position of the subtitles (Position).

The event list (EventList) is a table that defines events that occur in the playlist. The event list includes the number of events (Number), which is followed by individual events (Event#1 to Event#m). Each event (Event#) is made up of the type of the event (Type), the identifier of the event (ID), and the time at which the event occurs (Time), and the validity period of the event (Duration).

Figure 17:
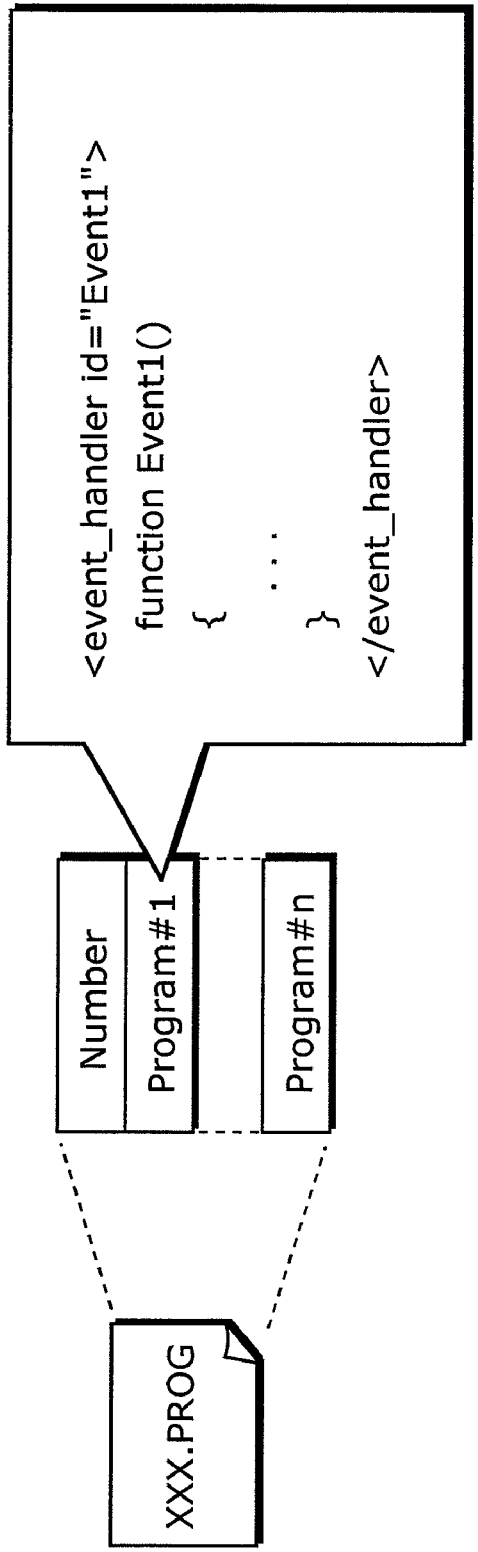
FIG. 17 is a diagram showing an event handler table.

FIG. 17 is a diagram showing an event handler table ("XXX. PROG") that holds event handlers (for time event and user event for menu selection) of each playlist.

The event handler table holds the number of event handlers/programs defined (Number), and individual event handlers/programs (Program#1 to Program#n). Each event handler/program (Program#) includes the definition of the start of the event handler (<event_handler> tag) and the identifier of the event handler (ID) that is paired with the identifier of the event as described above. The program is described in the brackets { } that follows Function. The events (Event#1 to Event#m) stored in the above-described event list (EventList) in "XXX. PL" are identified using the identifiers (IDs) of the corresponding event handlers in "XXX. PROG".

Figure 18:
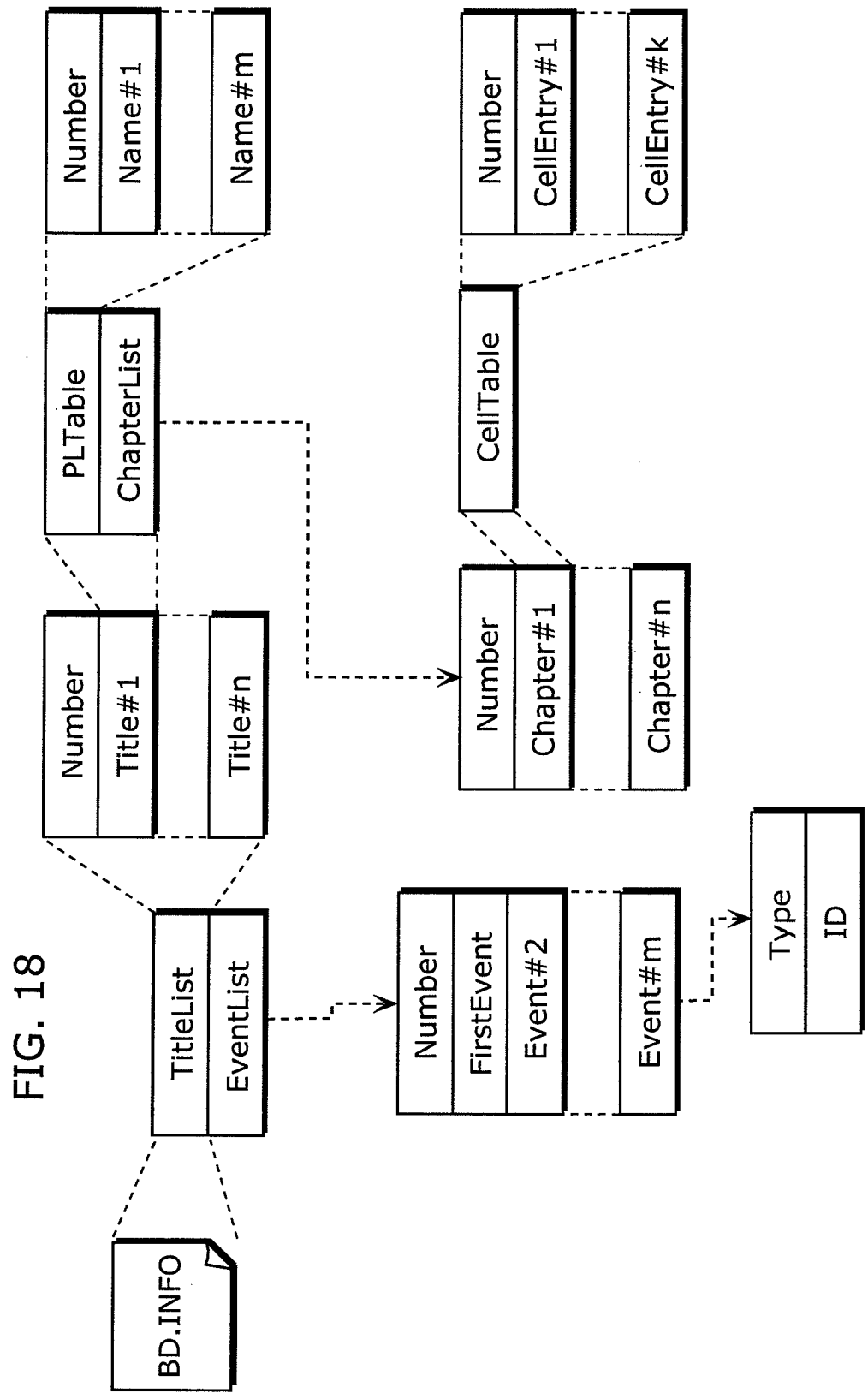
FIG. 18 is a diagram showing an internal structure of information related to the entire BD disc.

Next, referring to FIG. 18, a description is given of an internal structure of information related to the entire BD disc ("BD. INFO").

The information related to the entire BD disc is made up of a title list (TitleList) and an event table (EventList) for global events.

The title list (TitleList) includes the number of titles in the disc (Number), which is followed by title information of each of such titles (Title#1 to Title#n). Each title information (Title#) includes a playlist table (PLTable) holding playlists in the title and a chapter list (Chapterlist) holding chapters in the title. The playlist table (PLTable) includes the number of playlists in the title (Number) and the playlist names (Name), i.e., the filenames of the respective playlists.

The chapter list (Chapterlist) is made up of the number of chapters included in the title (Number) and chapter information of each of such chapters (Chapter#1 to Chapter#n). Each chapter information (Chapter#) includes a cell table (CellTable) holding cells included in the chapter. The cell table (CellTable) is made up of the number of cells (Number) and cell entry information of each of such cells (CellEntry#1 to CellEntry#k). Each cell entry information (CellEntry#) is made up of the name of the playlist including the cell, and the cell number in the playlist.

The event list (EventList) includes the number of global events (Number), and information about each of such global events. What should be noted here is that the first defined global event is referred to as a first event (FirstEvent), and such event is first read out when the BD disc is inserted into the player. Event information for a global event includes only the type of the event (Type), and the identifier of the event (ID).

Figure 19:
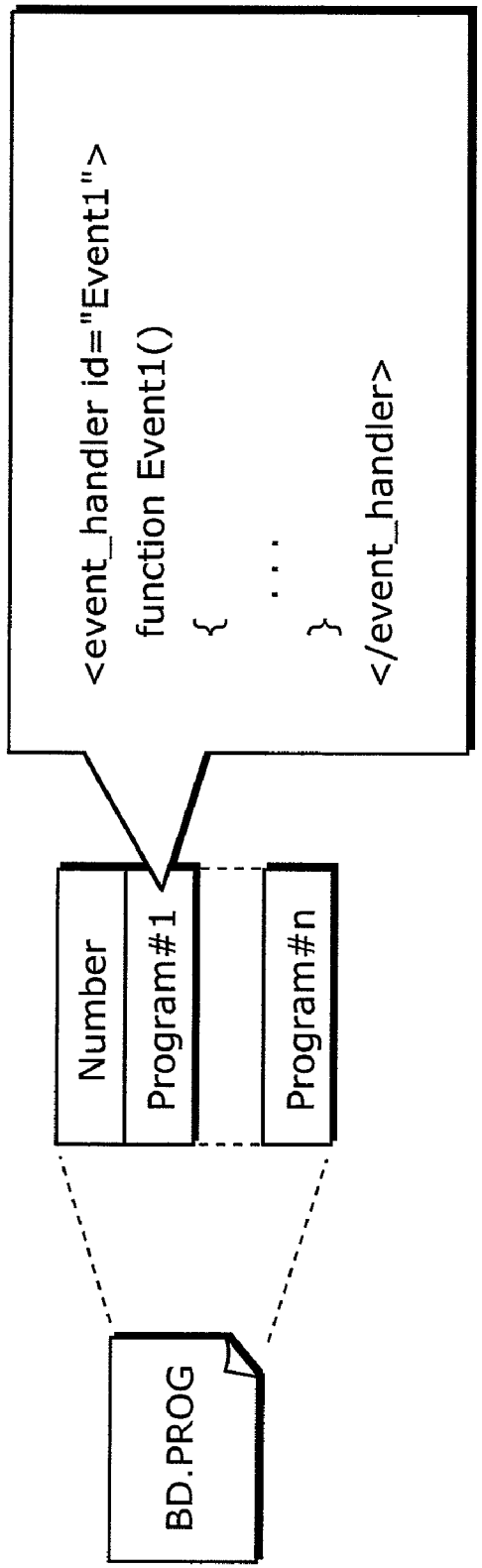
FIG. 19 is a diagram showing a table holding programs of global event handlers.

FIG. 19 is a diagram showing a table holding programs of global event handlers ("BD. PROG").

The contents of this table are the same as the contents of the event handler table described with reference to FIG. 17.

<Mechanism of Event Occurrence>

Figure 20:
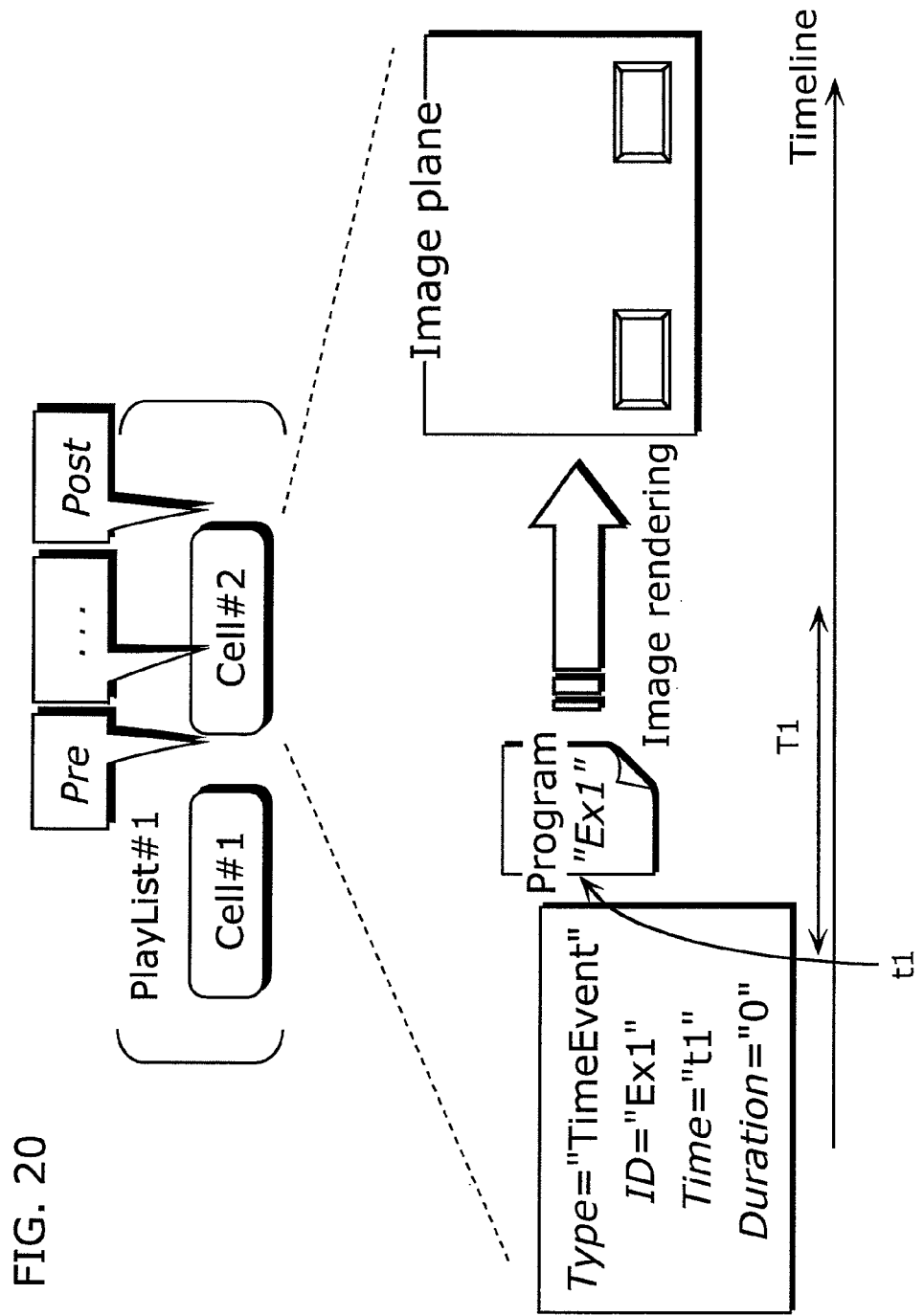
FIG. 20 is a diagram showing an example of a time event.
Figure 21:
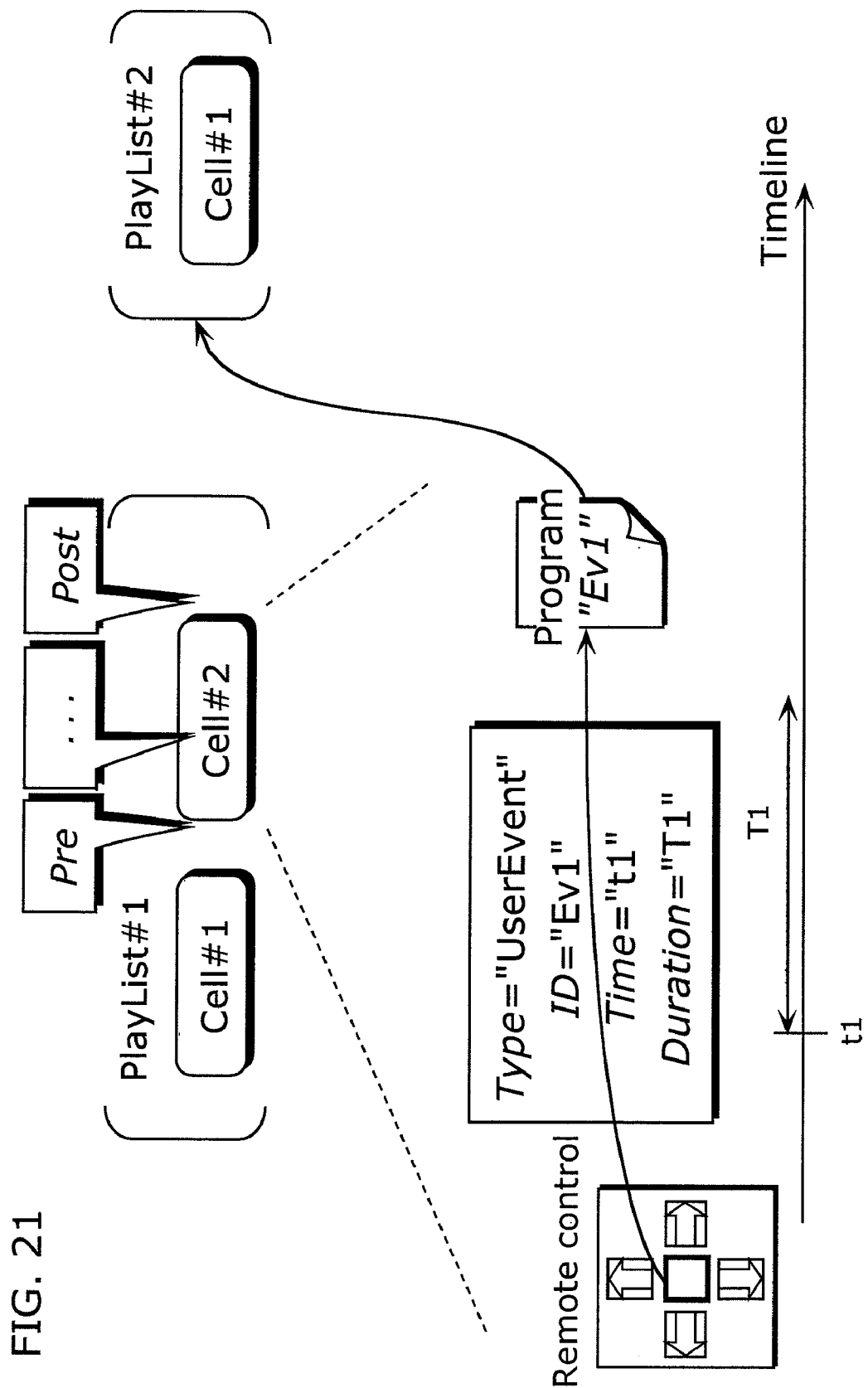
FIG. 21 is a diagram showing an example of a user event.
Figure 22:
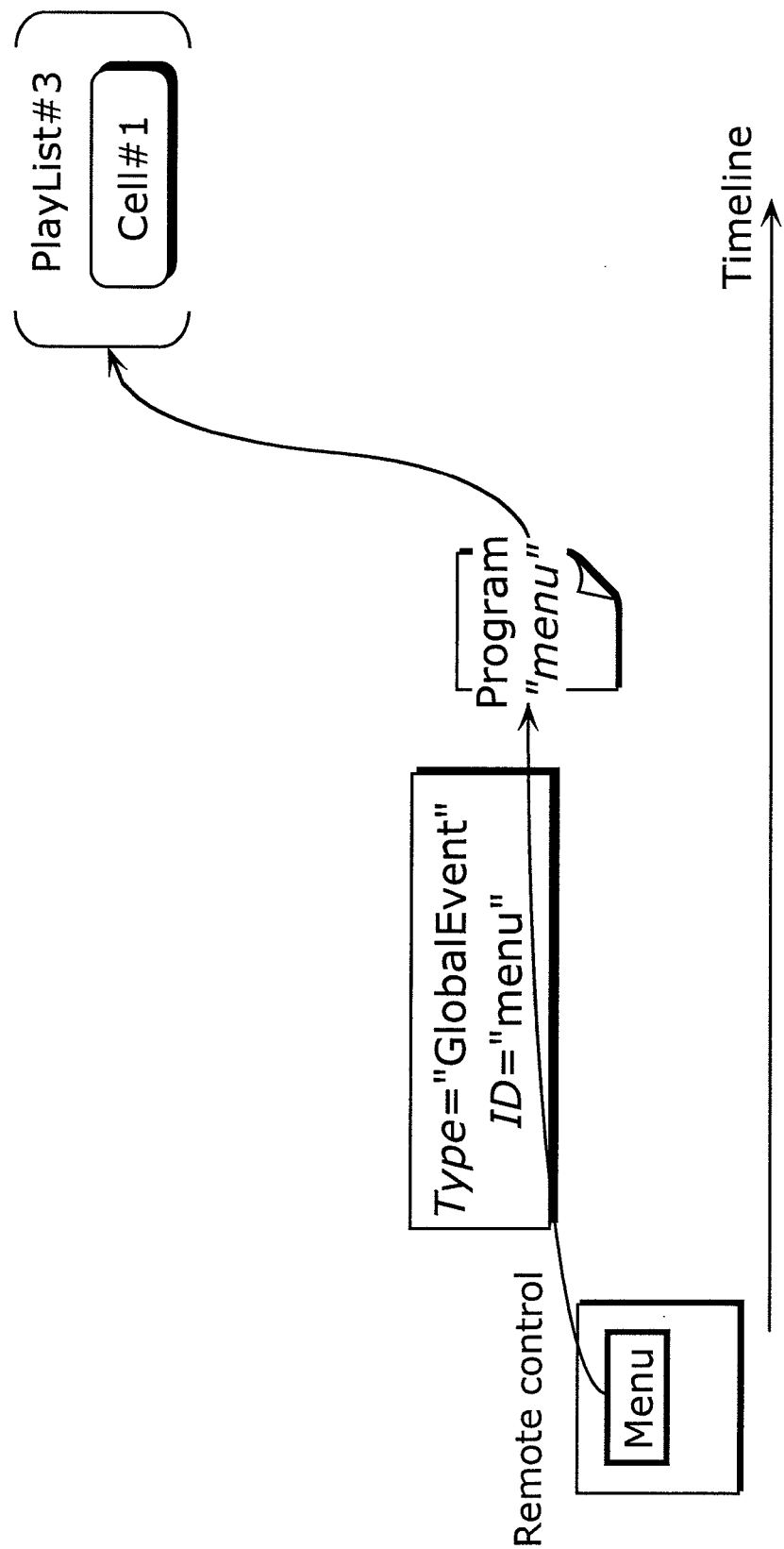
FIG. 22 is a diagram showing an example of a global event.

Referring to FIG. 20 to FIG. 22, a description is given of a mechanism of event occurrence.

FIG. 20 is a diagram showing an example of a time event.

As has been described, a time event is defined in the event list (EventList) in playlist information ("XXX. PL"). In the case where an event is defined as a time event, i.e., an event whose event type (Type) is "TimeEvent", a time event with the identifier "Ex1" is outputted to the program processor from the scenario processor at the event generation time ("t1"). The program processor searches for an event handler with the event identifier "EX1", and executes such target event handler. For example, an event such as the rendering or the like of two button images is executed in the present embodiment.

FIG. 21 is a diagram showing an example of a user event for menu operation.

As has been described above, a user event for menu operation is also defined in the event list (EventList) in playlist information ("XXX. PL"). In the case where an event is defined as a user event, i.e., an event whose event type (Type) is "UserEvent", such user event becomes ready at the event generation time ("t1"). At this time, the event itself has not been generated yet. This event is in the ready state during the period indicated by its validity period information (Duration).

As shown in FIG. 21, when the user presses the Up/Down/Right/Left key or the "Determination" key on the remote control, the UOP manager first generates an UOP event, and outputs it to the program processor. The program processor outputs such UOP event to the scenario processor. The scenario processor checks whether or not there exists any user event that is effective at the time of receiving the UOP event. In the case where there exists an effective user event, the scenario processor generates a user event, and outputs it to the program processor. The program processor searches for an event handler with the event identifier "Ev1", and executes such target event handler. For example, the reproduction of the playlist #2 is started in the present embodiment.

The generated event does not include information for identifying which one of the remote control keys the user has pressed. Information about the selected remote control key is notified to the program processor by the UOP event, and stored into the register SPRM (8) of the virtual player. By checking the value of such register, it is possible to perform branch processing on the program of the event handler.

FIG. 22 is a diagram showing an example of a global event.

As has been described above, a global event is defined in the event list (EventList) in information related to the entire BD disc ("BD. INFO"). In the case where an event is defined as a global event, i.e., an event whose event type (Type) is "GlobalEvent", such event is generated only when the user has performed a remote control key operation.

When the user presses the "Menu" key, the UOP manager first generates a UOP event, and outputs it to the program processor. The program processor outputs such UOP event to the scenario processor, and the scenario processor then generates a global event corresponding to such UOP event, and sends it to the program processor. The program processor searches for an event handler with the event identifier "menu", and executes such target event handler. For example, the reproduction of the playlist #3 is started in the present embodiment.

Note that the number of "Menu" keys is assumed to be one in the present embodiment, but there may be plural menu keys as in the case of a remote control of a DVD recorder. In such case, there is defined an identifier corresponding to each menu key.

<Virtual Player Machine>

Figure 23:
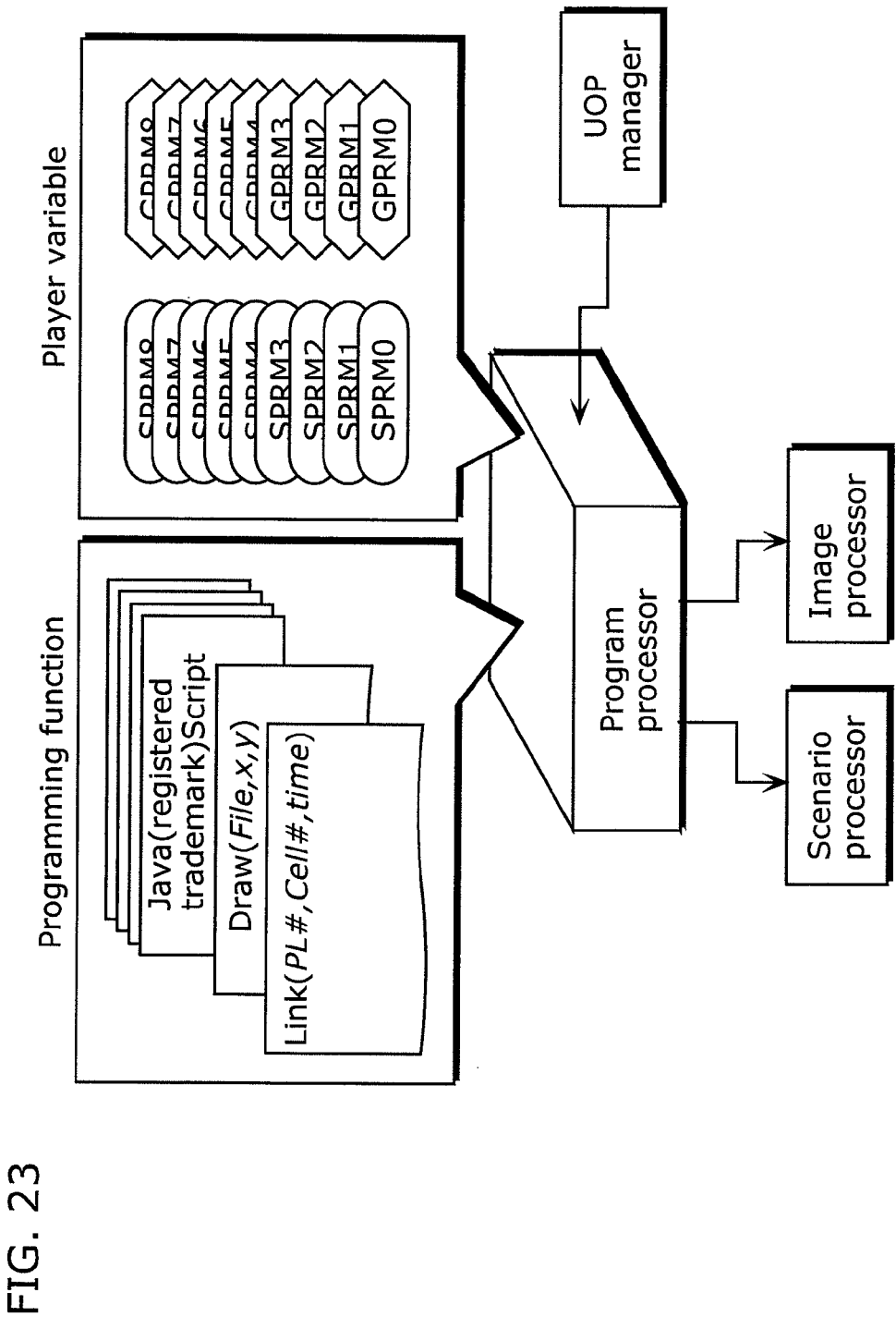
FIG. 23 is a diagram for describing the function of a program processor.

Referring to FIG. 23, a description is given of the function of the program processor.

The program processor is a processing module having a virtual player machine therein. Such virtual player machine has the function of supporting BDs, and does not depend on the implementation of a BD player. In other words, the virtual player machine is guaranteed to realize the same function regardless of BD player.

The virtual player machine has programming functions and player variables (registers). In the programming functions, three properties described below are defined as BD eigen functions based on Java (registered trademark) Script:

Link function: stop the current reproduction, and start the reproduction starting from a specified playlist, cell, or time.
   Link (PL#, Cell#, time)
      PL#: Playlist name
      Cell#: Cell number
      time: Reproduction start time in the cell
PNG rendering function: render specified PNG data onto the image plane
   Draw (File, X, Y)
      File: PNG filename
      X: Position on the X coordinate
      Y: Position on the Y coordinate
Image plane clear function: clear a specified area on the image plane
   Clear (X, Y, W, H)
      X: Position on the X coordinate
      Y: Position on the Y coordinate
      W: Width in the X direction
      H: Width in the Y direction Player variables include system parameters (SPRMs) indicating the status of the player, and general parameters (GPRMs) that can be used for general purposes.

FIG. 24 is a diagram showing a list of system parameters (SPRMs).

SPRM (0): Language code
SPRM (1): Audio stream number
SPRM (2): Subtitle stream number
SPRM (3): Angle number
SPRM (4): Title number
SPRM (5): Chapter number
SPRM (6): Program number
SPRM (7): Cell number
SPRM (8): Key name
SPRM (9): Navigation timer
SPRM (10): Current playback time
SPRM (11): Player audio mixing mode for Karaoke
SPRM (12): Country code for parental management
SPRM (13): Parental level
SPRM (14): Player configuration (video)
SPRM (15): Player configuration (audio)
SPRM (16): Language code for audio stream
SPRM (17): Language code for audio stream (extension)
SPRM (18): Language code for subtitle stream
SPRM (19): Language code for subtitle stream (extension)
SPRM (20): Player region code
SPRM (21): reserved
SPRM (22): reserved
SPRM (23): Player status
SPRM (24): reserved
SPRM (25): reserved
SPRM (26): reserved
SPRM (27): reserved
SPRM (28): reserved
SPRM (29): reserved
SPRM (30): reserved
SPRM (31): reserved Note that the programming functions are defined in the present embodiment based on Java (registered trademark) Script, but these programming functions may be defined based on B-Shell and Perl Script used in OSs. In other words, the programming functions are not limited to the use of Java (registered trademark) Script for their definitions.

EXAMPLE OF PROGRAM

Figure 25:
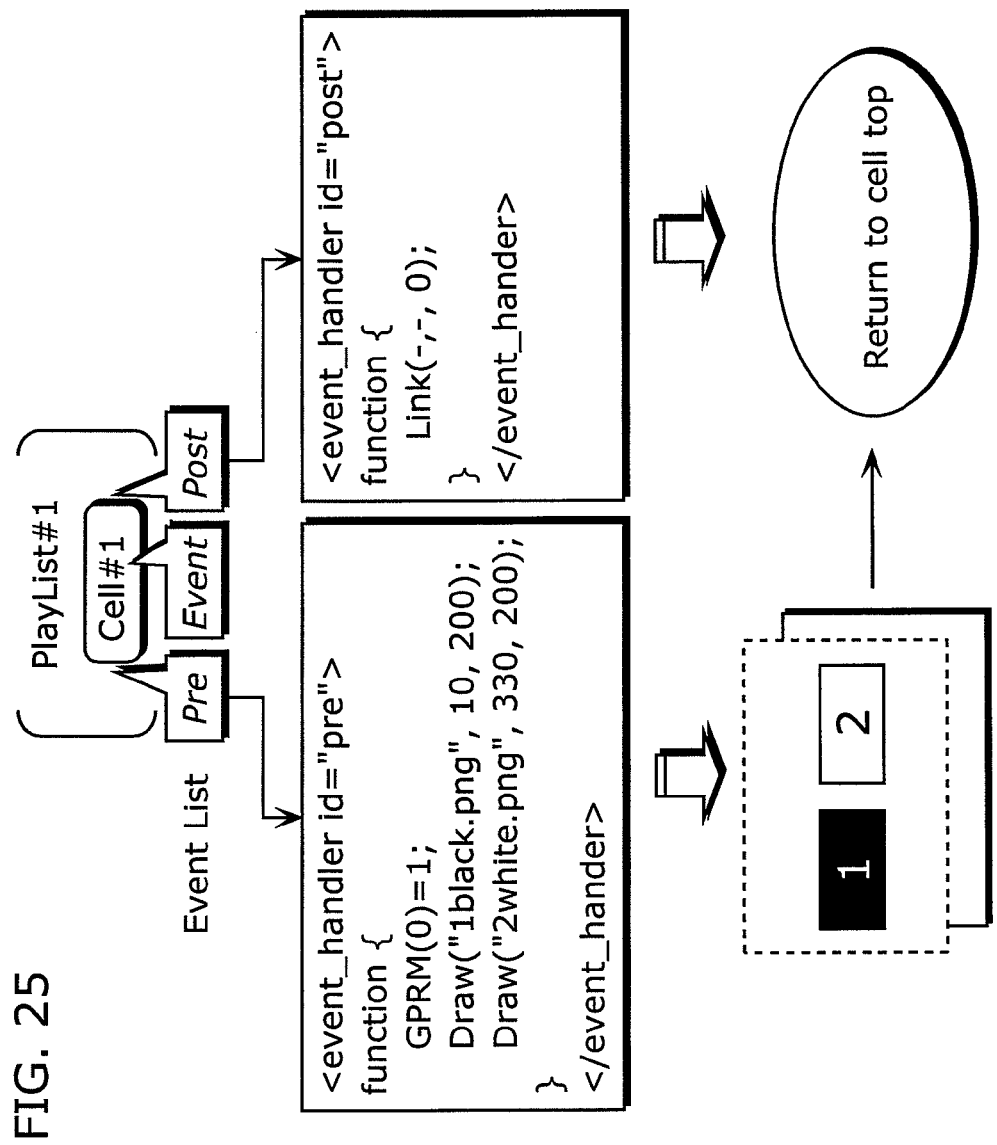
FIG. 25 is a diagram showing an example of a menu program having two selection buttons.
Figure 26:
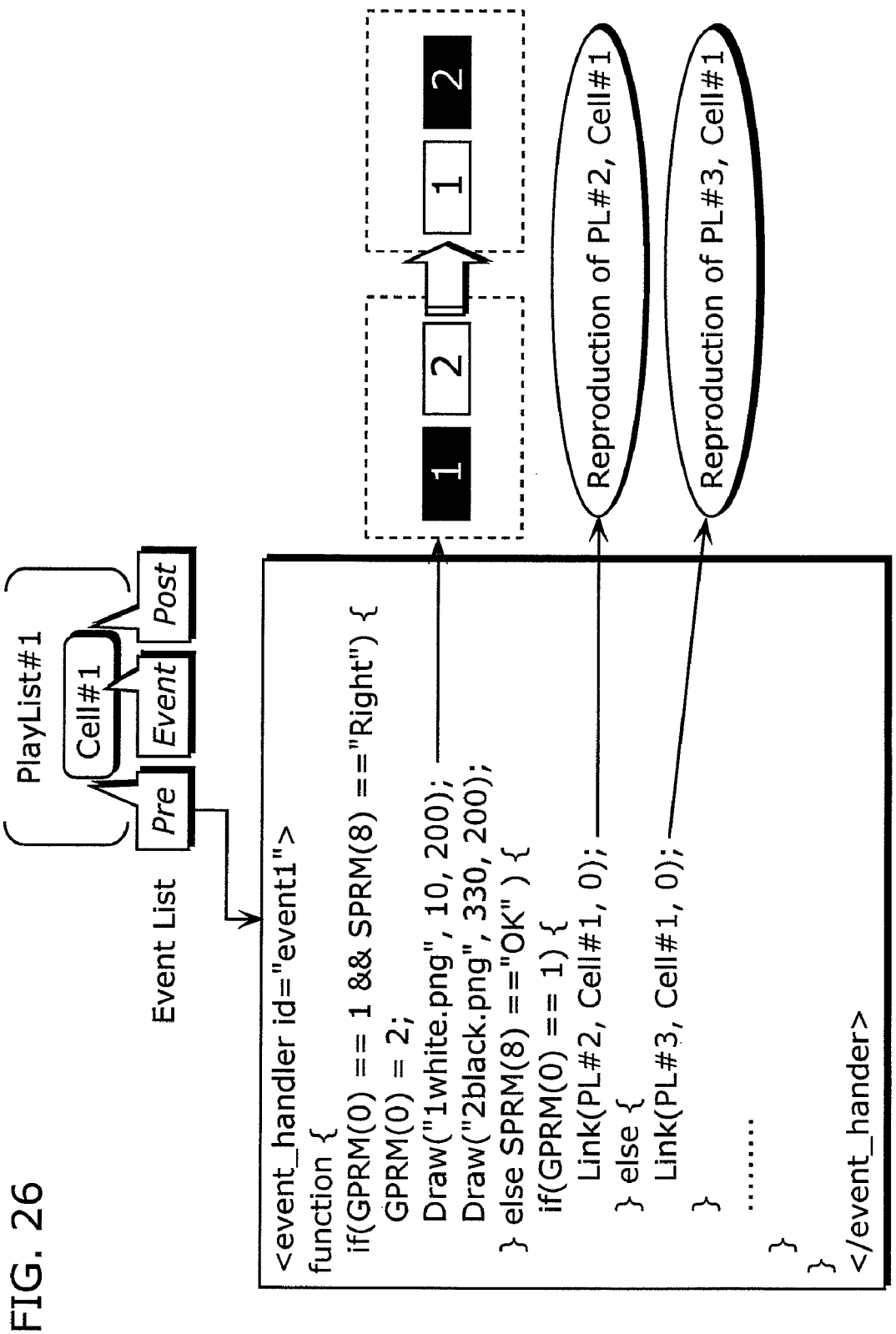
FIG. 26 is a diagram showing an example of an event handler for a user event.

FIG. 25 and FIG. 26 are diagrams showing examples of programs as event handlers.

FIG. 25 is a diagram showing an example of a menu program having two selection buttons.

The program illustrated on the left of FIG. 25 is executed based on the top time event of the cell (PlayList#1. Cell#1). "1" is set to one of the general parameters GPRM (0). GPRM (0) is used in the program to identify the selected button. The button 1 located on the left is selected in the initial state (default).

Next, using a rendering function Draw, PNG image of each of the button 1 and button 2 is rendered. The button 1 is formed by rendering the PNG image "1black. png" in an area that extends from the coordinates (10, 200) as the starting point (upper left corner). The button 2 is formed by rendering the PNG image "2white. png" in an area that extends from the coordinates (330, 200) as the starting point (upper left corner).

Then, the program illustrated on the right of FIG. 25 is executed based on the last time event of the current cell. In this program, it is specified, using Link function, that the cell should be reproduced from the top again.

FIG. 26 is a diagram showing an example of an event handler for a user event for menu selection.

Programs corresponding to the respective keys, in the case where the "Left" key, "Right" key, and "Determination" key are pressed, are described in the event handler. As has been described with reference to FIG. 21, when the user presses a remote control key, a user event is generated, and then the event handler shown in FIG. 26 is invoked. In this event handler, branch processing is performed using the value of GPRM (0) for identifying the selected button and using SPRM (8) for identifying the selected remote control key. The branch processing is performed in the following manner:

Condition 1) the button 1 is selected, and the "Right" key is selected.
GPRM(0) is reset to "2" so as to change the currently selected button to the button 2 on the right.
The images of the respective button 1 and button 2 are re-rendered
Condition 2) the "Determination (OK)" key is selected, and the button 1 is selected.
The reproduction of the playlist#2 is started
Condition 3) the "Determination (OK)" key is selected, and the button 2 is selected.
The reproduction of the playlist#3 is started.

<Flow of Player Processes>

Next, referring to FIG. 27 to FIG. 30, a description is given of the flow of processes performed by the player.

Figure 27:
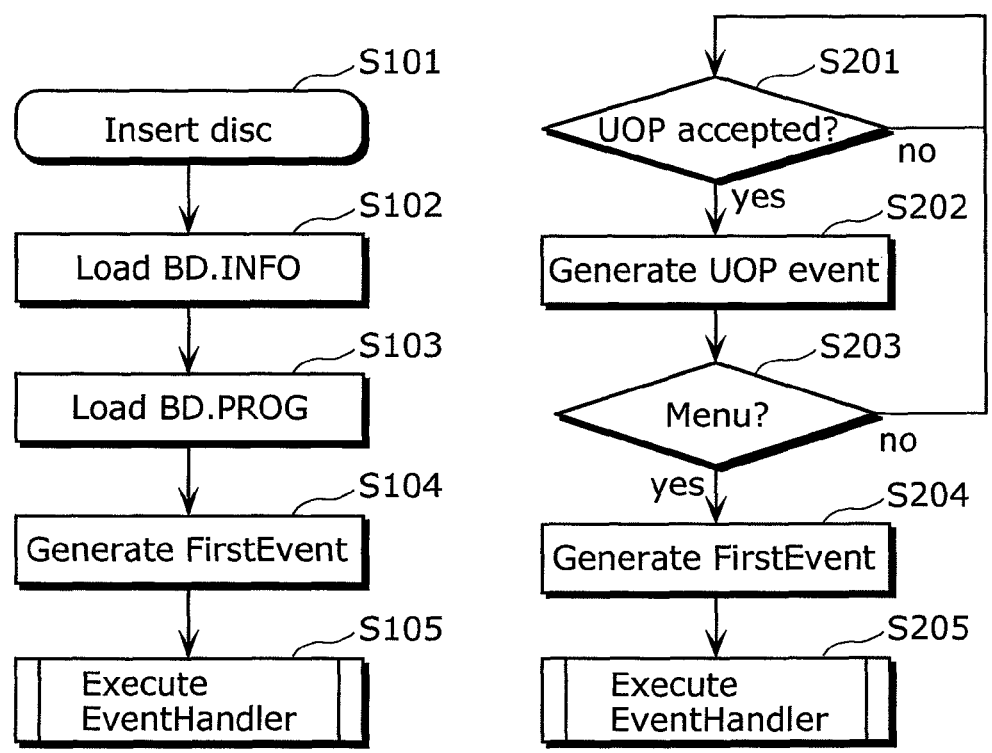
FIG. 27 is a diagram showing the flow of basic processes until the reproduction of AV data.

FIG. 27 is a diagram showing the flow of basic processes until the reproduction of AV data.

When the BD disc is inserted (S101), the BD player loads and analyzes the "BD. INFO" file (S102), and then loads the "BD. PROG" file (S103). The "BD. INFO" file and "BD. PROG" file are both stored into the management information storage memory once, and analyzed by the scenario processor.

Next, the scenario processor generates the first event based on the first event (FirstEvent) information in the "BD. INFO" file (S104). The program processor receives the generated first event, and executes an event handler corresponding to such event (S105).

It is expected that the playlist information that should be reproduced first is stored in the event handler corresponding to the first event. If there is no instruction to reproduce a playlist, the player keeps waiting for a user event without reproducing anything (S201). When the BD player receives an instruction from the user operating the remote control, the UOP manager causes the program manager to start the execution of the UOP event (S202).

The program manager judges whether or not such UOP event is a menu key event (S203). In the case where the UOP event is a menu key event, the program manager outputs the UOP event to the scenario processor, and the scenario processor then generates a user event (S204). The program processor executes an event handler corresponding to such generated user event (S205).

Figure 28:
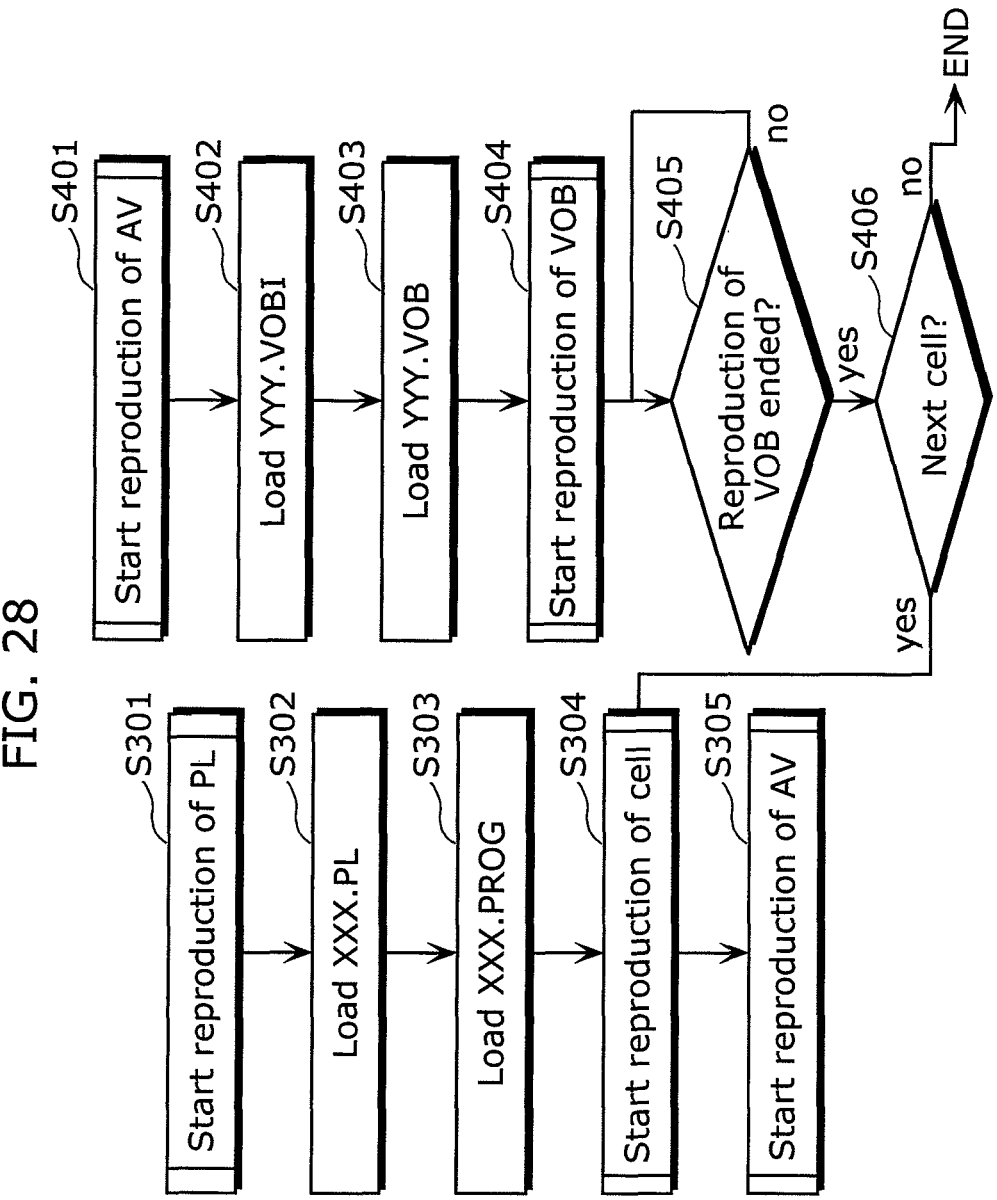
FIG. 28 is a diagram showing the flow of processes from the reproduction of a PL to the reproduction of a VOB.

FIG. 28 is a diagram showing the flow of processes from the reproduction of a PL to the reproduction of a VOB.

As has been described above, the reproduction of the playlist is started by a first event handler or a global event handler (S301). The scenario processor loads and analyzes the playlist information "XXX. PL" as information required to reproduce the target playlist (S302), and loads the program information "XXX. PROG" corresponding to such playlist (S303). Then, the scenario processor instructs the reproduction of a cell based on the cell information registered in the playlist (S304). Since the reproduction of the cell means that there is a request from the scenario processor to the presentation controller, the presentation controller starts the reproduction of the AV data (S305).

When the reproduction of the AV data starts (S401), the presentation controller loads and analyzes the information file (XXX. VOBI) of the VOB corresponding to the cell to be reproduced (S402). Referring to the time map, the presentation controller identifies the first VOBU to be reproduced and the address of such VOBU, and notifies such address to the drive controller, and the drive controller then reads out the target VOB data (S403). Accordingly, the VOB data is sent to the decoders, and the reproduction of such data starts (S404).

The reproduction of the VOB continues until the end of the reproduction segments of such VOB is reached (S405), which is followed by the reproduction of the next cell (S304). If there is no cell that follows, the reproduction stops (S406).

Figure 29:
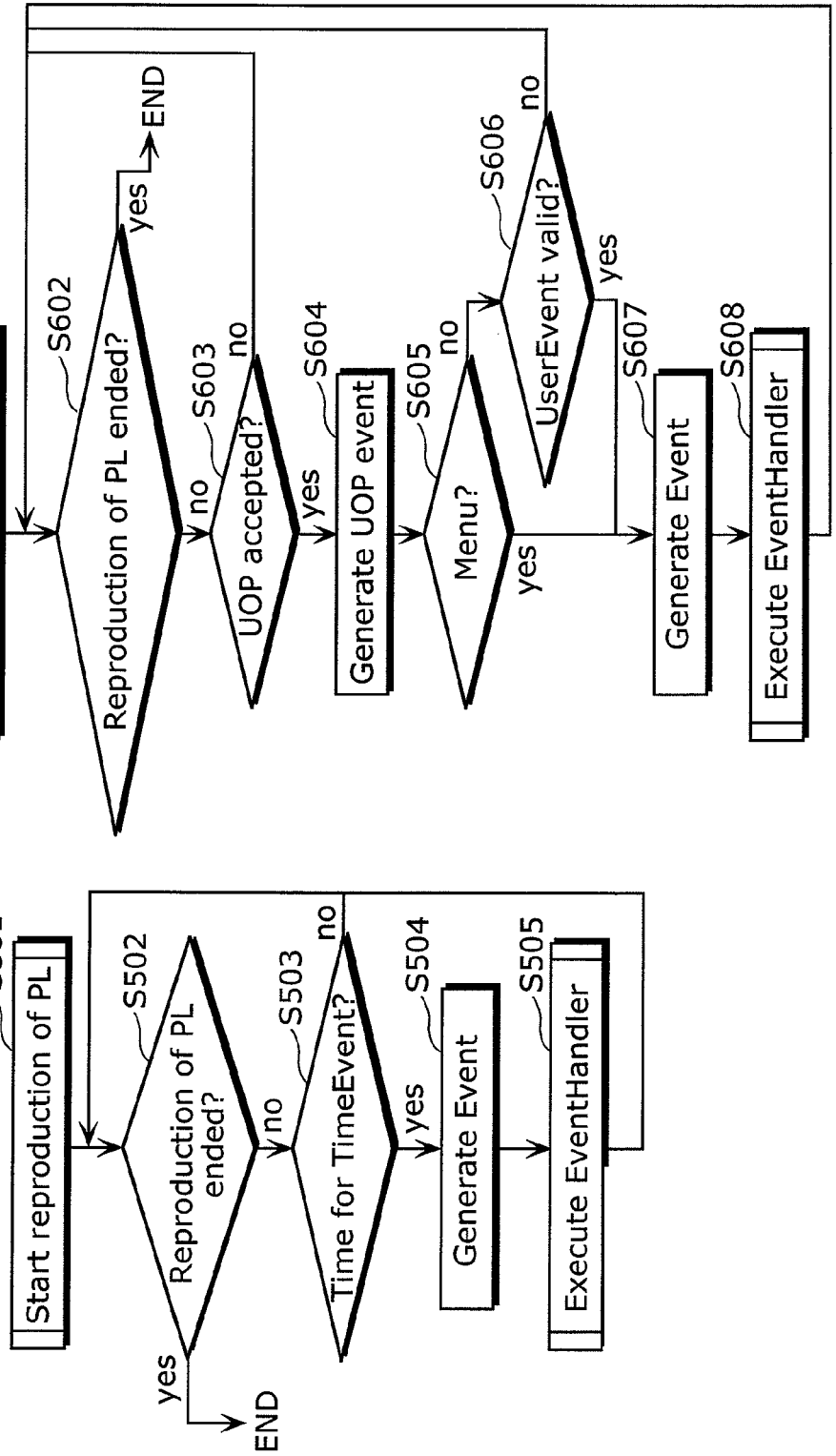
FIG. 29 is a diagram showing the flow of event processes after the reproduction of the AV data starts.

FIG. 29 is a diagram showing the flow of event processes after the reproduction of the AV data starts.

The BD player is an event-driven player. When the reproduction of a playlist starts, event processes for time event, user event, and subtitle display are respectively invoked, and event processes are executed in parallel with them.

Processes in S500's are time event processes.

After the reproduction of the playlist starts (S501) and a step of checking whether or not the reproduction of the playlist has ended is performed (S502), the scenario processor checks whether or not it is the time for event occurrence (S503). In the case where it is the time for event occurrence, the scenario processor generates a time event (S504), and the program processor receives such time event and executes the corresponding event handler (S505).

The processes returns to Step S502 in the following cases, and the above-described processes are repeated: it is not the time for event occurrence in Step S503; and after the event handler is executed in Step S504. Meanwhile, in the case where the result of the check in Step S502 is that the reproduction of the playlist has ended, the time event processes are forcefully terminated.

Processes in S600's are user event processes.

After the reproduction of the playlist starts (S601) and a step of checking whether or not the reproduction of the playlist has ended is performed (S602), the process proceeds to a step of checking whether or not there is any UOP accepted (S603). In the case where there is a UOP accepted, the UOP manager generates a UOP event (S604), and the program processor receives such UOP event and checks whether or not the received UOP event is a menu call (S605). In the case where the UOP event is a menu call, the program processor causes the scenario processor to generate an event (S607), and the program processor executes the corresponding event handler (S608).

In the case where the result of the check in Step S605 is that the UOP event is not a menu call, it indicates that the UOP event is an event that is generated by operating a cursor key or the "Determination" key. In this case, the scenario processor judges whether or not the current time is within the user event validity period (S606). In the case where the current time is within the user event validity period, the scenario processor generates a user event (S607), and the program processor executes the corresponding event handler (S608).

The processes returns to Step S602 in the following cases and the above-described processes are repeated: the result of the check in Step S603 is that there is no UOP accepted; it is judged in Step S606 that the current time is not within the user event validity period; and after the event handler is executed in Step S608. Meanwhile, in the case where the result of the check in Step S602 is that the reproduction of the playlist has ended, the user event processes are forcefully terminated.

Figure 30:
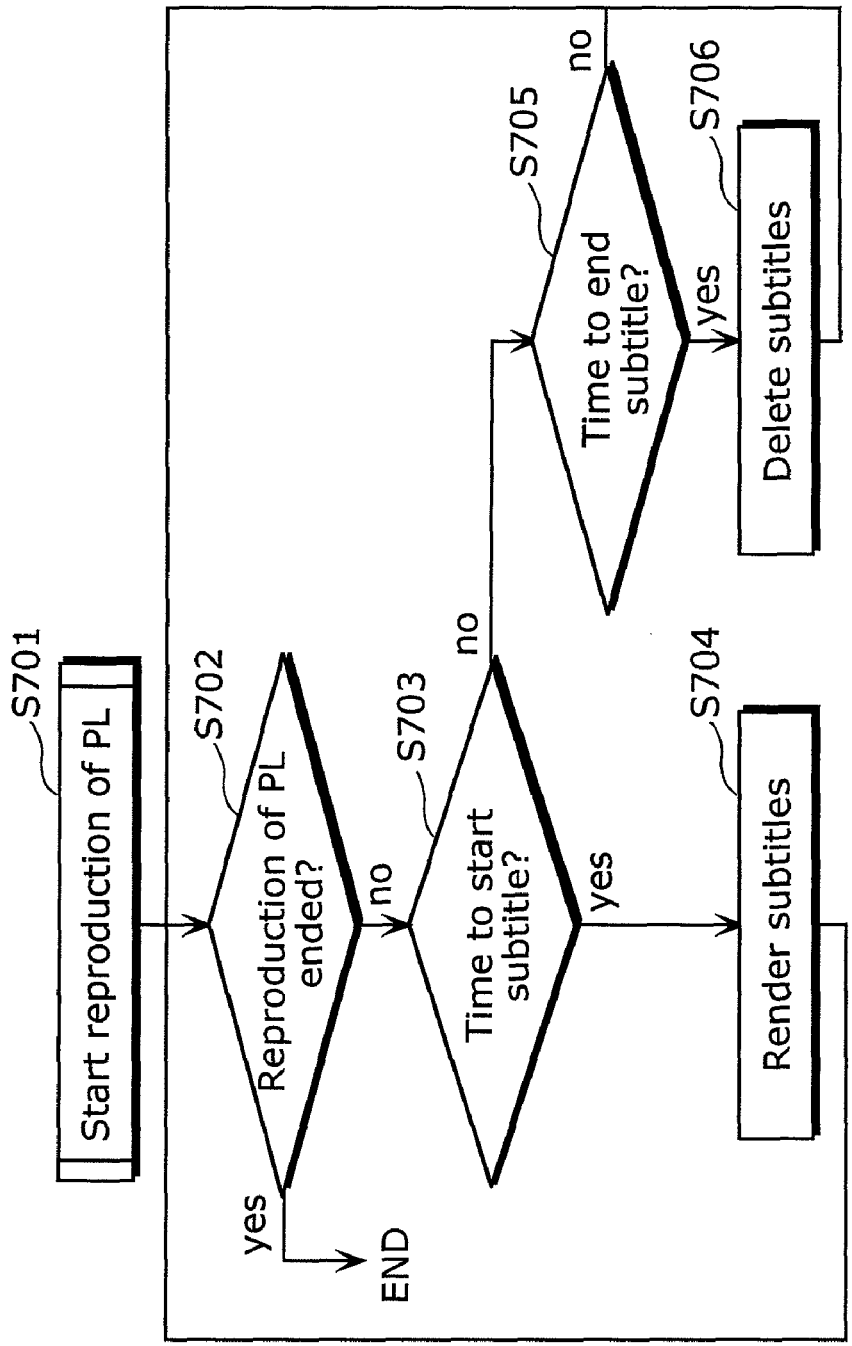
FIG. 30 is a diagram showing the flow of subtitle processes.

FIG. 30 is a diagram showing the flow of subtitle processes.

After the reproduction of the playlist starts (S701) and a step of checking whether or not the reproduction of the playlist has ended is performed (S702), the process proceeds to a step of checking whether or not the current time is the time to start the rendering of subtitles (S703). In the case where the current time is the time to start the rendering of subtitles, the scenario processor instructs the presentation controller to render subtitles, and the presentation controller instructs the image processor to render subtitles (S704). In the case where the result of the check in Step S703 is that the current time is not the time to start the rendering of subtitles, it is then checked whether or not the current time is the time to end the display of the subtitles (S705). In the case where the result of the check is that the current time is the time to end the display of the subtitles, the presentation controller instructs the image processor to delete the subtitles, and the image processor deletes the subtitles rendered on the image plane (S706).

The processes returns to Step S702 in the following cases and the above-described processes are repeated: after the subtitle rendering performed in Step S704; after the subtitle deletion performed in Step S706; and the result of the check in Step S705 is that the current time is not the time to end the display of the subtitles. Meanwhile, in the case where the result of the check in Step S702 is that the reproduction of the playlist has ended, the subtitle processes are forcefully terminated.

First Embodiment

Next, a description is given of the first embodiment.

The first embodiment relates to the stream structure of audio data on a BD. Basically, the details of the first embodiment are based on the above-described related embodiment. Thus, the first embodiment focuses on extended parts as well as differences from the above-described related embodiment.

Figure 31:
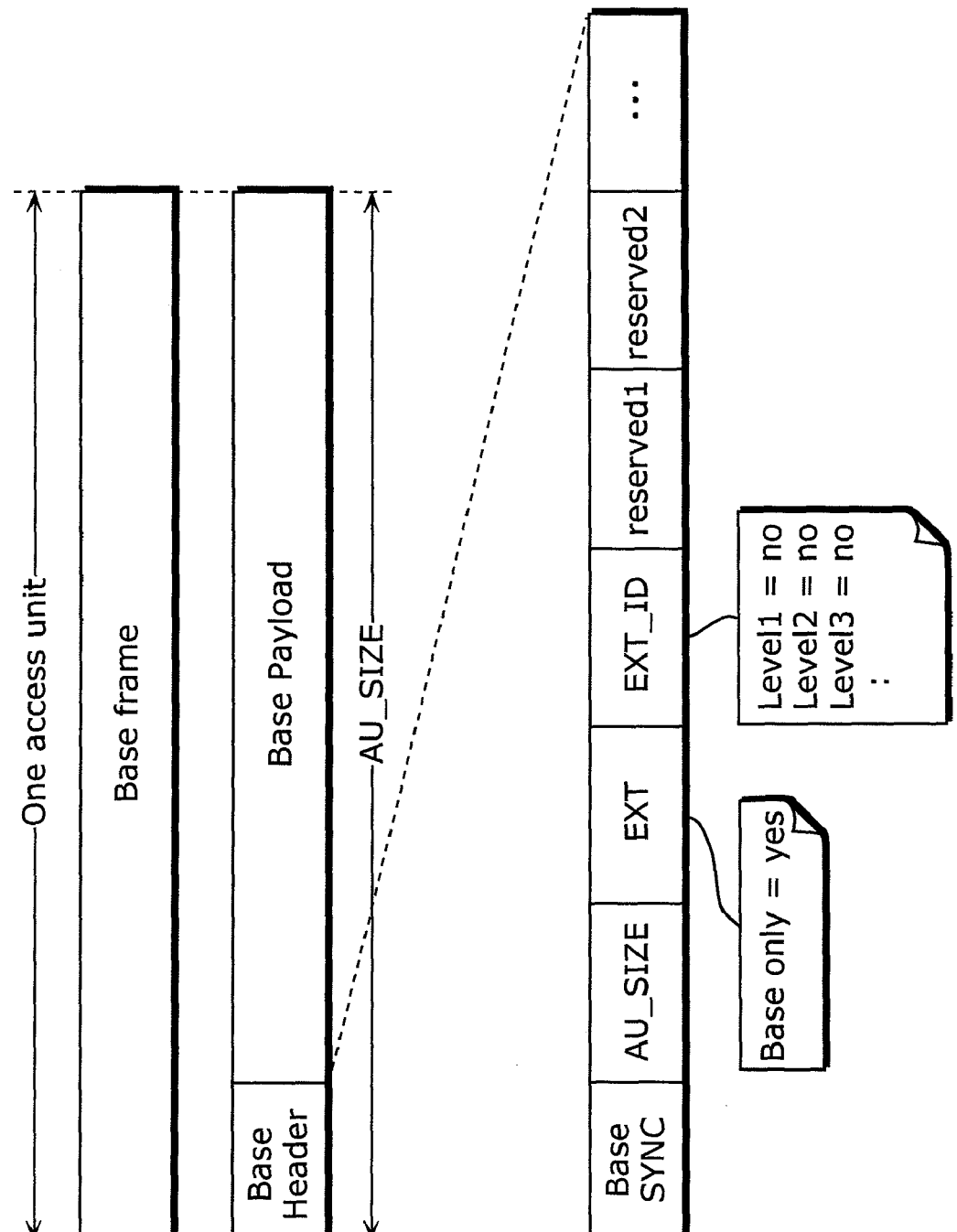
FIG. 31 is a diagram showing the structure of one access unit having no hierarchical structure.

FIG. 31 is a diagram showing the structure of one access unit (coding unit for decoding and reproducing information of video/audio) having no hierarchical structure. In MPEG-1 Audio, which is an audio coding mode, one access unit is made up of a header portion (Base Header) and a payload portion (Base Payload), as shown in FIG. 31.

The Base Header includes: Base SYNC that is a synchronization signal of the Base frame; AU_SIZE indicating the data size of this access unit; EXT indicating whether or not this access unit is made only of the Base frame; EXT_ID indicating the type of extension information added to the Base frame in the case where such access unit is not made up only of the Base frame; and reserved areas for future use.

The access unit shown in FIG. 31 does not have a hierarchical structure, and the whole access unit is coded using a single coding mode. This means that the whole access unit can be decoded using only one type of decoding mode.

Figure 32:
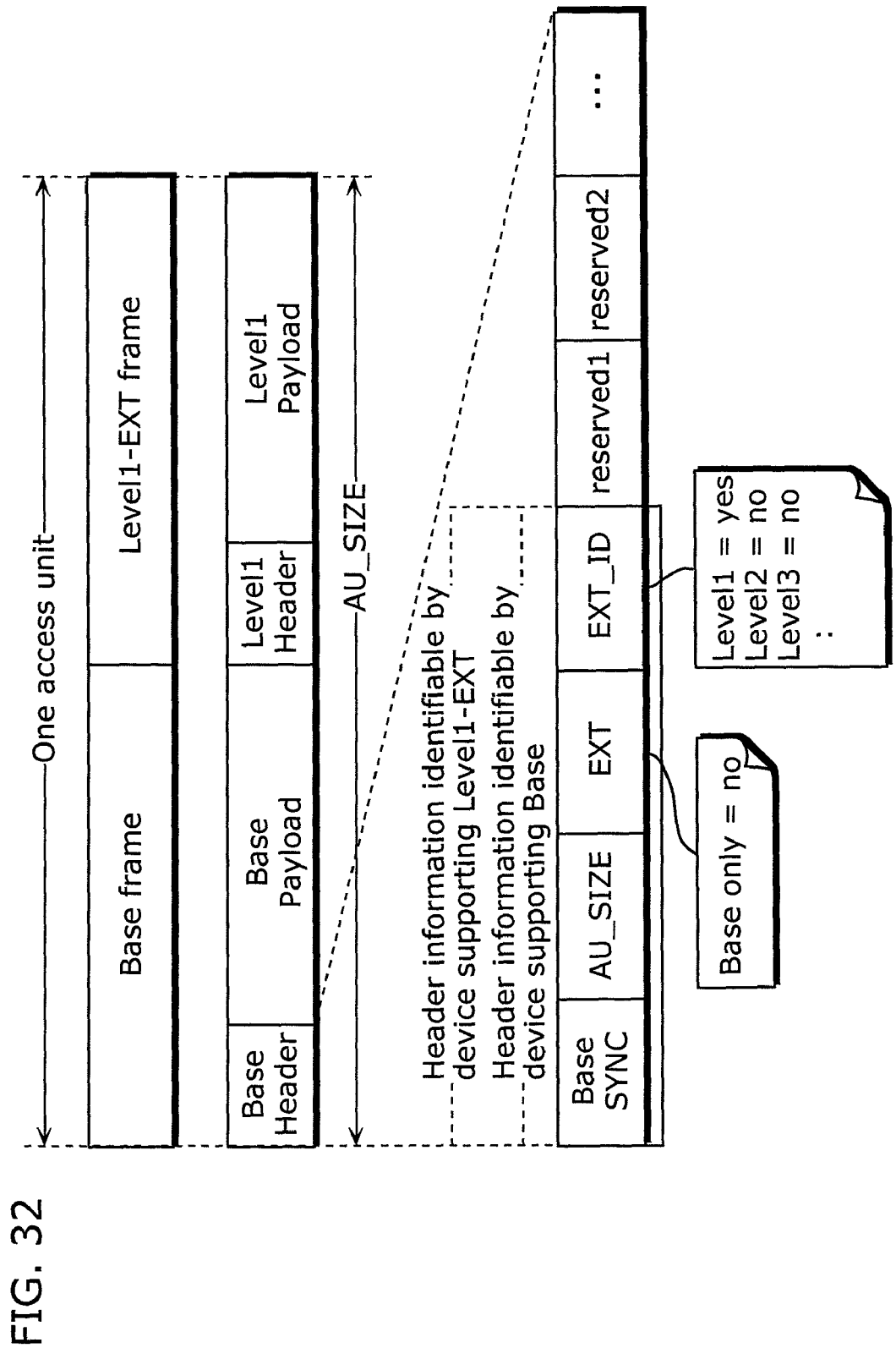
FIG. 32 is a diagram showing the structure of one access unit having a two-layered hierarchical structure.

FIG. 32 is a diagram showing the structure of one access unit that is formed by adding, to a Base frame, a Level1-EXT frame that includes, for example, higher quality video information or audio information that is coded using a coding mode different from the one used for the Base frame.

In the Base Header, EXT indicates that this access unit is not made up only of the Base frame, and EXT_ID indicates that the Level1 frame is coded following the Base frame, out of the other data in extension layers.

AU_SIZE indicates the size of the access unit. Using AU_SIZE, it is possible to design an access unit that allows a decoder capable of decoding only Base frames (decoder not capable of decoding Level1-EXT frames) to detect Base SYNC and to appropriately decode this access unit, while ignoring the Level1-EXT frame.

As described above, even in the case where an extension portion (Level1-EXT) is newly added to the original coding unit (Base), it is possible to decode a stream made up of access units as shown in FIG. 32 by ignoring Level1-EXT frames, as well as it is possible to employ new coding and compression algorithms. It is of course possible, for example, that a Base portion includes coded audio data of 5.1 ch, and a Level1-EXT portion includes coded audio data of additional 1 ch.

Figure 33:
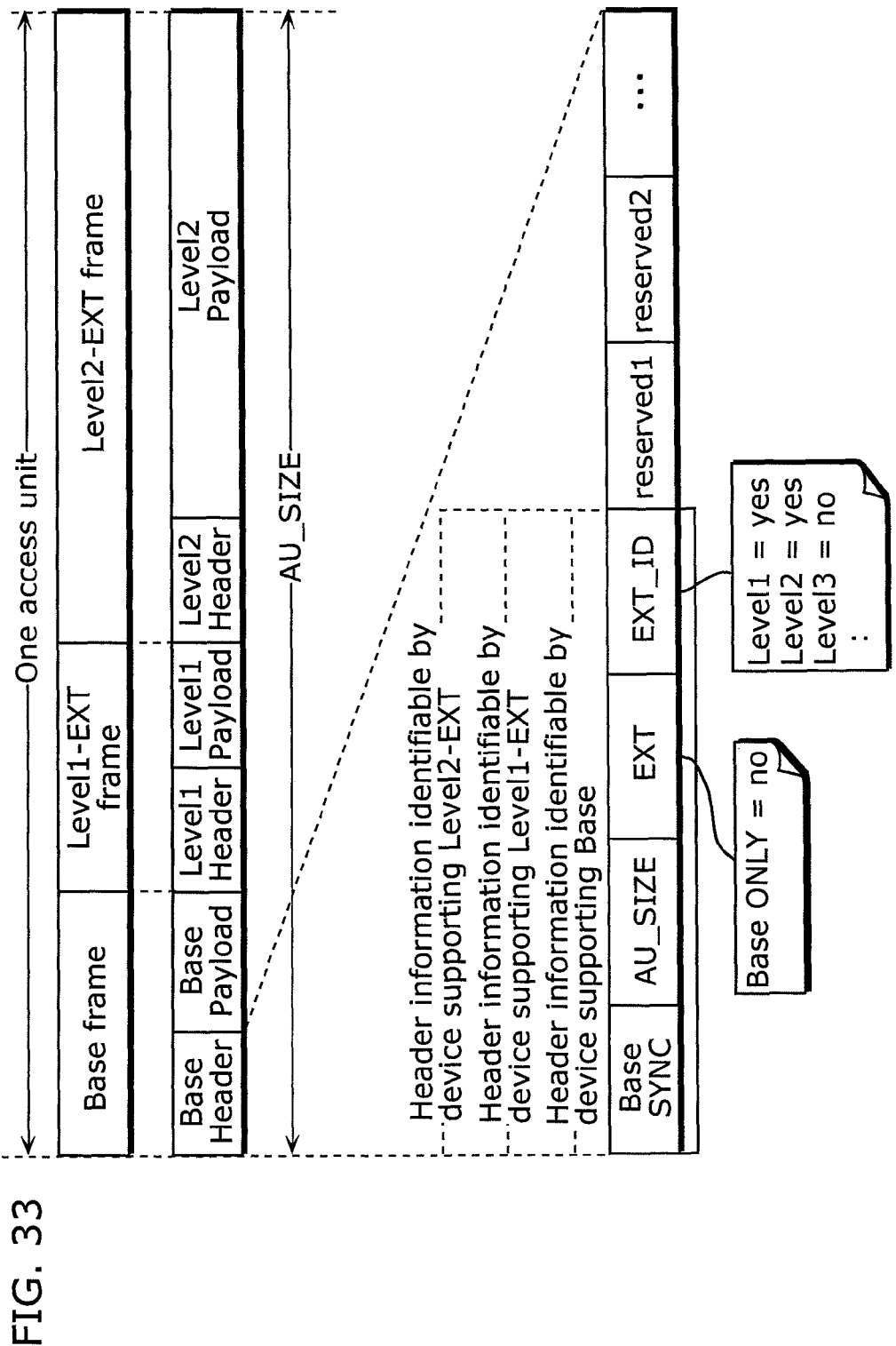
FIG. 33 is a diagram showing the structure of one access unit having a three-layered hierarchical structure.

Similarly, FIG. 33 shows an access unit that is extended to Level2-EXT. Data in the Level2-EXT frame is, for example, data that is not included in the data in the Base frame and Level1-EXT frame, and that is intended for obtaining audio whose sampling rate is higher than the sampling rate of the data in the Base frame and Level1-EXT frame.

EXT_ID is set to indicate that there exits Level1 and Level2.

Figure 34:
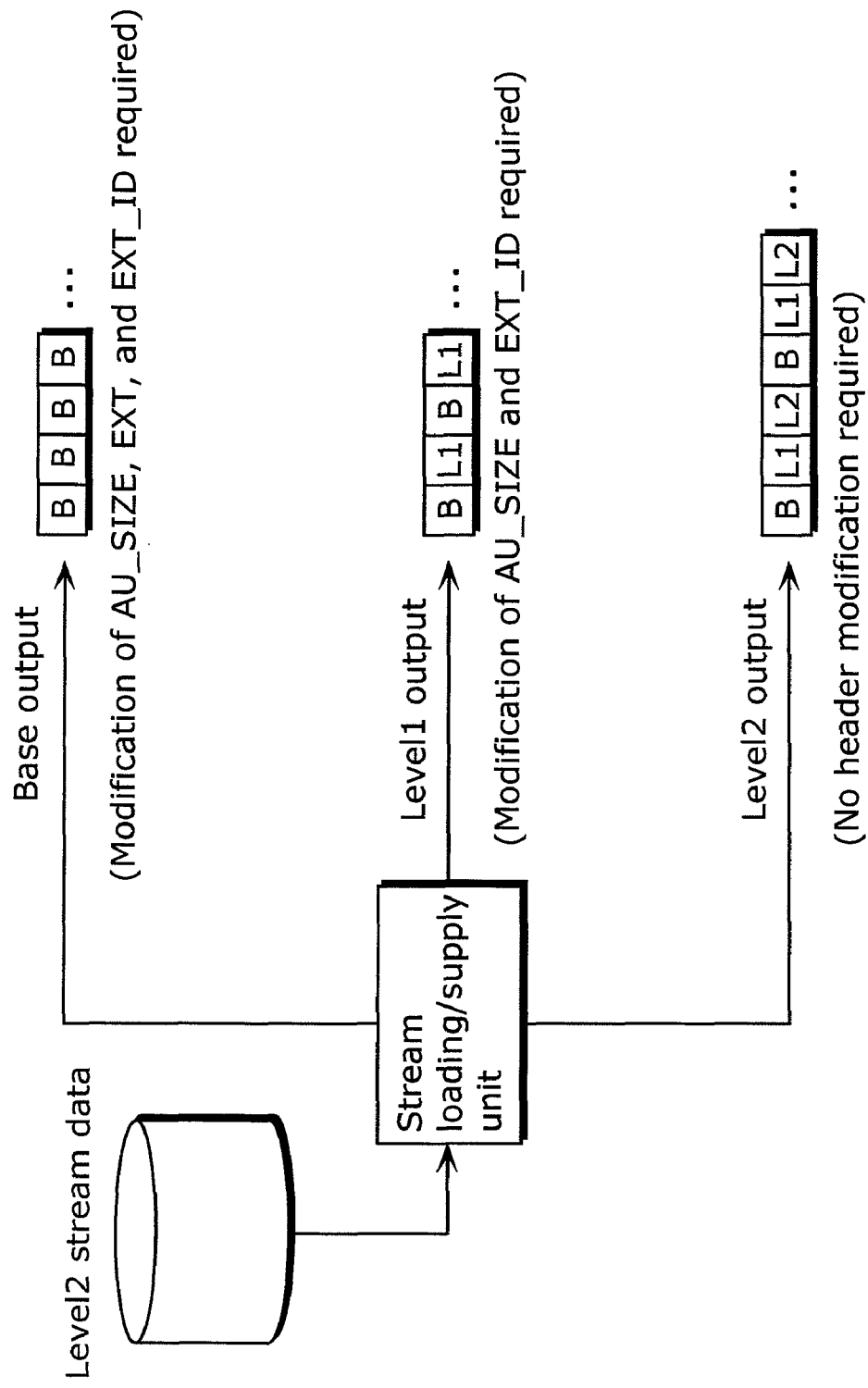
FIG. 34 is a diagram for describing operations performed by a stream loading/supply unit to output data having a hierarchical structure to decoders supporting different hierarchy levels, the operations being performed differently depending on destination decoders.

FIG. 34 is a diagram for describing operations performed by a stream loading/supply unit to output coded data having a hierarchical structure as described above (e.g., a Level2 stream) to decoders supporting different hierarchy levels, the operations being performed differently depending on destination decoders.

In the case of outputting data to a Base decoder, the stream loading/supply unit removes, from the Level2 stream, the Level1-EXT and Level2-EXT frames of each access unit, and outputs only the Base frame. In so doing, the stream loading/supply unit outputs the data after rewriting the values in: AU_SIZE being information, included in the Base Header, indicating the size of this access unit; EXT indicating whether or not this access unit is made up only of the Base frame; and EXT_ID indicating the types of the data in the extension layers.

Similarly, in the case of outputting data to a Level1 decoder, the stream loading/supply unit removes the Level2-EXT frame of each access unit from the Level2 stream, and outputs the resulting data after rewriting the values in AU_SIZE and EXT_ID.

Of course, in the case of outputting the Level2 stream to a Level2 decoder, the stream loading/supply unit outputs the Level2 stream as it is.

Here, consider the case where there is widespread use of devices supporting Base and Level1-EXT, and Level2-EXT is newly added. In this case, it is preferable that only the Base frame and Level1-EXT frame of each access unit are extracted from a Level2 stream, and the extracted data are outputted to such devices.

Figure 35:
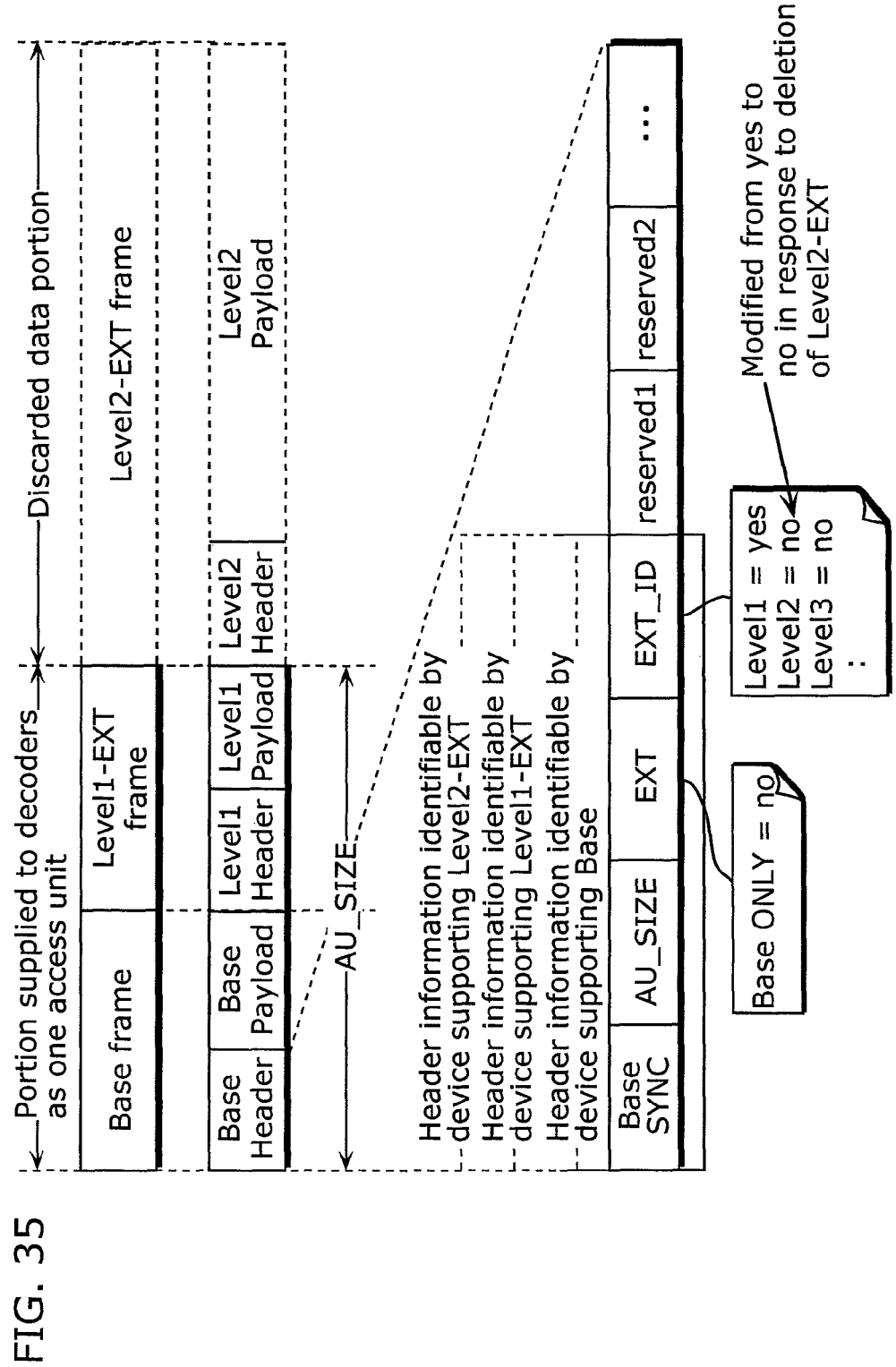
FIG. 35 is a diagram showing the data structure of an access unit that is obtained by extracting, from the stream shown in FIG. 33 supporting up to and including Level2-EXT, only Base and Level1 frames and then by modifying the values in the header, in the case where there is widespread use of devices supporting Base and Level1-EXT.

FIG. 35 is a diagram showing the data structure of an access unit that is obtained by extracting, from the stream shown in FIG. 33 supporting Base, Level1-EXT, and Level2-EXT, only the Base and Level1 portions and then by modifying the values in the header, in the case where there is widespread use of devices supporting Base and Level1-EXT.

Since the Base, Level1-EXT, and Level2-EXT frames are originally coded in the access unit, AU_SIZE and information in EXT_ID indicating the existence of Level2 are modified before such access unit is supplied to a decoder supporting Level1-EXT.

Figure 36:
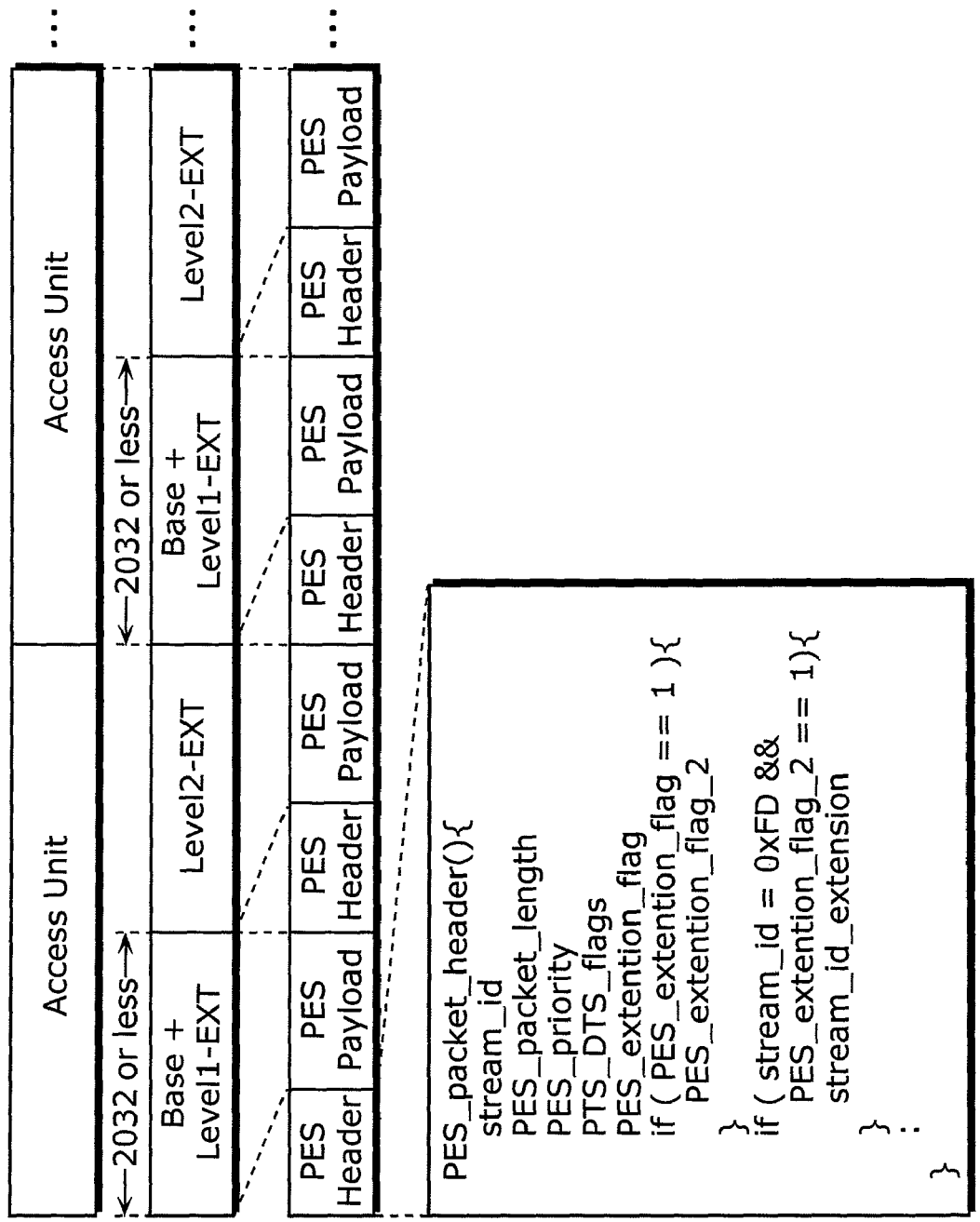
FIG. 36 is a diagram showing the data structure of a data stream including a Level2-EXT frame.

FIG. 36 is a diagram showing the data structure of a data stream in the case where there is a device supporting Level1-EXT, and Level2-EXT is newly added.

FIG. 36 clearly shows that one access unit is stored in two distinct portions, one of which is Base/Level1-EXT, which can be decoded by a legacy player and decoder, and the other of which is Level2-EXT, which cannot be decoded by a legacy player and decoder, so that the extraction of the Base/Level1-EXT becomes easy.

The MPEG standard defines that data should be stored in logical units called PES packets in the case where video and audio elementary streams are multiplexed in the MPEG2-TS (transport stream) format and the MPEG2-PS (program stream) format.

Each PES packet is made up of a PES header and a PES payload in which actual data is stored, and the PES header includes a various fields as shown in FIG. 36.

stream_id indicates the type of the elementary stream stored in the payload of such PES packet. In general, different stream_ids indicate different elementary streams. PES_packet_length indicates the data size of the PES packet. PES_priority is information to identify the priority level of such PES packet. PTS_DTS_flags is information indicating whether or not there exists PTS, which is information indicating the time to start the reproduction of the PES payload and DTS, which is information indicating the time to start the decoding of the PES payload. In the case where the values of the PTS and DTS are the same, the DTS is omitted. PES_extension_flag and PES_extension_flag_2 are information each indicating whether or not there is an extension data area in the payload of the PES packet. stream_id_extension, which can exist only in the case where the value of stream_id is 0xFD (extended_stream id), is auxiliary information to supplement stream_id to identify the elementary stream.

In each access unit, the Base frame portion (in FIG. 36, Base+Level1-EXT portion) and the other portion that does not include the Base frame (in FIG. 36, Level2-EXT portion) may be separated from each other in any of the following manner: by assigning these two portions with the same Packet Identifier (PID), which is information to identify a TS packet described later, and by assigning these two portions with different stream_ids; by using PES_priority; and by using stream_id_extension. Furthermore, the portion including the Base frame and the portion not including the Base frame may be separated by defining that the Base frame portion is a 2032-byte portion or a 2013-byte portion that can be supported by the DVD-Video standard, and defining that the other portion in the same access unit is a portion including no Base frame.

For example, in the case of using stream_id_extension, the values of stream_ids of both of a PES packet including the Base frame and a PES packet including no Base frame are equal to 0xFD (indicating that it is a private stream). Thus, different values are set as the value of stream_id_extension of the PES packet including the Base frame (e.g., 0x70) and as the value of stream_id_extension of the PES packet not including the Base frame (e.g., 0x71). This makes it possible for the player and an external output unit to extract only data including the Base frame. In this case, the values set as stream_id_extensions are stored into the private stream areas specified by the logical addresses 0x40 to 0x7F.

Coding units that can be stored in the first PES packet are coding units of Base and Level1-EXT supported by a legacy device (corresponding to a legacy AV receiver for which a digital interface protocol is specified and which has an input terminal capable of supporting such protocol). Coding units that can be stored in the second PES packet are Level2-EXT and higher level coding units supported by a non-legacy device (corresponding to a non-legacy AV receiver for which a digital interface protocol is not specified and which does not have an input terminal capable of supporting such protocol).

Discrimination can be made between the first PES packet and the second and subsequent PES packets by judging from their values of PES_priority, stream_id_extension, or PTS_DTS_flags.

As described above, since a PES header includes size information such as PES_packet_length, it is extremely easy to extract a PES payload based on such size information. Thus, in the case where coding units of Base and Level1-EXT are highly compatible with a legacy AV receiver and digital interface, and they are collectively stored in the first PES packet, the PES payload in such first PES packet can be extracted with easy by analyzing its PES header.

Figure 37:
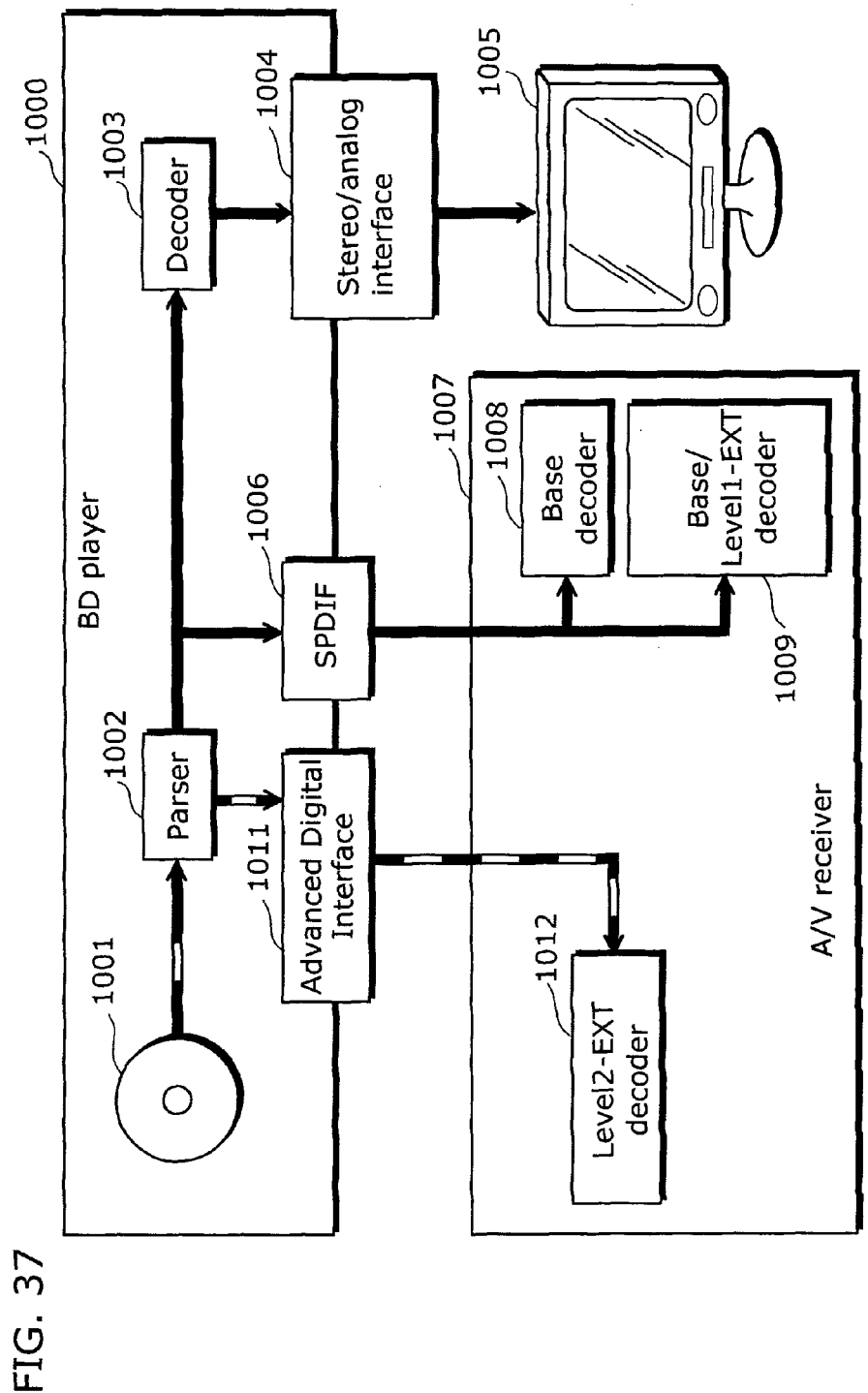
FIG. 37 is a diagram for describing processing performed on an access unit made up of two portions, one of which is a Base/Level1-EXT portion that can be decoded by a legacy player and decoder, and the other of which is a Level2-EXT portion that cannot be decoded by a legacy player and decoder.

Referring to FIG. 37, a description is given again of processing on an access unit made up of two portions, one of which is a Base/Level1-EXT portion that can be decoded by a legacy player and decoder, and the other of which is a Level2-EXT portion that cannot be decoded by a legacy player and decoder.

In a BD player 1000, a stream made up of plural access units stored on a BD disc 1001 is inputted therefrom to a parser 1002. The parser 1002 makes discrimination, for each of the access units, between the first PES packet including the Base frame portion and the second and subsequent PES packets including only the Level2-EXT portion.

Then, the parser 1002 outputs the first PES packet being the Base frame portion to a decoder 1003, included in the BD player 1000, that is capable of processing only Base frame portions. The decoder 1003 decodes the first PES packet, and outputs the decoded data to the television 1005 via a stereo/analog interface 1004. The television 1005 reproduces the data sent from the BD player 1000, and outputs such reproduced data as images and audio.

The parser 1002 also outputs, via an SPDIF 1006, the first PES packet including the Base frame portion to a Base decoder 1008 and a Base/Level1-EXT decoder 1009 included in an A/V receiver 1007 located outside the BD player 1000. The Base decoder 1008 and the Base/Level1-EXT decoder 1009 are decoders, which are capable of processing Level1-EXT frame portions in addition to Base frame portions, process the first PES packet sent from the BD player 1000.

Furthermore, the parser 1002 outputs, to a Level2-EXT decoder 1012 included in the A/V receiver 1007, the first PES packet including the Base frame portion and the second and subsequent PES packets including only the Level2-EXT portion via an Advanced Digital Interface 1011. The Level2-EXT decoder 1012, which is a decoder capable of processing all the frames from Base to Level2-EXT frames, processes both of the first and second PES packets sent from the BD player 1000.

As described above, an access unit is analyzed by the parser 1002, and then sent to and processed by the decoder 1003, Base decoder 1008, and Base/Level1-EXT decoder 1009, which are legacy decoders. At the same time, such access unit is also sent to and processed by the Level2-EXT decoder 1012 capable of processing the first PES packet including the Base frame portion and the second and subsequent PES packets including only the Level2-EXT portion.

The Advanced Digital Interface 1011 is, for example, an interface compliant with Definition Multimedia Interface (HDMI) or IEEE1394.

Note that the BD player 1000 shown in FIG. 37 is an example of the data reproduction apparatus of the present invention. The parser 1002 is an example of the TS packet judgment apparatus.

It is important that a PES packet which stores a Base frame which is ensured to be decoded by the all decoders is followed by a PES packet which stores an extension frame which is capable of providing additional function but which has low decoding compatibility (e.g., Level1-EXT frame and Level2-EXT frame). It is also important that data in one access unit is arranged in ascending order, starting from Base, Level1-EXT, Level2-EXT, Level3-EXT, Level4-EXT, . . . , and that no reordering of such data occurs when all the coding units in one access unit are extracted.

According to DTS (which is an audio coding mode developed by the Digital Theater Systems, Inc.), the data size of the payload of a PES packet including the first Base (referred to as "core" in DTS) is defined to be 2032 bytes or less to comply with SPDIF (Sony/Philips Digital Interconnect Format; its consumer version is defined by IEC60958-3). This means that, in the case of the DTS-type I that stores 512 samples into one frame out of audio data sampled at 48 KHz, data sampled at 1524 Kbps or less, when considered in terms of bit rate, are stored into the first PES packet. This is represented by the following equation:

$$1524[Kbps]=2032[bytes]\times 8[bits/byte]\times 48000[sample/sec]/512[sample].$$

In order to maintain compatibility with an AV receiver (e.g., home theater) supporting DTS and compliant with data outputted from a DVD-Video player, the data size of the payload of the PES packet including the first Base is simply required to be 2013 bytes or less.

As described above, data in one access unit is divided and managed on a PES packet basis, to allow for compatibility between a legacy player/decoder and a new player/decoder. In other words, data of one access unit is divided and managed depending on digital interface specification. Accordingly, it becomes possible to output access unit data that includes data up to and including a predetermined extension layer, without performing anything on such data and without causing any defects in data transfer.

Figure 38:
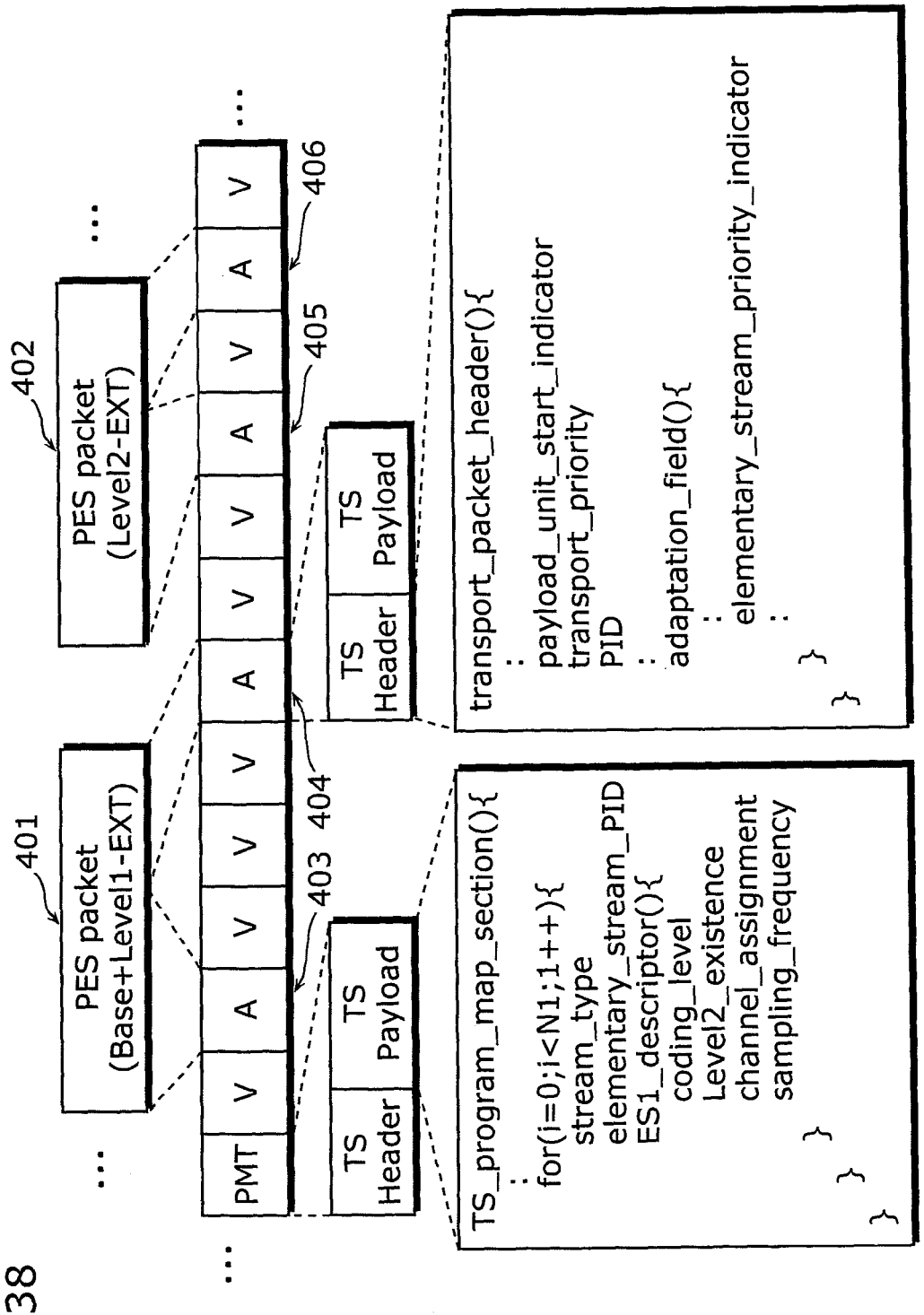
FIG. 38 is a diagram showing a method of storing, into an MPEG2-TS, an access unit having a hierarchical structure.

FIG. 38 is a diagram showing the structure of an access unit, having a hierarchical structure, to be multiplexed in accordance with the MPEG2-TS format.

An MPEG2-TS is a digital stream made up of TS packets, each being 188 bytes in size. The structure of a part of a Program Map Table (PMT) holding information about programs making up the MPEG2-TS, is as shown in FIG. 38.

payload_unit_start_indicator is information to identify whether or not a PES packet starts with the TS packet including this information. transport_priority is 1-bit information indicating the priority level of this TS packet among TS packets with the same PID. PID is the ID of a TS packet used to identify which kind of information is stored in such TS packet. The header of each TS packet made up of the top 4 bytes includes adaptation_field_control (not illustrated), and it is possible to generate additional header information (adaptation_field) according to the value in such field. Stored in such field is elementary_stream_priority_indicator or the like indicating the priority level of data included in the payload of this TS packet.

According to the MPEG2-TS format, it is prohibited that plural PES packets are stored in one TS packet. Therefore, as shown in FIG. 38, a PES packet 401 in which a coding unit of Base+Level1-EXT is stored and a PES packet 402 in which a coding unit of Level2-EXT is stored are stored in different TS packets. More specifically, the PES packet 401 is stored in TS packets 403 and 404, and the PES packet 402 is stored in TS packets 405 and 406. The TS packets 403, 404, 405, and 406 are assigned with the same PID indicating that the same elementary stream is stored in these TS packets. Using the above-described transport_priority and elementary_stream_priority_indicator that are assigned on a TS packet basis, it is possible to identify, from TS headers, which kinds of PES packets is stored in each of the TS packets 403, 404, 405, and 406. In other words, in the case where it is necessary to discard a Level2-EXT frame in order to input data to a decoder that supports Base and Level1-EXT, it becomes easy to extract only data of Base and Level1-EXT in an access unit by checking only the PID and transport_priority, for example, and then performing filtering (the PID filter 310 shown in FIG. 7 may have this function). Furthermore, since transport_priority is located at a fixed position in a header, it is possible to extract only data of Base and Level1-EXT in the access unit simply by judging the value of transport_priority in the fixed position, without having to analyze the whole PES packet. This facilitates the development of inexpensive player equipment (discriminator).

In the MPEG2-TS, a PMT packet indicating programs stored in such MPEG-2 TS is stored. In the PMT, the following are stored as a set: elementary_stream_PID indicating TS packets with which PID carry information belonging to a predetermined program, such as video information and audio information; stream_type indicating the type of coding for this elementary stream; and one or more descriptors that describe additional information of the elementary stream.

The following are some of information conceived to be described in a descriptor for a coding mode for a stream with a hierarchical structure: level information about the extension layer (coding_level); information indicating whether or not an extension layer that is not currently supported or that is rarely used, is employed (e.g., Level2_existence which is information to identify whether or not Level2 is employed); channel assignment information (channel_assignment) in the case where coded data is audio information; and sampling frequency (sampling_frequency).

In the case where coded data is video information, resolution information and frame frequency are conceived to be described in the descriptor, in addition to coding_level and Level2_existence.

DTS data is categorized into data of DTS (corresponding to Base) and DTS+ (corresponding to Level1-EXT), and data of DTS++ (corresponding to Level2-EXT).

While both of DTS+ and DTS++ include extension layer data, they are handled differently. Thus, their respective descriptors may include information to identify whether the target stream includes DTS/DTS+ or DTS++ (such information corresponds to Level2_existence in FIG. 38).

Note that Level2_existence may be used as information indicating whether or not the target stream includes only a portion that can be outputted to SPDIF in the same format (DTS-type I) as that of the DVD-Video standard.

Information of Level2_existence and coding_level as described above may be described in a database file (e.g., in Attribute in the VOBI file shown in FIG. 13). Such information are capable of not only indicating that extraction processing to be performed at the time of digital data output is different, but also being used for the display/selection of video and audio attributes on the menu screen of the BD. For example, a player that does not support Level2 can judge, from the database file, that a stream to be decoded is a Level2 stream, and provide the user with information in advance indicating that Level2 audio cannot be selected.

Figure 39:
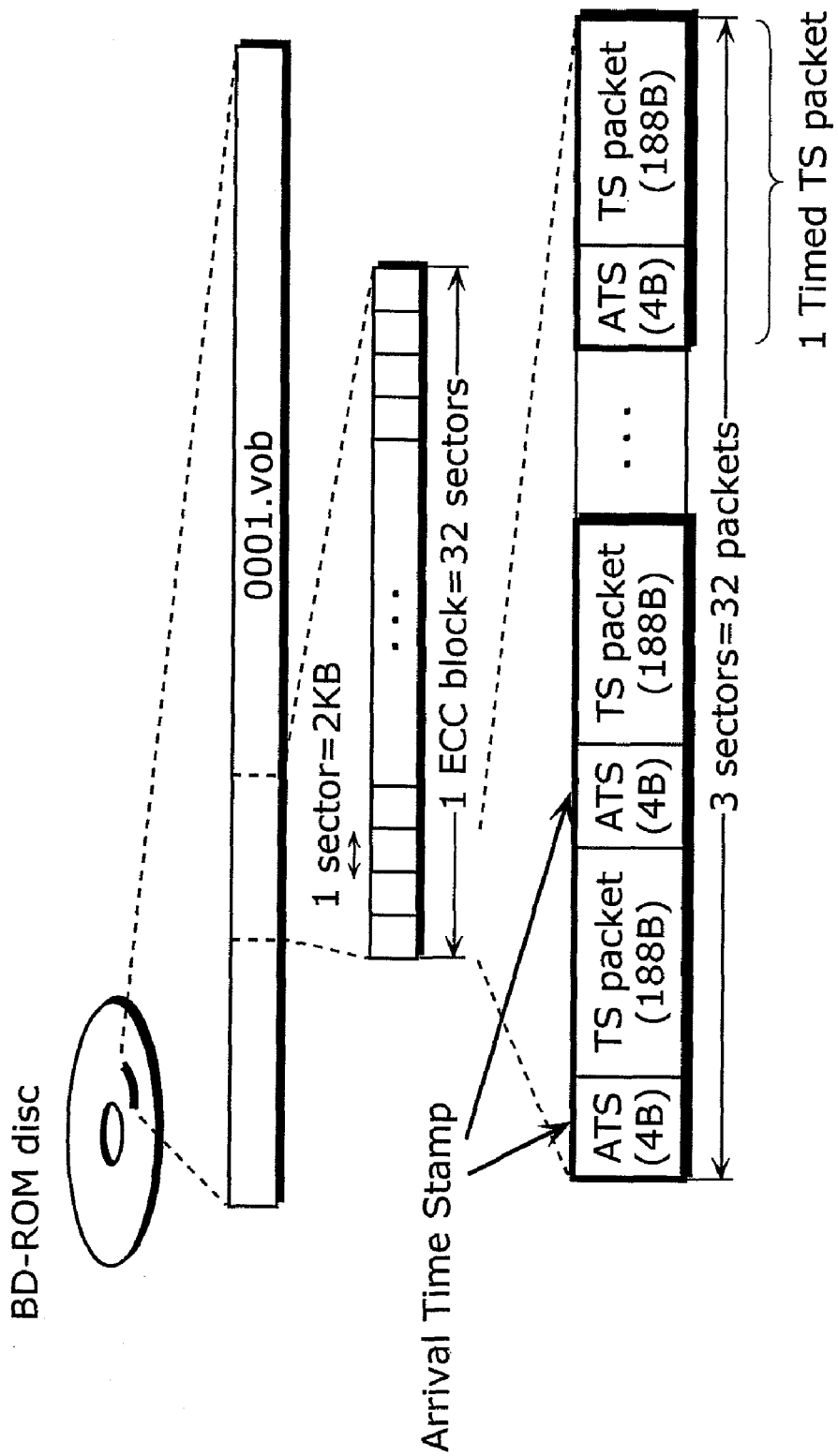
FIG. 39 is a diagram showing the file format of an MPEG2-TS at the time when it is stored onto an optical disc.

FIG. 39 is a diagram showing the file format of an MPEG2-TS at the time when it is stored onto an optical disc such as a BD-ROM.

A TS packet added with 4-byte Arrival Time Stamp (ATS; information indicating the time to start the input of such TS packet into a decoder) makes up one Timed TS packet, and 32 Timed TS packets are collectively stored in three sectors (6 KB). An ATS is added to each TS packet for an efficient storage of a stream coded at a variable bit rate.

Figure 40:
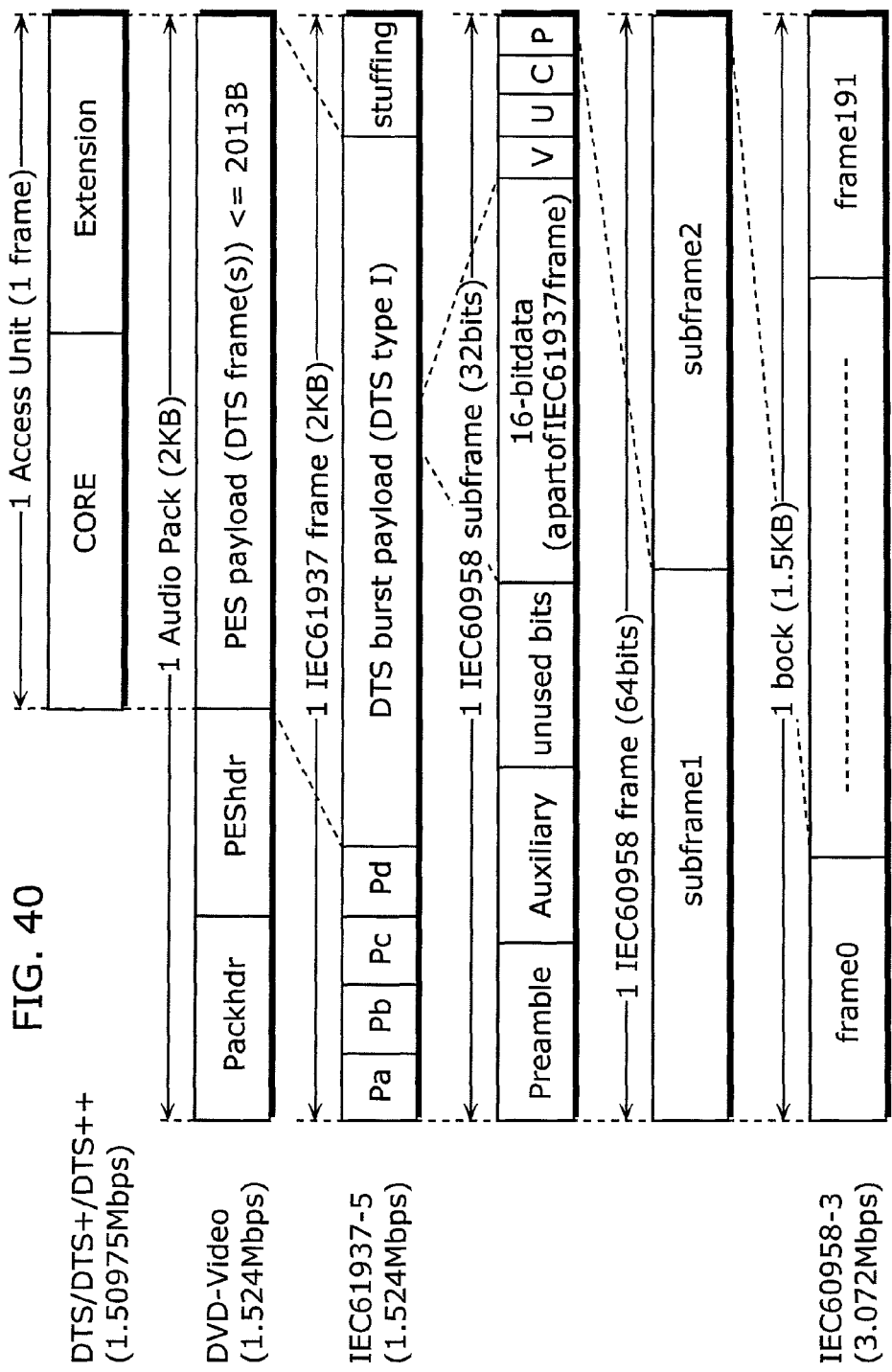
FIG. 40 is a diagram for describing the details of DTS specified by the DVD-Video standard.

FIG. 40 is a diagram for describing the details of DTS data specified by the DVD-Video standard.

The DVD-Video standard specifies that the maximum size of one access unit is 2013 bytes, without specifying which one of the levels it applies to, i.e., DTS, DTS+, and DTS++. In other words, one access unit which represents audio information equivalent to 512 samples at 48 KHz, may constitute only core or may be made up of core and an extension.

One access unit, which is 2013 bytes at maximum, is stored in the PES payload, to which a PES header (PEShdr) and a pack header (Packhdr) are added. The size of the whole packet amounts to 2 KB.

A DTS burst payload in which only the audio data in the PES payload is stored, is formed. A total of 8-bytes preamble groups (Pa, Pb, Pc, and Pd), each being 2 bytes, and stuffing data are added to such DTS burst payload, and a 2-KB IEC61937-5 frame is formed.

SPDIF (IEC60958-3) transfers data in a cycle of 192 frames as a block. One frame is made up of two sub-frames, which constitutes 4-byte data, each sub-frame carrying 2-byte data in an IEC61937-5 frame.

Therefore, in order to send DTS data while maintaining compatibility with the DVD-Video standard, the amount of bits in core and an extension is required to be controlled so that it does not exceed 2013 bytes in an IEC61937-5 frame. This eliminates the necessity to identify the type of the data, i.e. which one of DTS, DTS+, and DTS++.

As described above, the payload of a PES packet including core should be a coding unit that is 2013 bytes or less in size, in the case where DTS+++ data is stored in a BD-ROM.

As in the case of the DVD-Video standard, the total size of frames making up one access unit is of course required to be 2013 byte or less. For example, in the case where the total size of a Base frame and a Level1-EXT frame is 2014 bytes, these frames are required to be coded again to reduce their total size to 2013 bytes or less, or it is necessary to form a PES packet including only the Base frame, with the Level1-EXT frame being stored in the next PES packet in multiplexing order.

Figure 41:
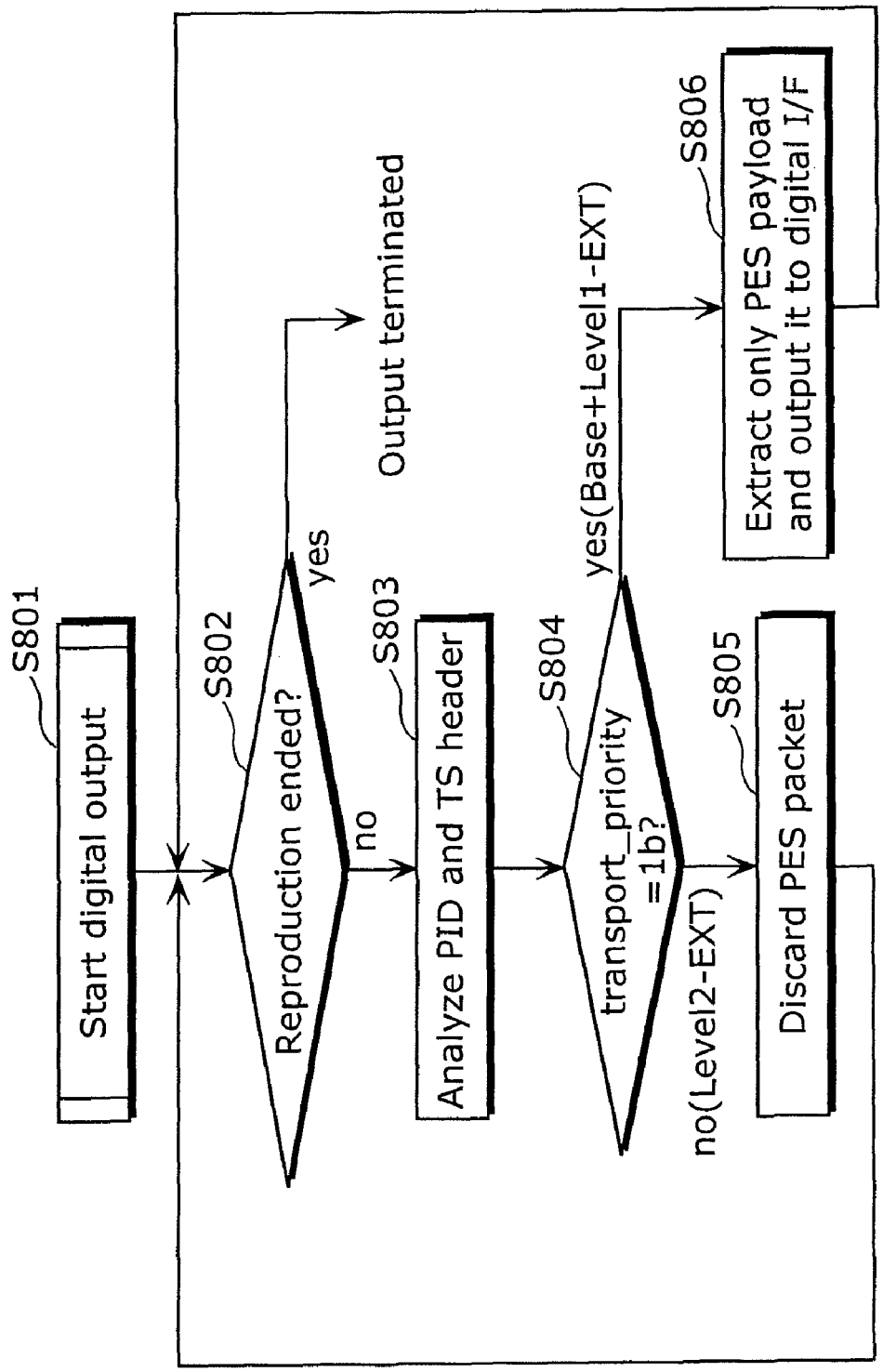
FIG. 41 is a flowchart showing processes performed by a demultiplexer and the stream loading/supply unit.

FIG. 41 is a flowchart showing processes performed by the demultiplexer 310 (FIG. 7) and the stream loading/supply unit (FIG. 34).

S801 is a digital output start step of extracting a part of the access unit shown in FIG. 36, and outputting such extracted part to outside in order to comply with SPDIF.

S802 is a reproduction end determination step. In the case where the determination is YES, the data output is terminated, whereas in the case where the determination is NO, the process proceeds to S803 being a PES packet process step.

In S803, discrimination is made between TS packets based on PIDs, the header of each TS packet is analyzed, and the above-described transport_priority is read out.

In S804, the value of transport_priority is judged. In the case where the value of such field is "0b (non-Base frame portion)", the process proceeds to S805, whereas in the case where the value is "1b (including the Base frame portion)", the process proceeds to S806.

S805 is a step to be performed in the case where the PES packet is judged as being a non-Base frame portion in S804. In S805, the PES packet is discarded, and data in the payload of such PES packet is not outputted.

S806 is a step to be performed in the case where the PES packet is judged as being a Base frame portion in S804. In S806, the payload (Base+Level1-EXT) of such PES packet is extracted, and its frame data is outputted to a decoder or a legacy digital I/F, as described above with reference to FIG. 7 and FIG. 34.

Note that, when this is done, the frame data is outputted to the digital I/F or the like after making an appropriate modification of the values of AU_SIZE and EXT_ID as shown in FIG. 35.

After S805 and S806, the process returns to the reproduction end determination step S802.

INDUSTRIAL APPLICABILITY

The information storage medium of the present invention is useful as an optical disc or the like on which video data and audio data are stored. The TS packet judgment apparatus of the present invention is useful as an apparatus or the like for extracting, from data stored on the information storage medium of the present invention such as an optical disc, coded basic data supported by a legacy decoder or a legacy digital I/F. The data reproduction apparatus of the present invention is useful as an apparatus or the like that extracts the above coded basic data from the information storage medium of the present invention such as an optical disc, and reproduces such extracted data. The data reproduction apparatus of the present invention is also useful as a reproduction apparatus or the like that reproduces not only data from the information storage medium of the present invention such as an optical disc, but also audio data supplied via broadcasting or a network, as well as audio data on a storage medium such as a hard disk and a semiconductor memory.

The invention claimed is:

1. A non-transitory information storage medium on which an audio stream including a plurality of TS packets is stored,
   wherein each of the TS packets includes one of a first packet including basic data, and a second packet including extension data related to the basic data,
   the basic data is data capable of being decoded into complete sound without requiring the extension data, and the extension data is data intended for improving the quality of audio generated from the basic data, and
   a header of each of the TS packets includes an identifier indicating whether the TS packet includes the first packet including basic data or the second packet including extension data, the identifier being included in a transport_priority field located at a specified position in the header.

2. The information storage medium according to claim 1, wherein the extension data is data which is not included in the basic data and whose sampling rate is higher than a sampling rate of the basic data.

3. A TS packet judgment apparatus, comprising:
   an obtainer operable to obtain the identifier of each of the TS packets stored on the information storage medium according to claim 1; and
   a determiner operable to judge, using the identifier, whether the TS packet includes the first packet or the second packet.

4. A data reproduction apparatus, comprising:
   the TS packet judgment apparatus according to claim 3;
   a discarder operable to discard a TS packet, included in the audio stream, which includes the second packet; and
   a decoder operable to decode only the first packet.

5. A data reproduction method, comprising:
obtaining the identifier of each of the TS packets stored on the information storage medium according to claim 1;
determining, using the obtained identifier, whether the TS packet includes the first packet or the second packet; and
decoding only a TS packet, included in the audio stream, which includes the first packet.

6. A non-transitory computer-readable medium having a program that causes a computer to execute:
obtaining the identifier of each of the TS packets stored on the information storage medium according to claim 1;
determining, using the obtained identifier, whether the TS packet includes the first packet or the second packet; and
decoding only a TS packet, included in the audio stream, which includes the first packet.

* * * * *